(12) United States Patent
Matsuda et al.

(10) Patent No.: US 11,496,222 B2
(45) Date of Patent: Nov. 8, 2022

(54) SPATIAL OPTICAL TRANSMITTER AND SPATIAL OPTICAL COMMUNICATION SYSTEM

(71) Applicant: Mitsubishi Electric Corporation, Tokyo (JP)

(72) Inventors: Keisuke Matsuda, Tokyo (JP); Tsuyoshi Yoshida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/406,833

(22) Filed: Aug. 19, 2021

(65) Prior Publication Data

US 2021/0384985 A1    Dec. 9, 2021

Related U.S. Application Data

(63) Continuation of application No. PCT/JP2019/011540, filed on Mar. 19, 2019.

(51) Int. Cl.
*H04B 10/532* (2013.01)
*H04B 10/61* (2013.01)
*H04B 10/556* (2013.01)

(52) U.S. Cl.
CPC ......... *H04B 10/532* (2013.01); *H04B 10/614* (2013.01); *H04B 10/5561* (2013.01)

(58) Field of Classification Search
CPC . H04B 10/532; H04B 10/614; H04B 10/5561
See application file for complete search history.

(56) References Cited

U.S. PATENT DOCUMENTS

| 3,536,922 A | 10/1970 | Ito |
| 2012/0008961 A1 | 1/2012 | Chen et al. |
| 2015/0349888 A1 | 12/2015 | Chen et al. |
| 2016/0013882 A1* | 1/2016 | Hashimoto ........ H04B 10/1123 398/65 |
| 2019/0391073 A1 | 12/2019 | Tanaka |

FOREIGN PATENT DOCUMENTS

| JP | 2013-535871 A | 9/2013 |
| JP | 2016-139977 A | 8/2016 |
| WO | WO 2014/122909 A1 | 8/2014 |
| WO | WO 2014/136421 A1 | 9/2014 |
| WO | WO 2016/038654 A1 | 3/2016 |
| WO | WO 2017/182095 A1 | 10/2017 |
| WO | WO 2018/139412 A1 | 8/2018 |

OTHER PUBLICATIONS

Geisler et al., "Experimental Demonstration of Multi-Aperture Digital Coherent Combining Over a 3.2-km Free-Space Link", 2017, Proc. of SPIE vol. 10096, 100960C-1-100960C-8, total 8 pages.
International Search Report for PCT/JP2019/011540 dated Jun. 4, 2019.
Extended European Search Report dated Feb. 11, 2022 issued in the corresponding European Patent Application No. 19920554.3.

* cited by examiner

*Primary Examiner* — Kenneth N. Vanderpuye
(74) *Attorney, Agent, or Firm* — Birch, Stewart, Kolasch & Birch, LLP

(57) ABSTRACT

A spatial optical transmitter modulates an optical signal of a single wavelength in accordance with a signal to be transmitted, divides the modulated optical signal into two, rotates polarizations of the two divided optical signals, and transmits the two optical signals as optical signals of two orthogonal polarizations to space.

4 Claims, 28 Drawing Sheets

SPATIAL OPTICAL TRANSMITTER AND SPATIAL OPTICAL COMMUNICATION SYSTEM

CROSS REFERENCE TO RELATED APPLICATION

This application is a Continuation of PCT International Application No. PCT/JP2019/011540, filed on Mar. 19, 2019, which is hereby expressly incorporated by reference into the present application.

TECHNICAL FIELD

The present invention relates to a spatial optical transmitter and a spatial optical communication system.

BACKGROUND ART

Spatial optical communication can downsize an optical transmitter and receiver by using light having a wavelength shorter than that of conventional microwave wireless communication as a carrier. In addition, since the spatial optical communication can suppress the spread of the propagating beam of light to be small, it is possible to efficiently transmit an optical signal and to expect low power consumption.

In spatial optical communication, an optical receiver condenses light propagating in the atmosphere on a reception-side optical system and converts the light into an electrical signal. Note that, since the wavefront of the light condensed on the reception-side optical system is distorted due to the influence of the atmosphere, loss due to interference occurs.

In order to solve this problem, for example, Non-Patent Literature 1 describes a communication system that suppresses the influence of wavefront distortion by condensing light propagating in the atmosphere on a plurality of optical systems included in an optical receiver. In the optical receiver, the lights condensed on the respective optical systems are converted into electrical signals, and the converted electrical signals are combined by signal processing.

CITATION LIST

Non-Patent Literature

Non-Patent Literature 1: D. J. Geisler et. al, "Experimental Demonstration of Multi-Aperture Digital Coherent Combining Over a 3.2-km Free-Space Link", Proc. of SPIE Vol. 10096 1000960C-6(2017).

SUMMARY OF INVENTION

Technical Problem

In spatial optical communication, when a beam of light transmitted from an optical transmitter reaches an optical receiver, a beam diameter is wider than an aperture of a reception-side optical system. As described in Non-Patent Literature 1, in a case where the optical receiver includes a plurality of optical systems, propagation paths to the plurality of optical systems are different from each other, and thus, in each optical system, a directional angle with respect to reception light deviates due to the influence of the atmosphere. Such a directional deviation of the optical system can be dynamically compensated using a tracking sensor and a tracking mirror, but in a case where the optical receiver includes a plurality of optical systems, it is necessary to provide the tracking sensor and the tracking mirror for each optical system, and there is a problem that the system scale increases.

The present invention solves the above problems, and has an object to obtain a spatial optical transmitter and a spatial optical communication system capable of performing stable spatial optical communication while suppressing an increase in a system scale.

Solution to Problem

A spatial optical transmitter according to the present invention includes a light source to output a light of a single wavelength, a modulator to modulate the light output from the light source in accordance with a signal to be transmitted to generate a modulated optical signal of a single polarization, a transmission-side splitter to divide the optical signal generated by the modulator into two, a polarization rotator to rotate polarizations of the optical signals divided by the transmission-side splitter to generate optical signals of two orthogonal polarizations, and two transmission-side optical systems to transmit the optical signals of two polarizations generated by the polarization rotator to space, individually.

Advantageous Effects of Invention

According to the present invention, an optical signal of a single wavelength is modulated in accordance with a signal to be transmitted, the modulated optical signal is divided into two, polarizations of the two divided optical signals are rotated, and the two divided optical signals are transmitted to space as optical signals of two orthogonal polarizations. Since the two optical signals transmitted to space are orthogonal in polarization to each other, they do not interfere with each other and do not cancel each other even if the phases are inverted. Therefore, a diversity effect similar to that in a case where the receiver side has two optical systems can be obtained. This makes it possible to perform stable spatial optical communication while suppressing an increase in system scale.

DESCRIPTION OF EMBODIMENTS

First Embodiment

Figure 1:
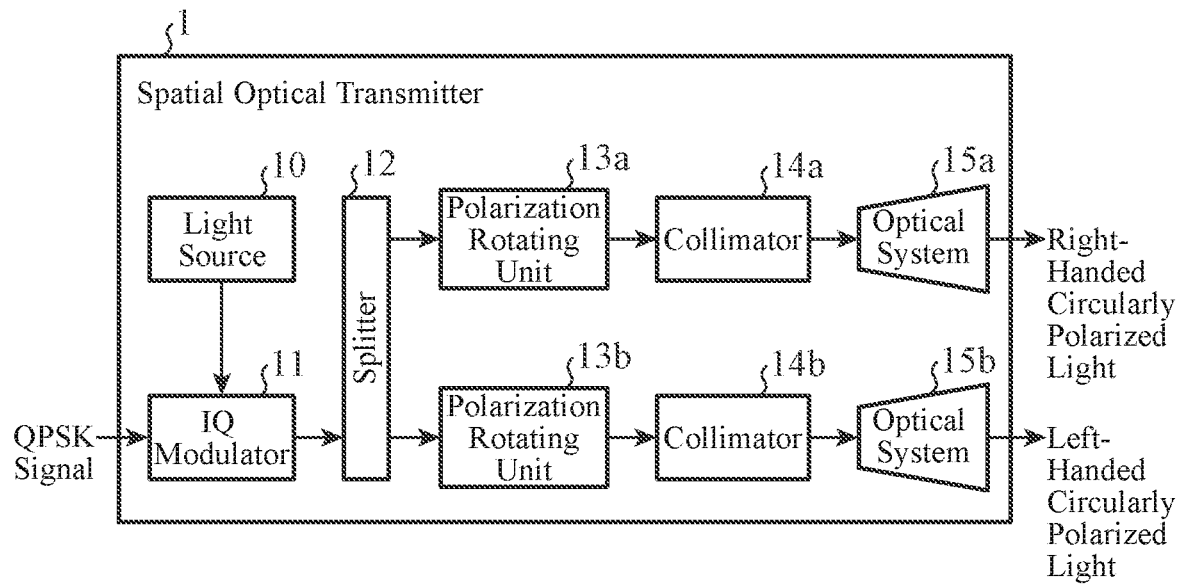
FIG. 1 is a block diagram showing a configuration of a spatial optical transmitter according to a first embodiment.

FIG. 1 is a block diagram showing a configuration of a spatial optical transmitter 1 according to the first embodiment. As shown in FIG. 1, the spatial optical transmitter 1 includes a light source 10, an IQ modulator 11, a splitter 12, a polarization rotating unit 13a, a polarization rotating unit 13b, a collimator 14a, a collimator 14b, an optical system 15a, and an optical system 15b.

The light source 10 is a light source for outputting a light of a single wavelength, and is, for example, a semiconductor laser. The IQ modulator 11 is a modulation unit for modulating a light output from the light source 10 in accordance with a signal to be transmitted to generate a modulated optical signal of a single polarization. For example, when the signal to be transmitted is a four-valued phase modulation signal, the IQ modulator 11 modulates the light output from the light source 10 in accordance with the input four-valued phase modulation signal. Hereinafter, the four-valued phase modulation signal is referred to as a QPSK signal.

The splitter 12 is a transmission-side dividing unit for dividing the optical signal modulated by the IQ modulator 11 into two. The splitter 12 distributes the optical signal modulated by the IQ modulator 11 to the polarization rotating unit 13a and the polarization rotating unit 13b. The polarization rotating unit 13a and the polarization rotating unit 13b rotate the polarizations of the optical signals distributed by the splitter 12. The optical signal output from the polarization rotating unit 13a and the optical signal output from the polarization rotating unit 13b are optical signals of two orthogonal polarizations, for example, a right-handed circularly polarized light and a left-handed circularly polarized light.

The collimator 14a is a transmission-side optical system that inputs an optical signal whose polarization has been rotated by the polarization rotating unit 13a and converts the input optical signal into a parallel light. The collimator 14b is a transmission-side optical system that inputs an optical signal whose polarization has been rotated by the polarization rotating unit 13b and converts the input optical signal into a parallel light. The optical system 15a is a transmission-side optical system that transmits, to space, an optical signal whose polarization has been rotated by the polarization rotating unit 13a and which has been converted into a parallel light by the collimator 14a. The optical system 15b is a transmission-side optical system that transmits, to space, an optical signal whose polarization has been rotated by the polarization rotating unit 13b and which has been converted into a parallel light by the collimator 14b.

Each of the optical system 15a and the optical system 15b widens the beam diameter of the input optical signal and then transmits the optical signal into space. The distance between the optical system 15a and the optical system 15b is a value larger than a fried parameter that is an index representing the intensity of atmospheric fluctuations. The fried parameter is determined by the state of the atmosphere through which light propagates and has a unit of length. Since the optical system 15a and the optical system 15b are more distant than the fried parameter, the optical signal transmitted from the optical system 15a and the optical signal transmitted from the optical system 15b are affected by different atmospheres.

Even if the lights transmitted from the optical system 15a and the optical system 15b are lights with high coherency, since the polarizations of these lights are orthogonal to each other, they do not interfere with each other and do not cancel each other even if the phases are inverted. Therefore, on the optical receiver side, a diversity effect similar to that in the case of having the two reception-side optical systems can be obtained.

In addition, since the optical system 15a and the optical system 15b transmit the optical signals to the space after widening the beam diameters of the optical signals, the beam diameters of both the optical signals when reaching the optical receiver are sufficiently wider than the aperture of the reception-side optical system. As described above, in the spatial optical transmitter 1, highly accurate direction control of the optical signal to be transmitted to the optical receiver is unnecessary. On the other hand, in the conventional optical receiver, the diversity effect is obtained using the two reception-side optical systems, but highly accurate direction control is required in each of the two reception-side optical systems. Therefore, the configuration of the optical receiver is complicated. On the other hand, since the spatial optical transmitter 1 does not require highly accurate direction control of the optical signal, the diversity effect can be achieved with a simple configuration.

In a case where the light source 10 is a light source with high coherency, two lights of the same polarization interfere with each other, and thus, a diversity effect cannot be obtained. Therefore, in the spatial optical transmitter 1, the polarizations of the two optical signals are individually rotated by the polarization rotating unit 13a and the polarization rotating unit 13b, and the optical signals of two orthogonal polarizations are transmitted to the space. As a result, even when the light source 10 is a light source with high coherency, the diversity effect can be achieved.

As described above, the spatial optical transmitter 1 according to the first embodiment modulates an optical signal of a single wavelength in accordance with a signal to be transmitted, divides the modulated optical signal into two, rotates the polarizations of the two divided optical signals, and transmits the two divided optical signals to space as optical signals of two orthogonal polarizations. Since the two optical signals transmitted to space are orthogonal in polarization to each other, they do not interfere with each other and do not cancel each other even if the phases are inverted. As a result, since a diversity effect similar to that in a case where the receiver side has two optical systems can be obtained, stable spatial optical communication can be performed while suppressing an increase in the system scale.

Second Embodiment

Figure 2:
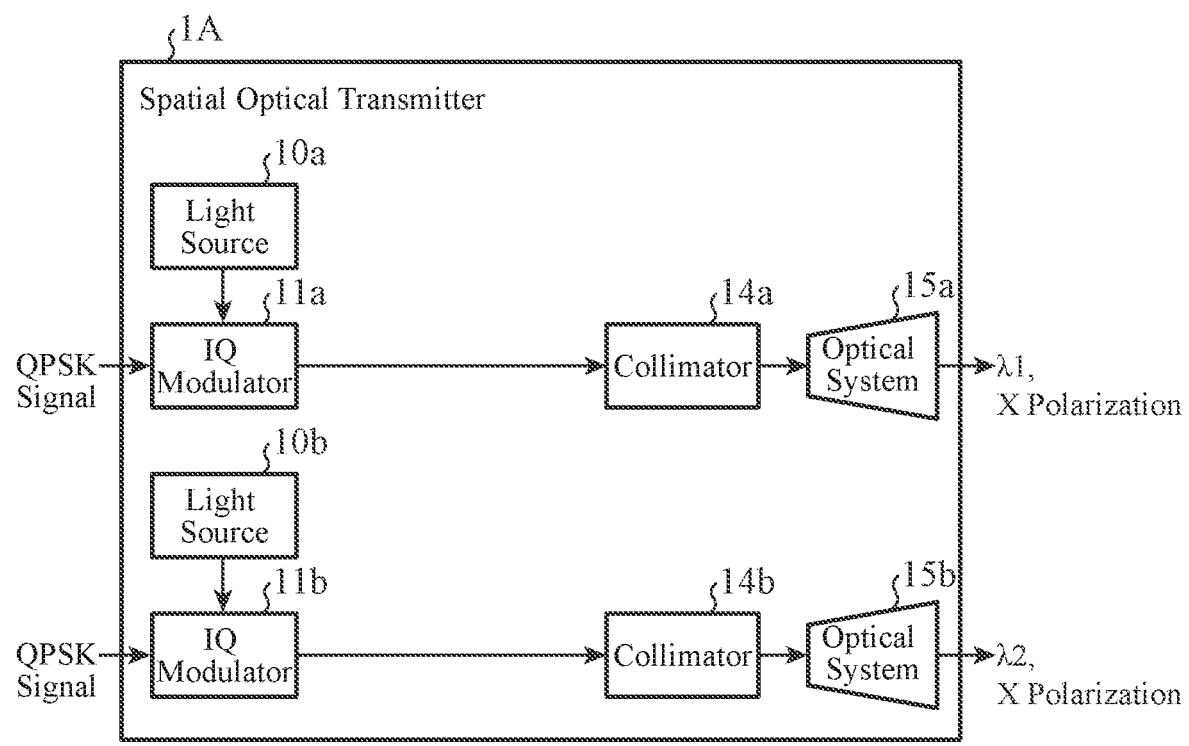
FIG. 2 is a block diagram showing a configuration of a spatial optical transmitter according to a second embodiment.

FIG. 2 is a block diagram showing a configuration of a spatial optical transmitter 1A according to the second embodiment. As shown in FIG. 2, the spatial optical transmitter 1A includes a light source 10a, an IQ modulator 11a, a light source 10b, an IQ modulator 11b, a collimator 14a, a collimator 14b, an optical system 15a, and an optical system 15b. The light source 10a and the light source 10b are light sources for outputting lights of single wavelengths different from each other, and are, for example, semiconductor lasers. In FIG. 2, the light source 10a outputs a light having a wavelength $\lambda 1$, and the light source 10b outputs a light having a wavelength $\lambda 2$ different from $\lambda 1$.

The IQ modulator 11a is a modulation unit for modulating the light output from the light source 10a in accordance with a signal to be transmitted to generate a modulated optical signal of a single polarization. The IQ modulator 11b is a modulation unit for modulating the light output from the light source 10b in accordance with a signal to be transmitted to generate a modulated optical signal of a single polarization. For example, when the signal to be transmitted is a QPSK signal, the IQ modulator 11a modulates the light output from the light source 10a into the same QPSK signal to generate an optical signal of X polarization with a wavelength $\lambda 1$. The IQ modulator 11b modulates the light output from the light source 10b into the same QPSK signal to generate an optical signal of X polarization with a wavelength $\lambda 2$.

The collimator 14a is a transmission-side optical system that inputs the optical signal modulated by the IQ modulator 11a and converts the input optical signal into a parallel light. Furthermore, the collimator 14b is a transmission-side optical system that inputs the optical signal modulated by the IQ modulator 11b and converts the input optical signal into a parallel light. The optical system 15a is a transmission-side optical system that transmits the optical signal modulated by the IQ modulator 11a and converted into a parallel light by the collimator 14a to space. The optical system 15b is a transmission-side optical system that transmits the optical signal modulated by the IQ modulator 11b and converted into a parallel light by the collimator 14b to space.

Each of the optical system 15a and the optical system 15b widens the beam diameter of the input optical signal and then transmits the optical signal into space. The distance between the optical system 15a and the optical system 15b is a value larger than the fried parameter as in the first embodiment. Note that the transmission signal may be a polarization multiplexed signal. Examples of the polarization multiplexed signal include polarization multiplexed QPSK.

In addition, FIG. 2 shows a configuration in which the spatial optical transmitter 1A includes two units each including a light source, an IQ modulator, a collimator, and an optical system, but the spatial optical transmitter 1A may include three or more of the above units. In this case, the light sources included in the respective plurality of units output lights of single wavelengths different from each other.

In the spatial optical transmitter 1A, even if the lights transmitted from the optical system 15a and the optical system 15b are lights with high coherency, since the frequencies of respective carriers are different from each other, they do not interfere with each other and do not cancel each other even if the phases are inverted. Therefore, on the optical receiver side, a diversity effect similar to that in the case of having two reception-side optical systems can be obtained.

As described above, in the spatial optical transmitter 1A according to the second embodiment, lights of single wavelengths different from each other are modulated in accordance with the transmission signal, and a plurality of modulated optical signals are transmitted to space, individually. Since the two optical signals transmitted to the space have different carrier frequencies, they do not interfere with each other and do not cancel each other even if the phases are inverted. Therefore, a diversity effect similar to that in a case where the receiver side has two optical systems can be obtained. This makes it possible to perform stable spatial optical communication while suppressing an increase in system scale.

Third Embodiment

Figure 3:
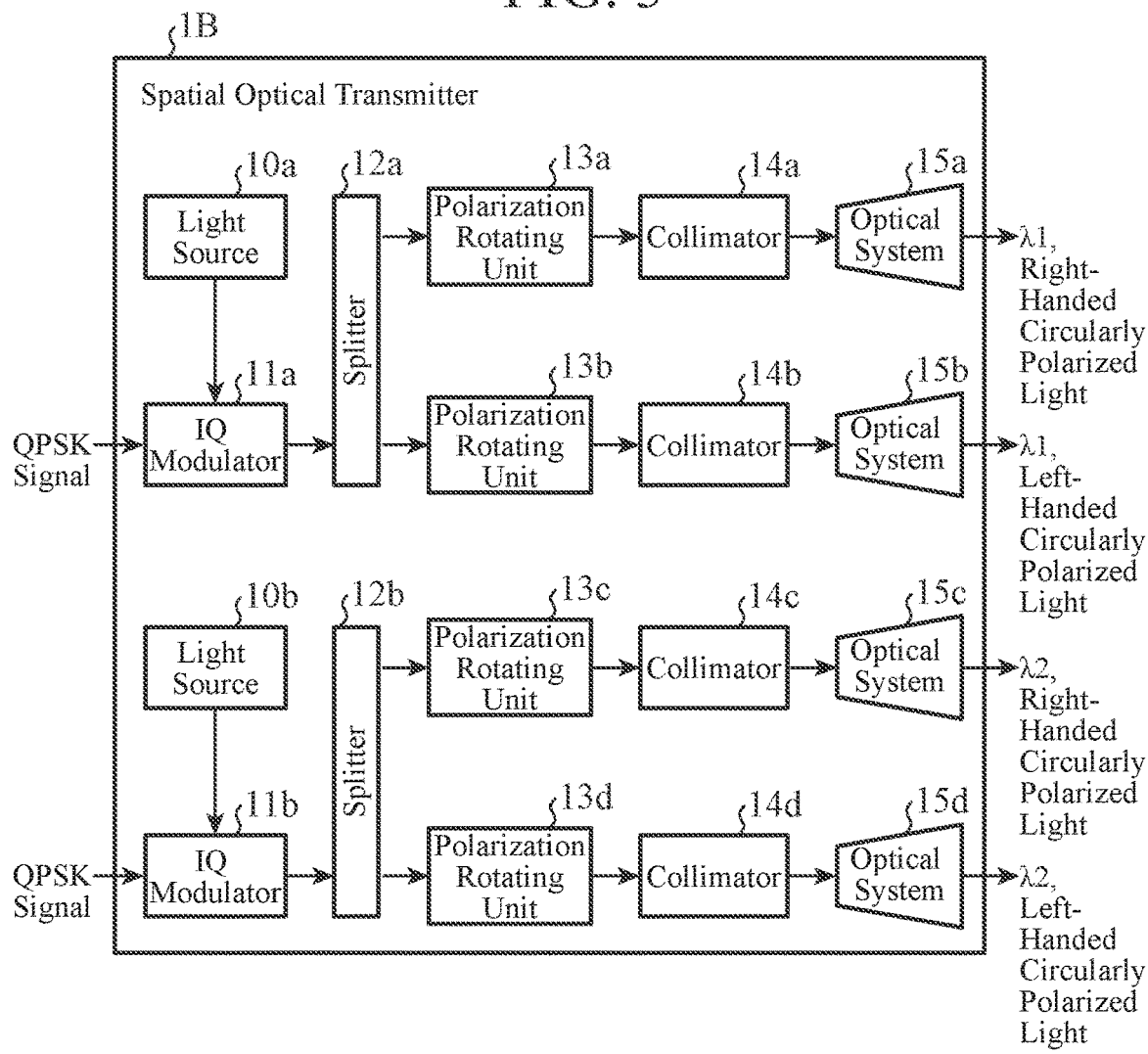
FIG. 3 is a block diagram showing a configuration of a spatial optical transmitter according to a third embodiment.

FIG. 3 is a block diagram showing a configuration of a spatial optical transmitter 1B according to the third embodiment. As shown in FIG. 3, the spatial optical transmitter 1B includes a light source 10a, a light source 10b, an IQ modulator 11a, an IQ modulator 11b, a splitter 12a, a splitter 12b, a polarization rotating unit 13a, a polarization rotating unit 13b, a polarization rotating unit 13c, a polarization rotating unit 13d, a collimator 14a, a collimator 14b, a collimator 14c, a collimator 14d, an optical system 15a, an optical system 15b, an optical system 15c, and an optical system 15d. The light source 10a and the light source 10b are light sources for outputting lights of single wavelengths different from each other, and are, for example, semiconductor lasers. In FIG. 3, the light source 10a outputs a light having a wavelength λ1, and the light source 10b outputs a light having a wavelength λ2 different from λ1.

The IQ modulator 11a is a modulation unit for modulating the light output from the light source 10a in accordance with a signal to be transmitted to generate a modulated optical signal of a single polarization. The IQ modulator 11b is a modulation unit for modulating the light output from the light source 10b in accordance with a signal to be transmitted to generate a modulated optical signal of a single polarization. Similarly to the second embodiment, for example, when the signal to be transmitted is a QPSK signal, the IQ modulator 11a modulates the light output from the light source 10a into the same QPSK signal to generate an optical signal of X polarization with a wavelength λ1. The IQ modulator 11b modulates the light output from the light source 10b into the same QPSK signal to generate an optical signal of X polarization with a wavelength λ2.

The splitter 12a is a transmission-side dividing unit for dividing the optical signal modulated by the IQ modulator 11a into two. The splitter 12b is a transmission-side dividing unit for dividing the optical signal modulated by the IQ modulator 11b into two. The splitter 12a distributes the optical signal modulated by the IQ modulator 11a to the polarization rotating unit 13a and the polarization rotating unit 13b. The splitter 12b distributes the optical signal modulated by the IQ modulator 11b to the polarization rotating unit 13c and the polarization rotating unit 13d.

The polarization rotating unit 13a and the polarization rotating unit 13b rotate the polarizations of the optical signals distributed by the splitter 12a. The optical signal output from the polarization rotating unit 13a and the optical signal output from the polarization rotating unit 13b are optical signals of two orthogonal polarizations, for example, a right-handed circularly polarized light and a left-handed circularly polarized light. The polarization rotating unit 13c and the polarization rotating unit 13d rotate the polarizations of the optical signals distributed by the splitter 12b. The optical signal output from the polarization rotating unit 13c and the optical signal output from the polarization rotating unit 13d are optical signals of two orthogonal polarizations, and are, for example, a right-handed circularly polarized light and a left-handed circularly polarized light.

The collimator 14a is a transmission-side optical system that inputs an optical signal whose polarization has been rotated by the polarization rotating unit 13a and converts the input optical signal into a parallel light. The collimator 14b is a transmission-side optical system that inputs the optical signal whose polarization has been rotated by the polarization rotating unit 13b and converts the input optical signal into a parallel light. The collimator 14c inputs the optical signal whose polarization has been rotated by the polarization rotating unit 13c, and converts the input optical signal into a parallel light. The collimator 14d inputs the optical signal whose polarization has been rotated by the polarization rotating unit 13d, and converts the input optical signal into a parallel light.

The optical system 15a is a transmission-side optical system that transmits, to space, an optical signal whose polarization has been rotated by the polarization rotating unit 13a and which has been converted into a parallel light by the collimator 14a. The optical system 15b is a transmission-side optical system that transmits, to space, an optical signal whose polarization has been rotated by the polarization rotating unit 13b and which has been converted into a parallel light by the collimator 14b. The optical system 15c is a transmission-side optical system that transmits, to space, the optical signal whose polarization has been rotated by the polarization rotating unit 13c and which has been converted into a parallel light by the collimator 14c. The optical system 15d is a transmission-side optical system that transmits, to space, the optical signal whose polarization has been rotated by the polarization rotating unit 13d and which has been converted into a parallel light by the collimator 14d.

In FIG. 3, the right-handed circularly polarized light with the wavelength λ1 is transmitted from the optical system 15a, and the left-handed circularly polarized light with the wavelength λ1 is transmitted from the optical system 15b. Furthermore, the right-handed circularly polarized light with the wavelength λ2 is transmitted from the optical system 15c, and the left-handed circularly polarized light having the wavelength λ2 is transmitted from the optical system 15d.

Each of the optical system 15a, the optical system 15b, the optical system 15c, and the optical system 15d widens the beam diameter of the input optical signal and then transmits the optical signal to space. In addition, similarly to the first embodiment, the interval between each of the optical systems 15a to 15d is a value larger than the fried parameter.

Further, FIG. 3 shows a configuration in which the spatial optical transmitter 1B includes two units each including a light source, a IQ modulator, a splitter, two polarization rotating units, two collimators, and two optical systems, but the spatial optical transmitter 1B may include three or more of the above units.

As described above, in the spatial optical transmitter 1B according to the third embodiment, lights of a plurality of single wavelengths different from each other are modulated in accordance with a transmission signal, each of the modulated optical signals of a plurality of single polarizations are divided into two, polarizations of two optical signals with the same wavelength among the plurality of divided optical signals are rotated to generate a plurality of optical signals of two orthogonal polarizations, and the plurality of generated optical signals are transmitted to space, individually. Among the plurality of optical signals transmitted to the space, the plurality of optical signals with the same wavelength have polarizations orthogonal to each other, do not interfere with each other, and do not cancel each other even if the phases are inverted. Therefore, a diversity effect similar to that in a case where the receiver side has two optical systems can be obtained. This makes it possible to perform stable spatial optical communication while suppressing an increase in system scale.

Fourth Embodiment

Figure 4:
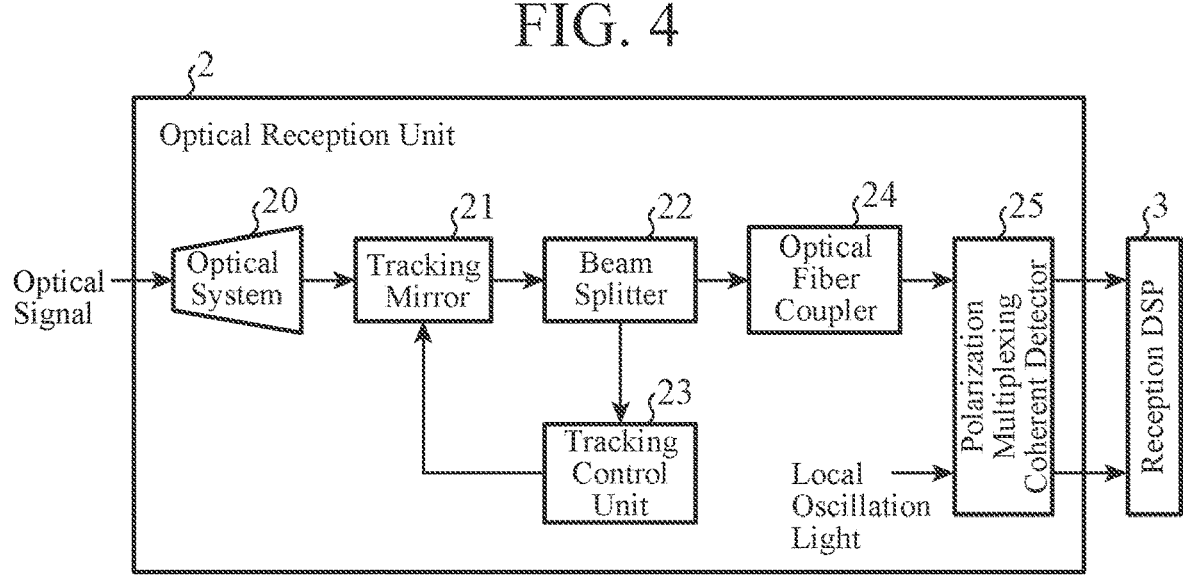
FIG. 4 is a block diagram showing a configuration of an optical reception unit included in a spatial optical communication system according to a fourth embodiment.
Figure 5:
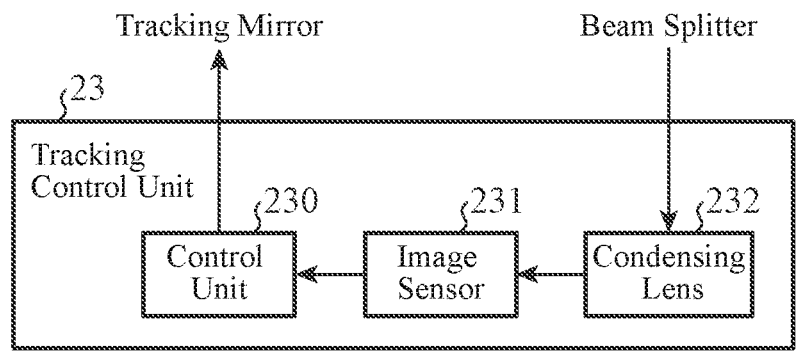
FIG. 5 is a block diagram showing a configuration of a tracking control unit in the fourth embodiment.
Figure 6:
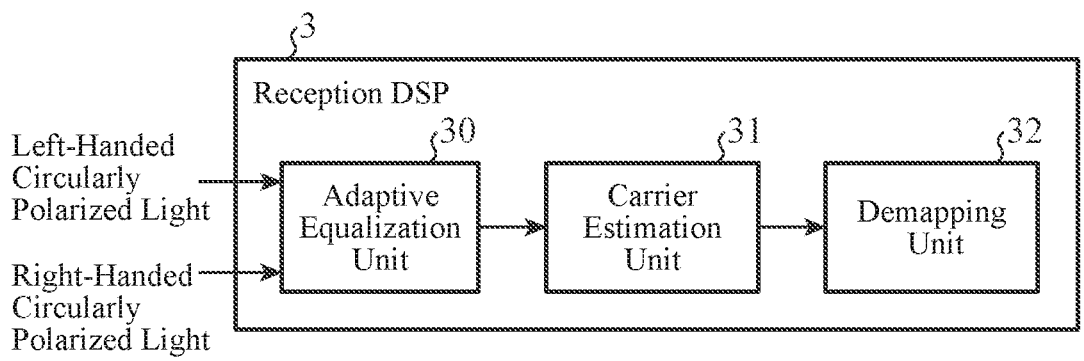
FIG. 6 is a block diagram showing a configuration of a reception DSP included in the spatial optical communication system according to the fourth embodiment.

FIG. 4 is a block diagram showing a configuration of an optical reception unit 2 included in a spatial optical communication system according to the fourth embodiment. FIG. 5 is a block diagram showing a configuration of a tracking control unit 23 in FIG. 4. FIG. 6 is a block diagram showing a configuration of a reception DSP 3 included in the spatial optical communication system according to the fourth embodiment. The spatial optical communication system according to the fourth embodiment includes a spatial optical transmitter and a spatial optical receiver. The spatial optical transmitter is the spatial optical transmitter 1 described in the first embodiment. The transmission signal is, for example, a QPSK signal. The spatial optical receiver includes the optical reception unit 2 and the reception DSP 3.

The optical reception unit 2 is an optical reception unit for receiving an optical signal transmitted from the spatial optical transmitter 1 and propagated in the atmosphere, and is connected to the reception DSP 3 as shown in FIG. 4. In addition, the optical reception unit 2 includes an optical system 20, a tracking mirror 21, a beam splitter 22, a tracking control unit 23, an optical fiber coupler 24, and a polarization multiplexing coherent detector 25. As shown in FIG. 5, the tracking control unit 23 includes a control unit 230, an image sensor 231, and a condensing lens 232. The reception DSP 3 is a reception signal processing unit for performing digital signal processing on the optical signal input from the optical reception unit 2, and includes an adaptive equalization unit 30, a carrier estimation unit 31, and a demapping unit 32 as shown in FIG. 6.

In the optical reception unit 2, the optical system 20 is a reception-side optical system that condenses a light propagating in space. The light condensed by the optical system 20 is output to the tracking mirror 21 as a parallel light. The tracking mirror 21 is a mirror that changes a directional angle of the optical signal condensed by the optical system 20. The beam splitter 22 is a reception-side beam splitter that divides the optical signal output from the tracking mirror 21 into a third optical signal and a fourth optical signal. The tracking control unit 23 detects a directional deviation of the third optical signal divided by the beam splitter 22 and controls the tracking mirror 21 so that the detected directional deviation is compensated.

The optical fiber coupler 24 couples the fourth optical signal whose directional deviation has been compensated using the tracking mirror 21 to an optical fiber. The polarization multiplexing coherent detector 25 performs coherent detection to cause a local oscillation light to interfere with each of the optical signals of two polarizations multiplexed on the fourth optical signal coupled to the optical fiber, to generate two electrical signals corresponding to the optical signals of two orthogonal polarizations. For example, the electrical signal of the right-handed circularly polarized light and the electrical signal of the left-handed circularly polarized light are generated by the polarization multiplexing coherent detector 25, and these electrical signals are output to the reception DSP 3.

In the tracking control unit 23, the control unit 230 controls the tracking mirror 21 depending on the position of a condensing point on the image sensor 231. The image sensor 231 is a sensor that receives a light condensed by the condensing lens 232. The condensing lens 232 is a lens that condenses the first optical signal divided by the beam splitter 22 onto the image sensor 231.

In the reception DSP 3, the adaptive equalization unit 30 adaptively equalizes the electrical signals of two polarizations generated by the polarization multiplexing coherent detector 25 to generate an electrical signal of one polarization. For example, the adaptive equalization unit 30 includes two finite impulse response (FIR) filters, and the sum of the output values of the respective filters is output to the carrier estimation unit 31. The carrier estimation unit 31 performs carrier estimation on the electrical signal of one polarization generated by the adaptive equalization unit 30. The demapping unit 32 demaps the electrical signal on which carrier estimation has been performed by the carrier estimation unit 31.

Next, the operation of the tracking control unit 23 will be described.

Figure 7:
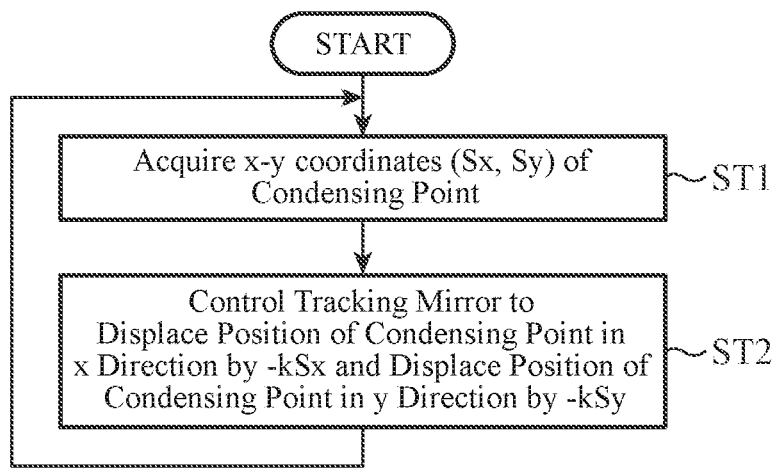
FIG. 7 is a flowchart showing an operation of the tracking control unit in the fourth embodiment.

FIG. 7 is a flowchart showing the operation of the tracking control unit 23.

The condensing lens 232 condenses the third optical signal divided by the beam splitter 22 on a light receiving surface of the image sensor 231. The control unit 230 acquires a position $(S_x, S_y)$ of the condensing point on the x-y coordinates set on the light receiving surface of the image sensor 231 (step ST1). For example, in a case where there is no deviation in the directional angle in the third optical signal, it is assumed that the third optical signal is condensed at the position of the origin of the x-y coordinates set on the light receiving surface of the image sensor 231.

In a case where the coordinates of the condensing point is $(S_x, S_y)$, the control unit 230 controls a drive mechanism of the tracking mirror 21 to displace the position of the condensing point in the x direction by $-kS_x$ and displace the position of the condensing point in the y direction by $-kS_y$ (step ST2). The tracking control unit 23 controls the tracking mirror 21 so that the third optical signal is condensed at the position of the origin of the x-y coordinates set on the light receiving surface of the image sensor 231 by repeating the operation shown in FIG. 7. This compensates for the directional deviation of the third optical signal and the fourth optical signal.

Figure 8:
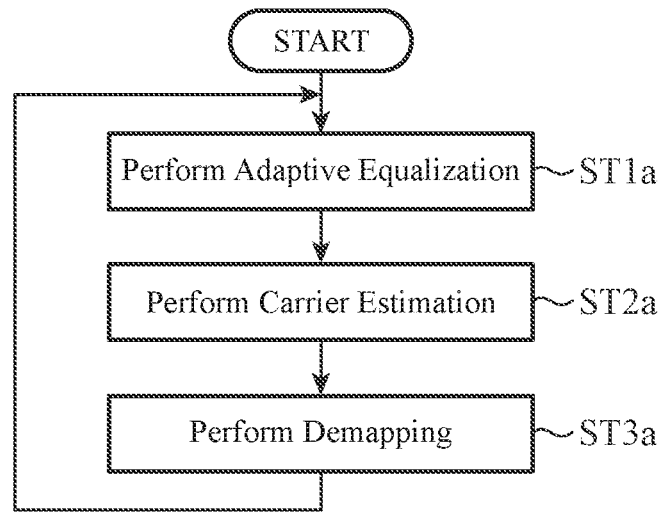
FIG. 8 is a flowchart showing an operation of the reception DSP in the fourth embodiment.

FIG. 8 is a flowchart showing an operation of the reception DSP 3.

The adaptive equalization unit 30 adaptively equalizes the electrical signal of right-handed circular polarization and the electrical signal of left-handed circular polarization generated by the polarization multiplexing coherent detector 25 (step ST1a). For example, in the two FIR filters constituting the adaptive equalization unit 30, tap coefficients that cancel linear distortions of the electrical signals of two polarization are set by the constant envelope reference algorithm. As a result, the output values of the two FIR filters are combined so as to maximize the SN ratio, and the electrical signal of one polarization obtained as a result of the combining is output to the carrier estimation unit 31.

The carrier estimation unit 31 performs carrier estimation on the electrical signal of one polarization generated by the adaptive equalization unit 30 (step ST2a). For example, the carrier estimation unit 31 compensates for the frequency difference and the phase difference between the optical signal output from the light source 10 included in the spatial optical transmitter 1 and the local oscillation light by estimating the carrier of the optical signal from the electrical signal of one polarization.

The demapping unit 32 demaps the electrical signal on which carrier estimation has been performed by the carrier estimation unit 31 (step ST3a). The demapping is processing for decoding data modulated into the received optical signal from the input electrical signal.

Next, the hardware configuration that implements the functions of the tracking control unit 23 will be described.

The functions of the control unit 230 in the tracking control unit 23 are implemented by a processing circuit. That is, the tracking control unit 23 includes a processing circuit for executing the processing from step ST1 to step ST2 in FIG. 7. The processing circuit may be dedicated hardware or a central processing unit (CPU) that executes a program stored in a memory.

Figure 9A:
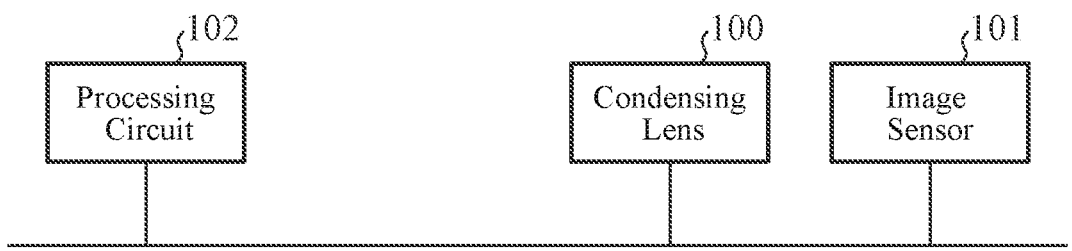
FIG. 9A is a block diagram showing a hardware configuration for implementing functions of the tracking control unit in the fourth embodiment.
Figure 9B:
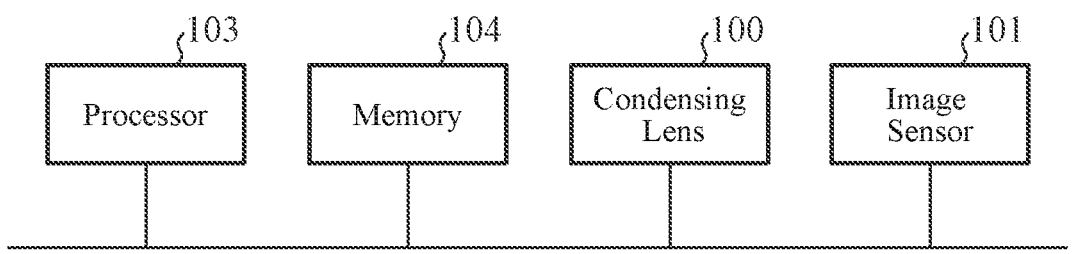
FIG. 9B is a block diagram showing a hardware configuration for executing software that implements functions of the tracking control unit in the fourth embodiment.

FIG. 9A is a block diagram showing a hardware configuration for implementing the functions of the tracking control unit 23. FIG. 9B is a block diagram showing a hardware configuration for executing software that implements the functions of the tracking control unit 23. In FIGS. 9A and 9B, a condensing lens 100 is the condensing lens 232 shown in FIG. 5, and an image sensor 101 is the image sensor 231 shown in FIG. 5. The image sensor 101 is, for example, a solid-state imaging element.

When the processing circuit is a processing circuit 102 of dedicated hardware shown in FIG. 9A, the processing circuit 102 corresponds, for example, to a single circuit, a composite circuit, a programmed processor, a parallel-programmed processor, an application specific integrated circuit (ASIC), a field-programmable gate array (FPGA), or a combination thereof. The functions of the control unit 230 may be implemented by separate processing circuits, or these functions may be collectively implemented by a single processing circuit.

When the processing circuit is a processor 103 shown in FIG. 9B, the functions of the control unit 230 are implemented by software, firmware, or a combination of software and firmware. Note that, software or firmware is written as a program and stored in a memory 104.

The processor 103 implements the functions of the control unit 230 by reading and executing the program stored in the memory 104. For example, the tracking control unit 23 includes the memory 104 for storing a program which when executed by the processor 103, allows the processing from step ST1 to step ST2 of the flowchart shown in FIG. 7 to be executed as a result. This program causes a computer to execute a procedure or a method performed by the control unit 230. The memory 104 may be a computer-readable storage medium that stores a program for causing the computer to function as the tracking control unit 23.

Examples of the memory 104 correspond to a nonvolatile or volatile semiconductor memory, such as a random access memory (RAM), a read only memory (ROM), a flash memory, an erasable programmable read only memory (EPROM), or an electrically-EPROM (EEPROM), a magnetic disk, a flexible disk, an optical disk, a compact disk, a mini disk, and a DVD.

Part of the functions of the control unit 230 may be implemented by dedicated hardware, and part of the functions may be implemented by software or firmware. Thus, the processing circuit can implement the above functions by hardware, software, firmware, or a combination thereof.

As described above, in the spatial optical communication system according to the fourth embodiment, the optical signal transmitted from the spatial optical transmitter 1 is received by the optical system 20 included in the spatial optical receiver. In the spatial optical receiver, a directional deviation of the optical signal received by the optical system 20 is compensated, coherent detection is performed on the optical signal whose directional deviation has been compensated to generate two electrical signals corresponding to the optical signals of two orthogonal polarizations, the electrical signals of two polarizations are adaptively equalized to generate an electrical signal of one polarization, carrier estimation is performed on the electrical signal of one polarization, and the electrical signal on which carrier estimation has been performed is demapped. The optical signals of two polarizations transmitted from the optical systems 15a and 15b included in the spatial optical transmitter 1 are coherently detected in the optical reception unit 2 without interfering with each other. Since the signals of two polarizations are combined so as to maximize the SN ratio by the adaptive equalization, the effect of diversity can be obtained in the spatial optical receiver. Furthermore, by using the FIR filter for the adaptive equalization unit 30, it is also possible to compensate for the deviation of the two lights on the time axis.

Fifth Embodiment

Figure 10:
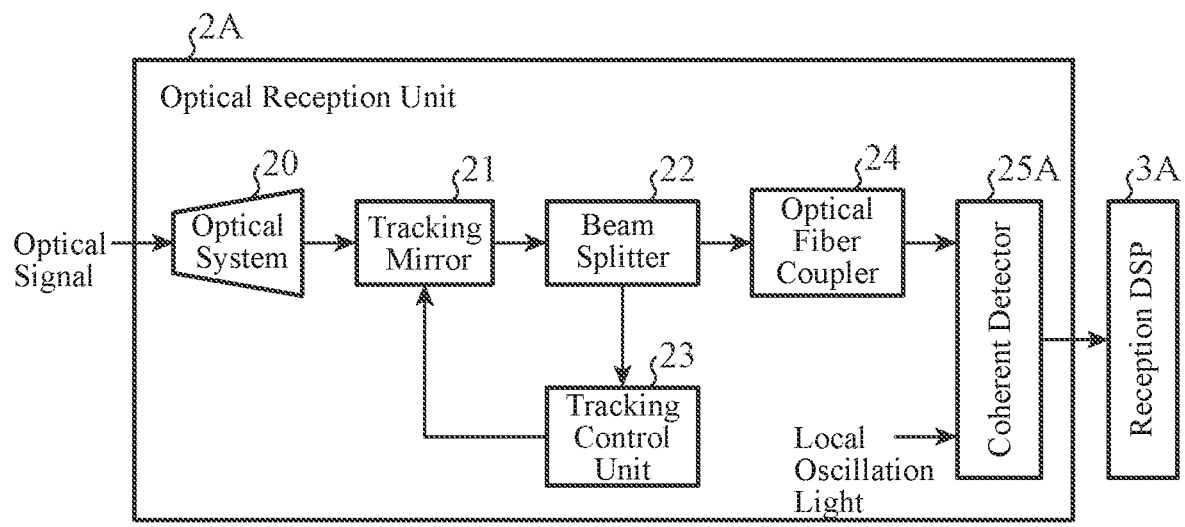
FIG. 10 is a block diagram showing a configuration of an optical reception unit included in a spatial optical communication system according to a fifth embodiment.
Figure 11:
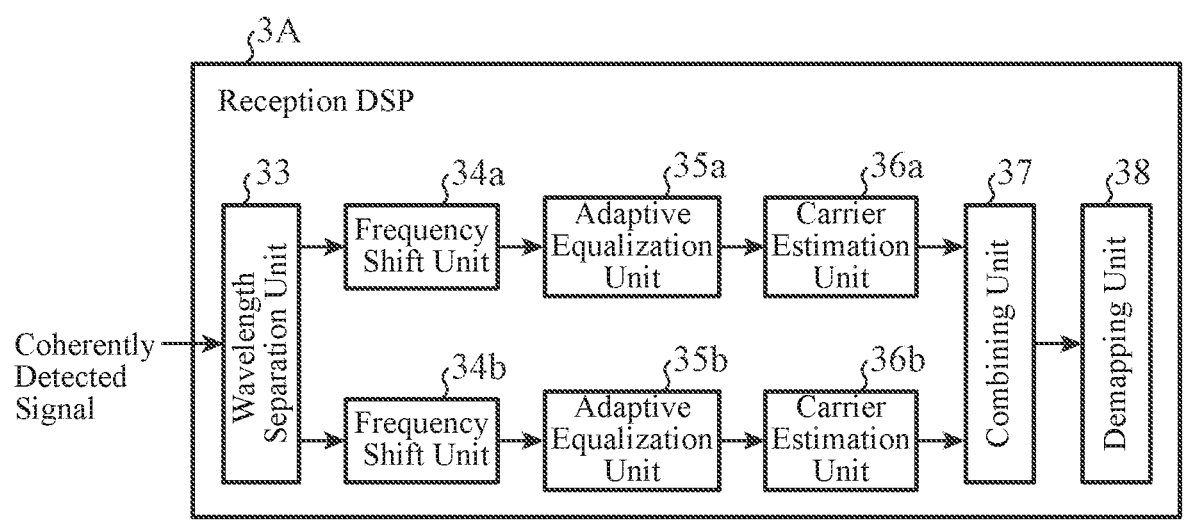
FIG. 11 is a block diagram showing a configuration of a reception DSP included in the spatial optical communication system according to the fifth embodiment.

FIG. 10 is a block diagram showing a configuration of an optical reception unit 2A included in a spatial optical communication system according to the fifth embodiment. FIG. 11 is a block diagram showing a configuration of a reception DSP 3A included in the spatial optical communication system according to the fifth embodiment. The spatial optical communication system according to the fifth embodiment includes a spatial optical transmitter and a spatial optical receiver. The spatial optical transmitter is the spatial optical transmitter 1A described in the second embodiment. The transmission signal is a QPSK signal. The spatial optical receiver includes an optical reception unit 2A and a reception DSP 3A.

The optical reception unit 2A is an optical reception unit for receiving an optical signal transmitted from the spatial optical transmitter 1A and propagated in the atmosphere, and is connected to the reception DSP 3A as shown in FIG. 10. The optical reception unit 2A includes an optical system 20, a tracking mirror 21, a beam splitter 22, a tracking control unit 23, an optical fiber coupler 24, and a coherent detector 25A. The reception DSP 3A is a reception signal processing unit for performing digital signal processing on the optical signal input from the optical reception unit 2A, and includes a wavelength separation unit 33, a frequency shift unit 34a, a frequency shift unit 34b, an adaptive equalization unit 35a, an adaptive equalization unit 35b, a carrier estimation unit 36a, a carrier estimation unit 36b, a combining unit 37, and a demapping unit 38 as shown in FIG. 11.

In the optical reception unit 2A, the optical system 20 is a reception-side optical system that condenses a light propagating in space. The light condensed by the optical system 20 is output to the tracking mirror 21 as a parallel light. The tracking mirror 21 is a mirror that changes a directional angle of the optical signal condensed by the optical system 20. The beam splitter 22 is a reception-side beam splitter that divides the optical signal output from the tracking mirror 21 into a third optical signal and a fourth optical signal. The tracking control unit 23 detects the directional deviation of the third optical signal divided by the beam splitter 22 and controls the tracking mirror 21 so that the detected directional deviation is compensated. The optical fiber coupler 24 couples the fourth optical signal whose directional deviation has been compensated using the tracking mirror 21 to an optical fiber.

The coherent detector 25A performs coherent detection to cause a local oscillation light to interfere with the fourth optical signal coupled to the optical fiber by the optical fiber coupler 24 to generate an electrical signal.

For example, the coherent detector 25A generates an electrical signal corresponding to the X-polarization of the wavelength $\lambda 1$ and an electrical signal corresponding to the X-polarization of the wavelength $\lambda 2$, and these electrical signals are output to the reception DSP 3A as one signal.

Note that, when the optical signal transmitted from the spatial optical transmitter is a single polarization, the coherent detector 25A coherently detects only the single polarization. Furthermore, when the optical signal transmitted from the spatial optical transmitter is a polarization multiplexed signal, the coherent detector 25A performs coherent detection to cause a local oscillation light to interfere with each of the optical signals of two polarizations multiplexed on the fourth optical signal, similarly to the polarization multiplexing coherent detector 25.

In the reception DSP 3A, the wavelength separation unit 33 separates the electrical signal generated by the coherent detector 25A in accordance with the frequency corresponding to each of the single wavelengths $\lambda 1$ and $\lambda 2$. The frequency shift unit 34a frequency-shifts the electrical signal separated by the wavelength separation unit 33 in accordance with the frequency of the wavelength $\lambda 1$ to generate an electrical signal of a baseband signal. The frequency shift unit 34b frequency-shifts the electrical signal separated by the wavelength separation unit 33 in accordance with the frequency of the wavelength $\lambda 2$ to generate an electrical signal of a baseband signal.

The adaptive equalization unit 35a adaptively equalizes the electrical signal generated by the frequency shift unit 34a. The adaptive equalization unit 35b adaptively equalizes the electrical signal generated by the frequency shift unit 34b. The carrier estimation unit 36a performs carrier estimation on the electrical signal on which adaptive equalization has been performed by the adaptive equalization unit 35a. The carrier estimation unit 36b performs carrier estimation on the electrical signal on which adaptive equalization has been performed by the adaptive equalization unit 35b. The combining unit 37 combines the electrical signal on which carrier estimation has been performed by the carrier estimation unit 36a and the electrical signal on which carrier estimation has been performed by the carrier estimation unit 36b to output one electrical signal. The demapping unit 38 demaps the electrical signal combined by the combining unit 37.

FIG. 11 shows a configuration in which the reception DSP 3A includes two units each including a frequency shift unit, an adaptive equalization unit, and a carrier estimation unit at a subsequent stage of the wavelength separation unit 33.

Note that, when the spatial optical transmitter 1A transmits optical signals of three or more single wavelengths, the reception DSP 3A may include three or more of the above units depending on the number of single wavelengths that are transmission wavelengths.

In this case, the wavelength separation unit 33 separates the reception signal coherently detected by the coherent detector 25A in accordance with the frequencies corresponding to the respective transmission wavelengths, and outputs the separated signals to the plurality of units described above. In each of the above units, the frequency shift unit performs a frequency shift of a signal corresponding to any one of three or more single wavelengths separated by the wavelength separation unit 33 and converts the signal into a baseband signal. The adaptive equalization unit adaptively equalizes a baseband signal corresponding to any one of three or more single wavelengths. The carrier estimation unit performs carrier estimation on the electrical signal corresponding to any one of three or more single wavelengths on which adaptive equalization has been performed by the adaptive equalization unit. The combining unit 37 combines the electrical signals output from the three or more units. The demapping unit demaps the signal combined by the combining unit.

Next, the operation of the reception DSP 3A will be described.

Figure 12:
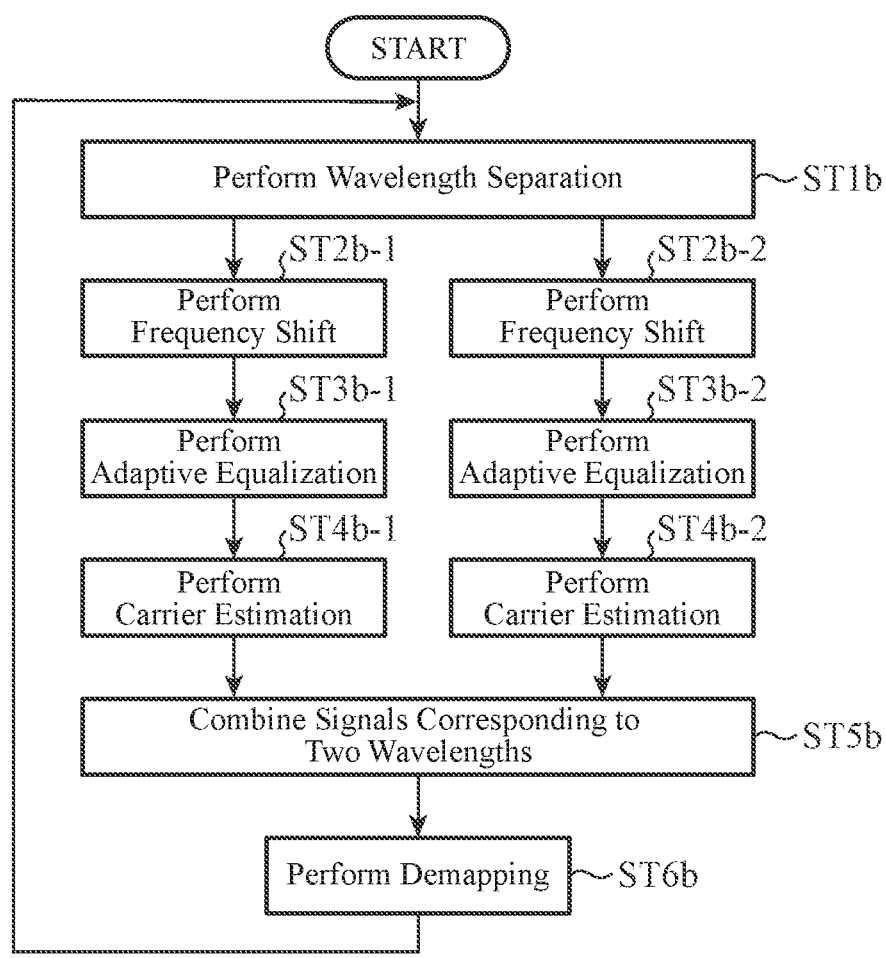
FIG. 12 is a flowchart showing an operation of the reception DSP in the fifth embodiment.

FIG. 12 is a flowchart showing an operation of the reception DSP 3A.

The wavelength separation unit 33 separates the electrical signal coherently detected by the coherent detector 25A in accordance with the frequency corresponding to each of the single wavelengths $\lambda 1$ and $\lambda 2$ that are transmission wavelengths (step ST1b). For example, the wavelength separation unit 33 separates signals corresponding to the transmission wavelengths $\lambda 1$ and $\lambda 2$ using filters that pass signals having frequency corresponding to each of the wavelengths $\lambda 1$ and $\lambda 2$.

The frequency shift unit 34a frequency-shifts the electrical signal corresponding to the wavelength $\lambda 1$ separated by the wavelength separation unit 33 to generate an electrical signal of a baseband signal (step ST2b-1). The frequency shift unit 34b frequency-shifts the electrical signal corresponding to the wavelength $\lambda 2$ separated by the wavelength separation unit 33 to generate an electrical signal of a baseband signal (step ST2b-2).

Subsequently, the adaptive equalization unit 35a adaptively equalizes the signal converted into the baseband signal by the frequency shift unit 34a to compensate for linear distortion in the signal (step ST3b-1). The adaptive equalization unit 35b adaptively equalizes the signal converted into the baseband signal by the frequency shift unit 34b to compensate for linear distortion in the signal (step ST3b-2).

For example, each of the adaptive equalization unit 35a and the adaptive equalization unit 35b includes an FIR filter, and performs adaptive equalization of an electrical signal by a constant envelope reference algorithm.

The carrier estimation unit 36a performs carrier estimation on the electrical signal corresponding to the wavelength $\lambda 1$ on which the adaptive equalization has been performed by the adaptive equalization unit 35a (step ST4b-1). The carrier estimation unit 36b performs carrier estimation on the electrical signal corresponding to the wavelength $\lambda 2$ on which the adaptive equalization has been performed by the adaptive equalization unit 35b (step ST4b-2). For example, the carrier estimation unit 36a and the carrier estimation unit 36b compensate for the frequency difference and the phase difference between the optical signals output from the light source 10 included in the spatial optical transmitter 1A and the local oscillation lights by estimating the carriers of the optical signals from the electrical signals.

The combining unit 37 combines the signal corresponding to the wavelength λ1 output from the carrier estimation unit 36a and the signal corresponding to the wavelength λ2 output from the carrier estimation unit 36b (step ST5b). For the combining, for example, maximum ratio combining is used. The QPSK signal obtained by combining the signal corresponding to the wavelength λ1 and the signal corresponding to the wavelength λ2 is output to the demapping unit 38.

The demapping unit 38 demaps the QPSK signal generated by the combining unit 37 (step ST6b).

As described above, in the spatial optical communication system according to the fifth embodiment, the reception DSP 3A separates the electrical signal of the reception signal coherently detected in the optical reception unit 2A in accordance with the frequency corresponding to each of the plurality of single wavelengths which are transmission wavelengths, adaptively equalizes the electrical signals obtained by frequency-shifting the separated electrical signals, performs carrier estimation on the plurality of electrical signals on which adaptive equalization has been performed, combines the plurality of electrical signals on which carrier estimation has been performed into one electrical signal, and demaps the combined electrical signal.

Since the optical signals transmitted from the spatial optical transmitter 1A have different carrier frequencies, the optical signals are coherently detected in the optical reception unit 2A without interfering with each other. Since adaptive equalization and carrier estimation are performed on the signals corresponding to the respective transmission wavelengths, and then these signals are combined (for example, maximum ratio combining), these signals are combined so as to maximize the SN ratio. Therefore, in the spatial optical receiver, an effect of diversity can be obtained. Furthermore, the FIR filters are used for the adaptive equalization unit 35a and the adaptive equalization unit 35b, so that the deviation of the light on the time axis is also compensated.

Although the case where the spatial optical communication system according to the fifth embodiment includes the spatial optical transmitter 1A has been described so far, the spatial optical transmitter 1B described in the third embodiment may be included instead of the spatial optical transmitter 1A. The spatial optical receiver includes, for example, the optical reception unit 2 described in the fourth embodiment and includes the reception DSP 3A shown in FIG. 11. The reception DSP 3A operates according to the procedure shown in FIG. 12, and each of the adaptive equalization unit 35a and the adaptive equalization unit 35b adaptively equalizes a signal of two polarizations and outputs a signal of single polarization. Since the polarizations of the signals corresponding to the same wavelength are orthogonal to each other, the optical signals transmitted from the four optical systems of the spatial optical transmitter 1B are coherently detected in the optical reception unit 2 without interfering with each other. Since the adaptive equalization and the carrier estimation are performed on the signals corresponding to the respective transmission wavelengths, and then these signals are combined (for example, maximum ratio combining), these signals are combined so as to maximize the SN ratio.

Therefore, in the spatial optical receiver, an effect of diversity can be obtained. Furthermore, the FIR filters are used for the adaptive equalization unit 35a and the adaptive equalization unit 35b, so that the deviation of the light on the time axis is also compensated.

Sixth Embodiment

Figure 13:
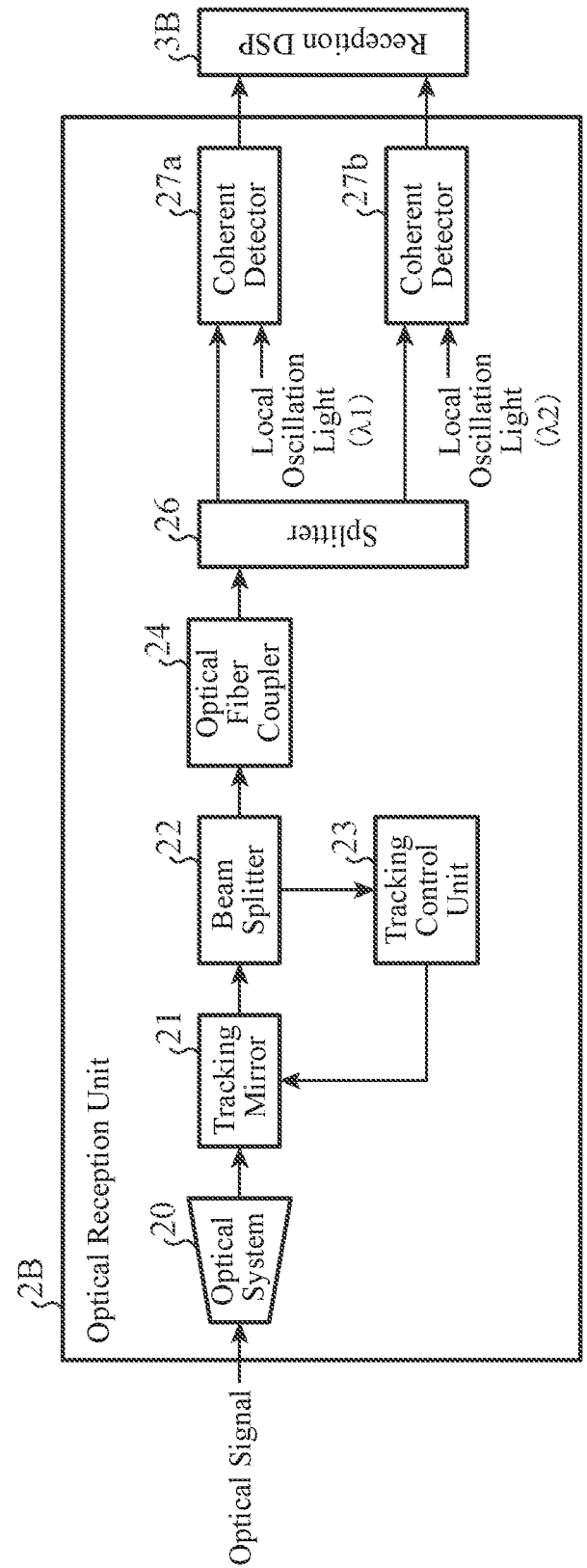
FIG. 13 is a block diagram showing a configuration of an optical reception unit included in a spatial optical communication system according to a sixth embodiment.
Figure 14:
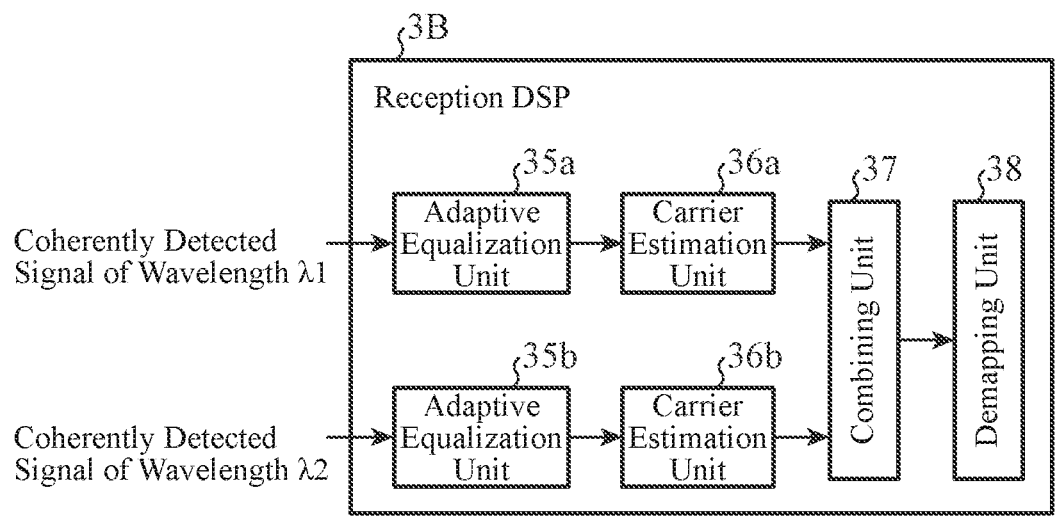
FIG. 14 is a block diagram showing a configuration of a reception DSP included in the spatial optical communication system according to the sixth embodiment.

FIG. 13 is a block diagram showing a configuration of an optical reception unit 2B included in a spatial optical communication system according to the sixth embodiment. FIG. 14 is a block diagram showing a configuration of a reception DSP 3B included in the spatial optical communication system according to the sixth embodiment. The spatial optical communication system according to the sixth embodiment includes a spatial optical transmitter and a spatial optical receiver. The spatial optical transmitter is the spatial optical transmitter 1A described in the second embodiment. The transmission signal is a QPSK signal. The spatial optical receiver includes the optical reception unit 2B and the reception DSP 3B.

The optical reception unit 2B is an optical reception unit for receiving an optical signal transmitted from the spatial optical transmitter 1A and propagated in the atmosphere, and is connected to the reception DSP 3B as shown in FIG. 13. The optical reception unit 2B includes an optical system 20, a tracking mirror 21, a beam splitter 22, a tracking control unit 23, an optical fiber coupler 24, a splitter 26, a coherent detector 27a, and a coherent detector 27b. The reception DSP 3B is a reception signal processing unit for performing digital signal processing on the optical signal input from the optical reception unit 2B, and includes an adaptive equalization unit 35a, an adaptive equalization unit 35b, a carrier estimation unit 36a, a carrier estimation unit 36b, a combining unit 37, and a demapping unit 38 as shown in FIG. 14.

In the optical reception unit 2B, the optical system 20 is a reception-side optical system that condenses a light propagating in space. The light condensed by the optical system 20 is output to the tracking mirror 21 as a parallel light. The tracking mirror 21 is a mirror that changes a directional angle of the optical signal condensed by the optical system 20. The beam splitter 22 is a reception-side beam splitter that divides the optical signal output from the tracking mirror 21 into a third optical signal and a fourth optical signal. The tracking control unit 23 detects the directional deviation of the third optical signal divided by the beam splitter 22 and controls the tracking mirror 21 so that the detected directional deviation is compensated. The optical fiber coupler 24 couples the fourth optical signal whose directional deviation has been compensated using the tracking mirror 21 to an optical fiber.

The splitter 26 is a reception-side dividing unit for dividing the fourth optical signal coupled to the optical fiber by the optical fiber coupler 24 into two optical signals corresponding to the transmission wavelength λ1 and the transmission wavelength λ2. The coherent detector 27a performs coherent detection to cause a local oscillation light having the wavelength λ1 to interfere with the optical signal having the same wavelength λ1 divided from the fourth optical signal by the splitter 26 to generate an electrical signal. Similarly, the coherent detector 27b performs coherent detection to cause a local oscillation light having the wavelength λ2 to interfere with the optical signal having the same wavelength λ2 divided from the fourth optical signal by the splitter 26 to generate an electrical signal.

Note that, when the optical signal transmitted from the spatial optical transmitter is a single polarization, the coherent detector 27a and the coherent detector 27b coherently detect only the single polarization.

In addition, when the optical signal transmitted from the spatial optical transmitter is a polarization multiplexed signal, the coherent detector 27a and the coherent detector 27b perform coherent detection to cause local oscillation lights to interfere with the optical signals of two polarizations multiplexed on the fourth optical signal, similarly to the polarization multiplexing coherent detector 25.

In the reception DSP 3B, the adaptive equalization unit 35a adaptively equalizes the signal having the wavelength $\lambda 1$ coherently detected by the coherent detector 27a. The adaptive equalization unit 35b adaptively equalizes the signal having the wavelength $\lambda 2$ coherently detected by the coherent detector 27b. Furthermore, when the coherent detector 27a and the coherent detector 27b generate two electrical signals corresponding to the optical signals of two orthogonal polarizations, individually, the adaptive equalization unit 35a and the adaptive equalization unit 35b adaptively equalize the two electrical signals to generate electrical signals of one polarization, individually. The carrier estimation unit 36a performs carrier estimation on the electrical signal on which adaptive equalization has been performed by the adaptive equalization unit 35a. Furthermore, the carrier estimation unit 36b performs carrier estimation on the electrical signal on which adaptive equalization has been performed by the adaptive equalization unit 35b. The combining unit 37 combines the electrical signal on which carrier estimation has been performed by the carrier estimation unit 36a and the electrical signal on which carrier estimation has been performed by the carrier estimation unit 36b to output one electrical signal. The demapping unit 38 demaps the electrical signal combined by the combining unit 37.

Note that FIG. 14 shows a configuration in which the reception DSP 3B includes two units each including the adaptive equalization unit and the carrier estimation unit. Note that, when the spatial optical transmitter 1A transmits optical signals of three or more single wavelengths, the reception DSP 3B may include three or more of the above units depending on the number of single wavelengths that are transmission wavelengths. In this case, to the three or more units, the reception signals coherently detected by the coherent detector 25A are input for each transmission wavelength. In each of the above units, the adaptive equalization unit adaptively equalizes a baseband signal corresponding to any one of three or more single wavelengths. The carrier estimation unit performs carrier estimation on the electrical signal corresponding to any one of three or more single wavelengths on which adaptive equalization has been performed by the adaptive equalization unit. The combining unit 37 combines the electrical signals output from the three or more units. The demapping unit 38 demaps the signal combined by the combining unit.

Next, the operation of the reception DSP 3B will be described.

Figure 15:
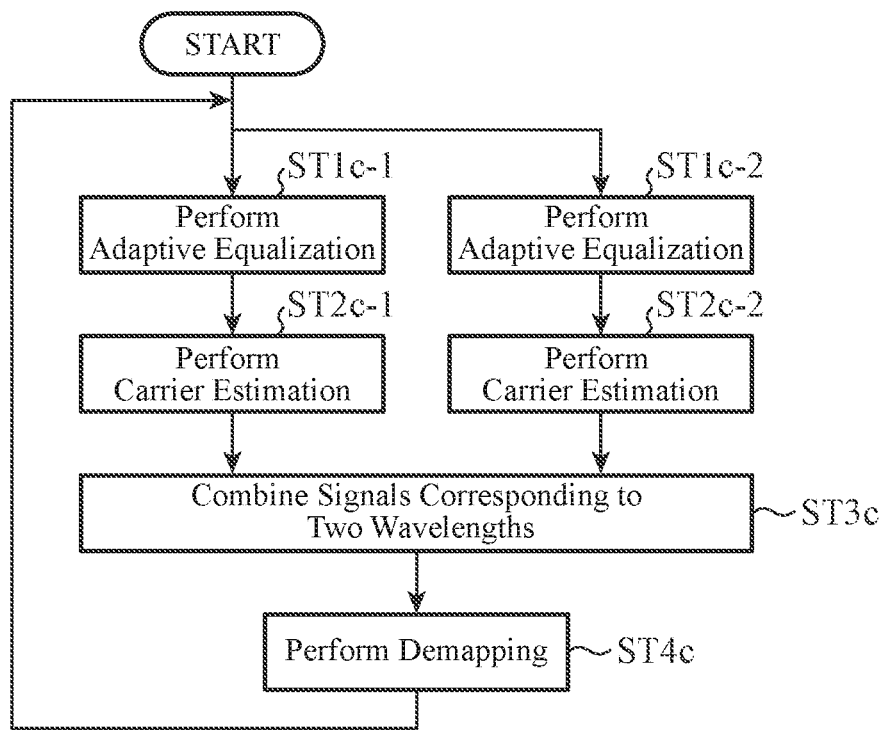
FIG. 15 is a flowchart showing an operation of the reception DSP in the sixth embodiment.

FIG. 15 is a flowchart showing an operation of the reception DSP 3B.

The adaptive equalization unit 35a adaptively equalizes the signal having the wavelength $\lambda 1$ coherently detected by the coherent detector 27a to compensate for linear distortion in the signal (step ST1c-1). The adaptive equalization unit 35b adaptively equalizes the signal having the wavelength $\lambda 2$ coherently detected by the coherent detector 27b to compensate for linear distortion in the signal (step ST1c-2). For example, each of the adaptive equalization unit 35a and the adaptive equalization unit 35b includes an FIR filter, and performs adaptive equalization of an electrical signal by a constant envelope reference algorithm.

The carrier estimation unit 36a performs carrier estimation on the electrical signal corresponding to the wavelength $\lambda 1$ on which the adaptive equalization has been performed by the adaptive equalization unit 35a (step ST2c-1). The carrier estimation unit 36b performs carrier estimation on the electrical signal corresponding to the wavelength $\lambda 2$ on which the adaptive equalization has been performed by the adaptive equalization unit 35b (step ST2c-2). For example, the carrier estimation unit 36a and the carrier estimation unit 36b compensate for the frequency difference and the phase difference between the optical signals output from the light source 10 included in the spatial optical transmitter 1A and the local oscillation lights by estimating the carriers of the optical signals from the electrical signals.

The combining unit 37 combines the signal corresponding to the wavelength $\lambda 1$ output from the carrier estimation unit 36a and the signal corresponding to the wavelength $\lambda 2$ output from the carrier estimation unit 36b (step ST3c). For the combining, for example, maximum ratio combining is used. The QPSK signal obtained by combining the signal corresponding to the wavelength $\lambda 1$ and the signal corresponding to the wavelength $\lambda 2$ is output to the demapping unit 38.

The demapping unit 38 demaps the QPSK signal generated by the combining unit 37 (step ST4c).

As described above, in the spatial optical communication system according to the sixth embodiment, the reception DSP 3B adaptively equalizes the electrical signals of the reception signal coherently detected in the optical reception unit 2B, performs carrier estimation on the plurality of electrical signals on which adaptive equalization has been performed, combines the plurality of electrical signals on which carrier estimation has been performed into one electrical signal, and demaps the combined electrical signal.

Since the optical signals transmitted from the spatial optical transmitter 1A have different carrier frequencies, the optical signals are coherently detected in the optical reception unit 2B without interfering with each other. Since adaptive equalization and carrier estimation are performed on the signals corresponding to the respective transmission wavelengths, and then these signals are combined (for example, maximum ratio combining), these signals are combined so as to maximize the SN ratio. Therefore, in the spatial optical receiver, an effect of diversity can be obtained. Furthermore, the FIR filters are used for the adaptive equalization unit 35a and the adaptive equalization unit 35b, so that the deviation of the light on the time axis is also compensated.

Although the case where the spatial optical communication system according to the sixth embodiment includes the spatial optical transmitter 1A has been described so far, the spatial optical transmitter 1B described in the third embodiment may be included instead of the spatial optical transmitter 1A. The spatial optical receiver includes the optical reception unit 2A shown in the sixth embodiment and includes the reception DSP 3B shown in FIG. 14. The reception DSP 3B operates according to the procedure shown in FIG. 15, and the adaptive equalization unit 35a and the adaptive equalization unit 35b adaptively equalize signals of two polarizations and output signals of single polarization. Since the polarizations of the signals corresponding to the same wavelength are orthogonal to each other, the optical signals transmitted from the four optical systems of the spatial optical transmitter 1B are coherently detected in the optical reception unit 2A without interfering with each other. Since the adaptive equalization and the carrier estimation are performed on the signals corresponding to the respective transmission wavelengths, and then these signals are combined (for example, maximum ratio combining), these signals are combined so as to maximize the SN ratio. Therefore, in the spatial optical receiver, an effect of diversity can be obtained. Furthermore, the FIR filters are used for the adaptive equalization unit 35a and the adaptive equalization unit 35b, so that the deviation of the light on the time axis is also compensated.

Seventh Embodiment

Figure 16:
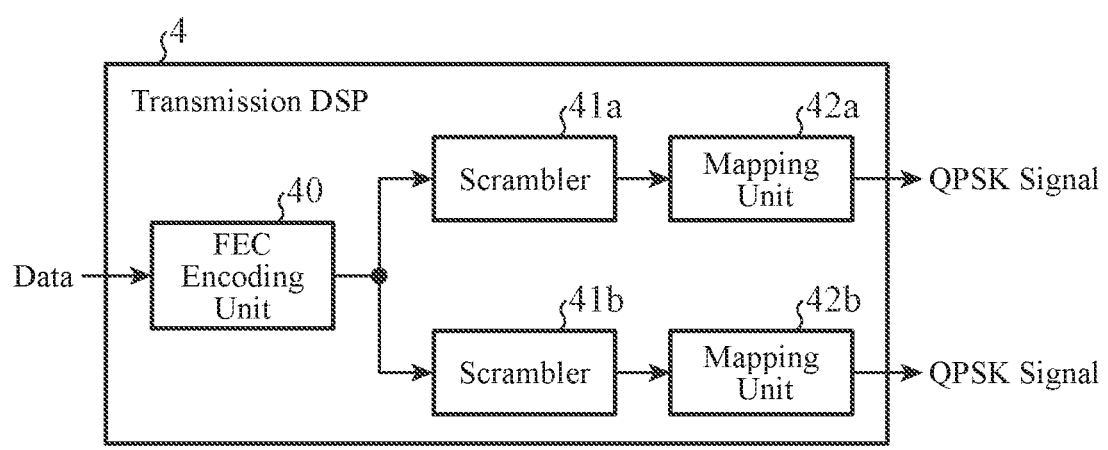
FIG. 16 is a block diagram showing a configuration of a transmission DSP included in a spatial optical communication system according to a seventh embodiment.
Figure 17:
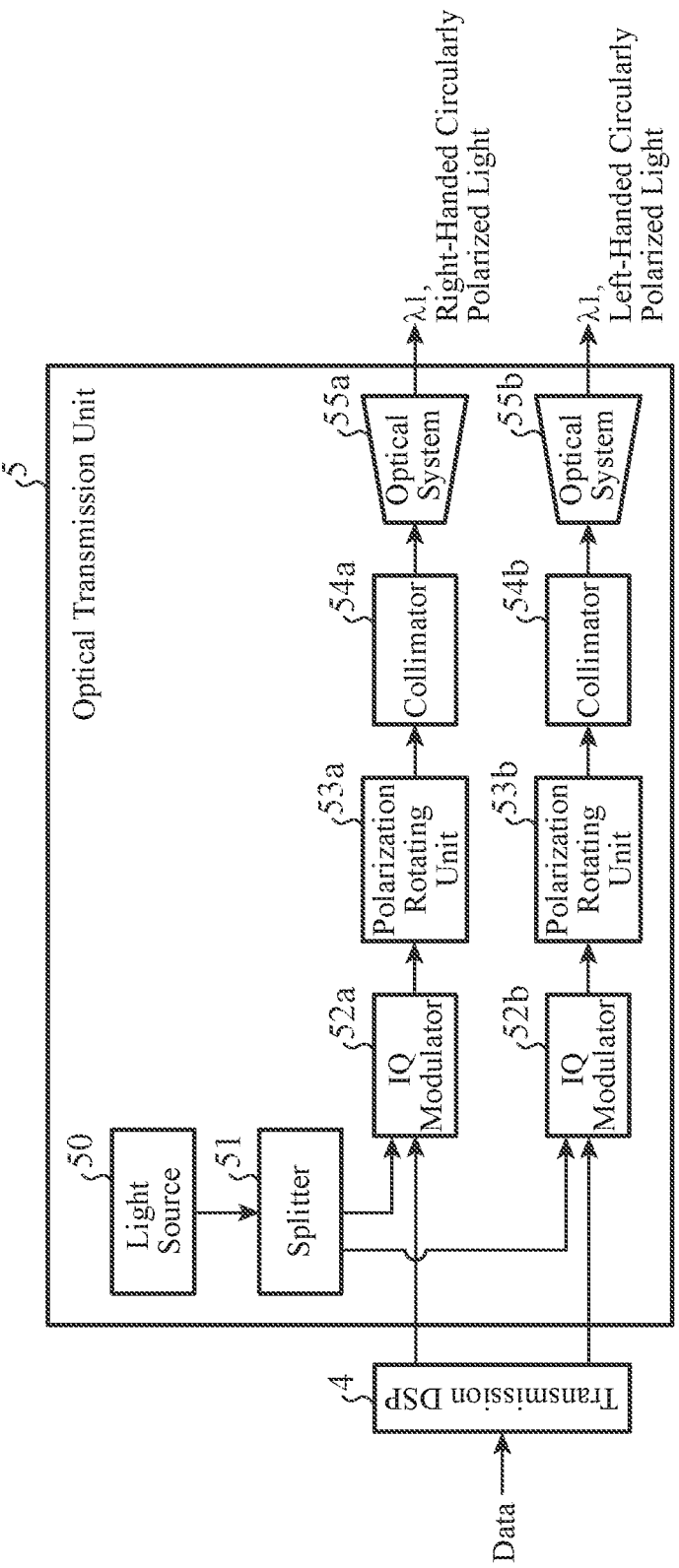
FIG. 17 is a block diagram showing a configuration of an optical transmission unit included in the spatial optical communication system according to the seventh embodiment.
Figure 18:
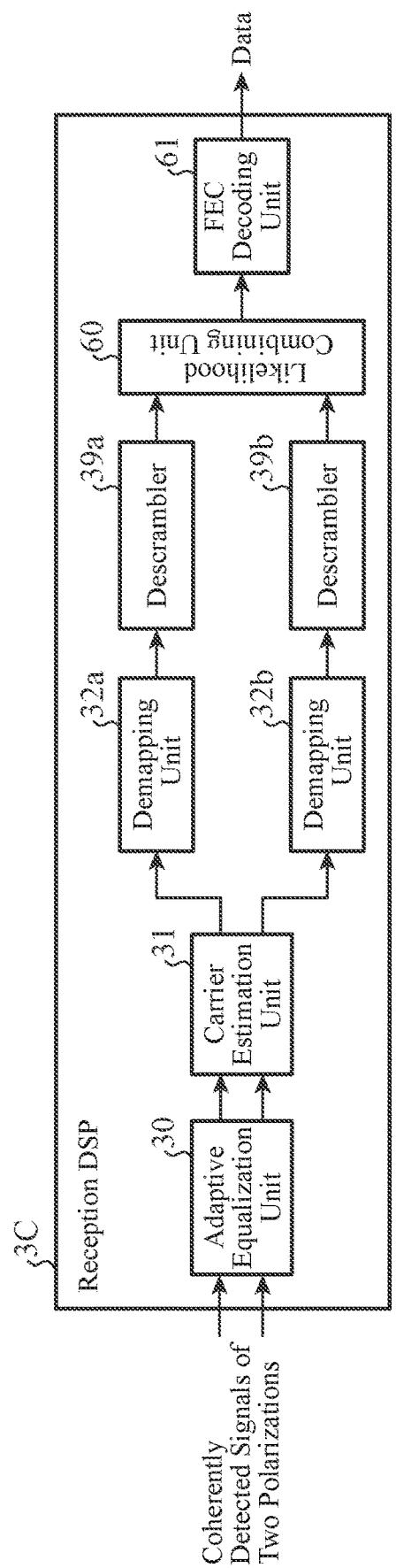
FIG. 18 is a block diagram showing a configuration of a reception DSP included in the spatial optical communication system according to the seventh embodiment.

FIG. 16 is a block diagram showing a configuration of a transmission DSP 4 included in a spatial optical communication system according to the seventh embodiment. FIG. 17 is a block diagram showing a configuration of an optical transmission unit 5 included in the spatial optical communication system according to the seventh embodiment. FIG. 18 is a block diagram showing a configuration of a reception DSP 3C included in the spatial optical communication system according to the seventh embodiment. The spatial optical communication system according to the seventh embodiment includes a spatial optical transmitter and a spatial optical receiver. The spatial optical transmitter includes the transmission DSP 4 shown in FIG. 16 and the optical transmission unit 5 shown in FIG. 17. The transmission signal is a QPSK signal. The spatial optical receiver includes the optical reception unit 2 shown in FIG. 4 and the reception DSP 3B shown in FIG. 18.

The transmission DSP 4 is a transmission signal processing unit for performing digital signal processing on data to be transmitted to space, and includes a forward error correction encoding unit 40, a scrambler 41a, a scrambler 41b, a mapping unit 42a, and a mapping unit 42b as shown in FIG. 16. Hereinafter, forward error correction will be abbreviated as FEC. The optical transmission unit 5 generates an optical signal to be transmitted to space by using the QPSK signal generated by the transmission DSP 4. As shown in FIG. 17, the optical transmission unit 5 includes a light source 50, a splitter 51, an IQ modulator 52a, an IQ modulator 52b, a polarization rotating unit 53a, a polarization rotating unit 53b, a collimator 54a, a collimator 54b, an optical system 55a, and an optical system 55b.

The reception DSP 3C is a reception signal processing unit for performing digital signal processing on the optical signal received by the optical reception unit 2, and includes an adaptive equalization unit 30, a carrier estimation unit 31, a demapping unit 32a, a demapping unit 32b, a descrambler 39a, a descrambler 39b, a likelihood combining unit 60, and an FEC decoding unit 61 as shown in FIG. 18.

In the transmission DSP 4, the FEC encoding unit 40 is an encoding unit for FEC-encoding data to be transmitted to space. The FEC coding is an encoding system in which original data is divided into a plurality of blocks and redundantly encoded into blocks the number of which is larger than the number of the divided blocks so as to allow the original data to be restored from any block among the plurality of encoded blocks.

The scrambler 41a and the scrambler 41b perform different types of scrambling on the signals encoded by the FEC encoding unit 40. For example, self-synchronous scrambling having different characteristic polynomials are used. The mapping unit 42a maps the signal scrambled by the scrambler 41a to the QPSK signal. The mapping unit 42b maps the signal scrambled by the scrambler 41b to the QPSK signal.

Note that FIG. 16 shows a case where two different types of scrambling are performed on the FEC-encoded data. Note that, in a case where three or more different types of scrambling are performed on the FEC-encoded data, three or more units each including a scrambler and a mapping unit may be provided in the transmission DSP 4.

In the optical transmission unit 5, the light source 50 is a light source for outputting a light of a single wavelength, and is, for example, a semiconductor laser. The splitter 51 is a transmission-side dividing unit for dividing the light output from the light source 50 into two. The IQ modulator 52a is a modulation unit for modulating the light divided by the splitter 51 in accordance with the QPSK signal mapped by the mapping unit 42a to generate a modulated optical signal. The IQ modulator 52b is a modulation unit for modulating the light divided by the splitter 51 in accordance with the QPSK signal mapped by the mapping unit 42b to generate a modulated optical signal.

The polarization rotating unit 53a rotates the polarization of the optical signal modulated by the IQ modulator 52a to generate an optical signal of two orthogonal polarizations. The polarization rotating unit 53b rotates the polarization of the optical signal modulated by the IQ modulator 52b to generate an optical signal of two orthogonal polarizations. The two orthogonal polarizations are, for example, a left-handed circularly polarized light and a right-handed circularly polarized light. The collimator 54a is a transmission-side optical system that inputs an optical signal whose polarization has been rotated by the polarization rotating unit 53a and converts the input optical signal into a parallel light. The collimator 54b is a transmission-side optical system that inputs an optical signal whose polarization has been rotated by the polarization rotating unit 53b and converts the input optical signal into a parallel light.

The optical system 55a is a transmission-side optical system that transmits, to space, the optical signal whose polarization has been rotated by the polarization rotating unit 53a and which has been converted into a parallel light by the collimator 54a. The optical system 55b is a transmission-side optical system that transmits, to space, the optical signal whose polarization has been rotated by the polarization rotating unit 53b and which has been converted into a parallel light by the collimator 54b. In the example of FIG. 17, the QPSK signal that is the right-handed circularly polarized light with the wavelength λ1 is transmitted from the optical system 55a, and the QPSK signal that is the left-handed circularly polarized light with the wavelength λ1 is transmitted from the optical system 55b. Note that each of the optical system 55a and the optical system 55b widens the beam diameter of the input optical signal and then transmits the optical signal to space. The distance between the optical system 55a and the optical system 55b is a value larger than the fried parameter that is an index representing the intensity of atmospheric fluctuations.

Note that FIG. 17 shows a configuration in which optical signals are generated for two QPSK signals each mapped with FEC-encoded data on which two different types of scrambling have been performed. Note that, when three or more different types of scrambling are performed on the FEC-encoded data, the optical transmission unit 5 is provided with three or more units each including an IQ modulator, a polarization rotating unit, a collimator, and an optical system.

In the reception DSP 3C, the adaptive equalization unit 30 adaptively equalizes the signal of two polarizations coherently detected by the polarization multiplexing coherent detector 25 included in the optical reception unit 2. For example, the adaptive equalization unit 30 includes two FIR filters, and output values of the respective filters are output to the carrier estimation unit 31. The carrier estimation unit 31 performs carrier estimation on the two electrical signals generated by the adaptive equalization unit 30. The demapping unit 32a demaps one electrical signal on which carrier estimation has been performed by the carrier estimation unit 31, and the demapping unit 32b demaps the other electrical signal on which carrier estimation has been performed by the carrier estimation unit 31. The electrical signal on which carrier estimation has been performed by the carrier estimation unit 31 is converted into a likelihood of the electrical signal by demapping.

The descrambler 39a performs descrambling corresponding to the scrambling performed by the scrambler 41a on the likelihood generated by the demapping unit 32a. The descrambler 39b performs descrambling corresponding to the scrambling performed by the scrambler 41b on the likelihood generated by the demapping unit 32b. The likelihood combining unit 60 combines the likelihoods descrambled by the descrambler 39a and the descrambler 39b. The FEC decoding unit 61 is a decoding unit for performing forward error correction decoding (FEC decoding) on the likelihood combined by the likelihood combining unit 60.

Next, the operation of the transmission DSP 4 will be described.

Figure 19:
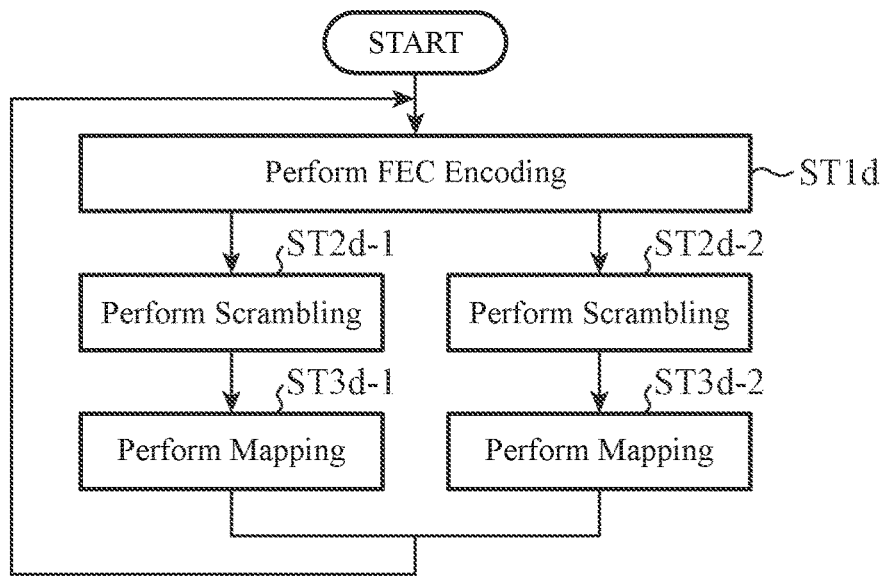
FIG. 19 is a flowchart showing an operation of a transmission DSP in the seventh embodiment.

FIG. 19 is a flowchart showing an operation of the transmission DSP 4.

The FEC encoding unit 40 FEC-encodes data to be transmitted to space (step ST1d). One piece of the data FEC-encoded by the FEC encoding unit 40 is output to the scrambler 41a, and the other piece is output to the scrambler 41b.

The scrambler 41a performs scrambling on the data encoded by the FEC encoding unit 40 (step ST2d-1). In addition, the scrambler 41b performs scrambling different from the scrambler 41a on the data encoded by the FEC encoding unit 40 (step ST2d-2).

The mapping unit 42a maps the signal scrambled by the scrambler 41a to a QPSK signal (step ST3d-1). The mapping unit 42b maps the signal scrambled by the scrambler 41b to a QPSK signal (step ST3d-2). The QPSK signal mapped by the mapping unit 42a is output to the IQ modulator 52a included in the optical transmission unit 5, and the QPSK signal mapped by the mapping unit 42b is output to the IQ modulator 52b.

Next, the operation of the reception DSP 3C will be described.

Figure 20:
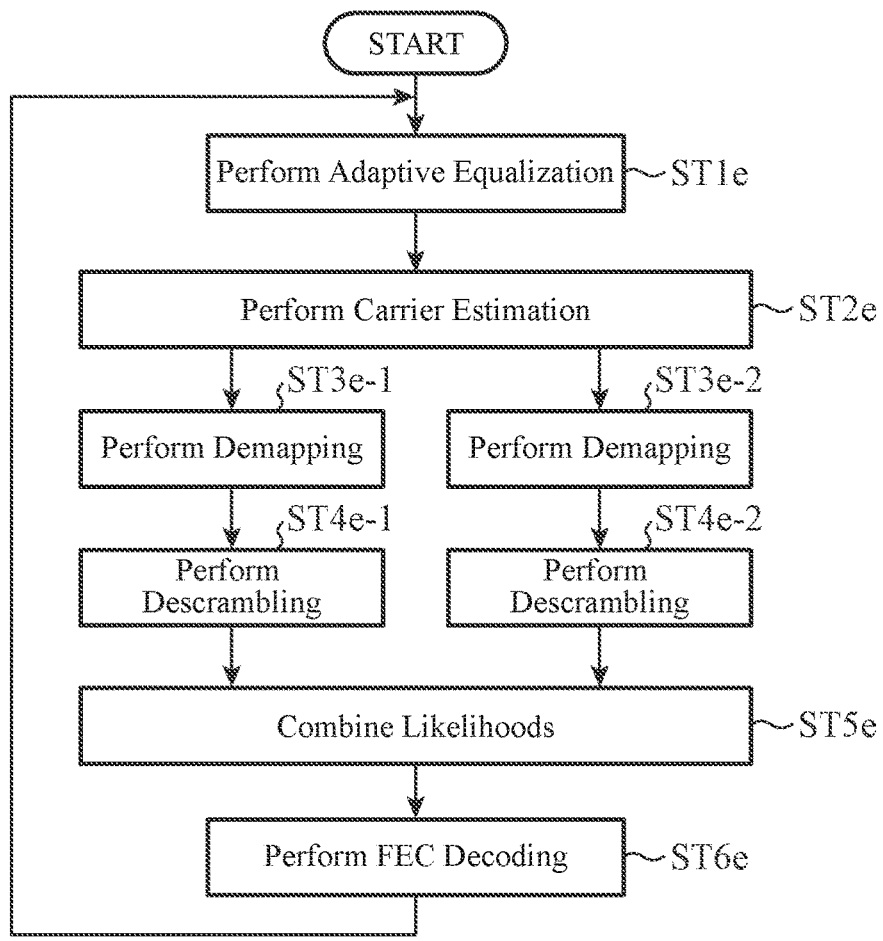
FIG. 20 is a flowchart showing an operation of the reception DSP in the seventh embodiment.

FIG. 20 is a flowchart showing an operation of the reception DSP 3C.

The adaptive equalization unit 30 adaptively equalizes the optical signals of two polarizations coherently detected by the polarization multiplexing coherent detector 25 (step ST1e).

Subsequently, the carrier estimation unit 31 performs carrier estimation on the electrical signals of two polarizations generated by the adaptive equalization unit 30 (step ST2e). For example, the carrier of the optical signal is estimated from the electrical signal by the carrier estimation unit 31, and the frequency difference and the phase difference between the light output from the light source 50 included in the optical transmission unit 5 and the local oscillation light are compensated.

The demapping unit 32a demaps one electrical signal on which carrier estimation has been performed by the carrier estimation unit 31, and converts the electrical signal into a likelihood (step ST3e-1). The demapping unit 32b demaps the other electrical signal on which carrier estimation has been performed by the carrier estimation unit 31, and converts the electrical signal into a likelihood (step ST3e-2).

The descrambler 39a performs descrambling corresponding to the scrambling performed by the scrambler 41a on the likelihood generated by the demapping unit 32a (step ST4e-1). The descrambler 39b performs descrambling corresponding to the scrambling performed by the scrambler 41b on the likelihood generated by the demapping unit 32b (step ST4e-2).

Subsequently, the likelihood combining unit 60 combines the likelihood descrambled by the descrambler 39a and the likelihood descrambled by the descrambler 39b (step ST5e). Next, the FEC decoding unit 61 FEC-decodes the likelihood combined by the likelihood combining unit 60 and outputs decoded data (step ST6e).

As described above, in the spatial optical communication system according to the seventh embodiment, the transmission DSP 4 FEC-encodes the transmission data, performs different types of scrambling on the FEC-encoded signals, and maps each of the scrambled signals. The reception DSP 3C adaptively equalizes the electrical signals of two polarizations on which polarization multiplexing coherent detection has been performed, performs carrier estimation on the electrical signals of two polarizations on which adaptive equalization has been performed, and demaps the electrical signals of two polarizations on which carrier estimation has been performed. Then, the reception DSP 3C performs descrambling corresponding to the respective different types of scrambling on the plurality of likelihoods generated by the demapping, combines the plurality of descrambled likelihoods, and FEC-decodes the combined likelihood. Since the optical signals of two polarizations transmitted from the optical transmission unit 5 have polarizations orthogonal to each other, the optical signals are received by the optical reception unit 2 without interfering with each other, and are coherently detected. As a result, each of the signals of two polarizations can be demodulated, the transmission data can be decoded from the data in which the likelihoods of the respective signals of two polarizations are combined, and the diversity effect can be obtained.

Furthermore, by performing different types of scrambling on the FEC-encoded signals, the polarization state of the transmission light fluctuates randomly. When the polarization multiplexing coherent detector 25 is designed to receive a random polarization state, the polarization multiplexing coherent detector 25 can be operated under appropriate conditions, and thus performance degradation can be prevented.

Furthermore, even in a case where an optical amplifier is used for the spatial optical transmitter, it is possible to prevent the bias of the transmission polarization and to suppress the influence of the polarization dependence of the optical amplifier.

Furthermore, in the optical transmission unit 5, the optical reception unit 2, and the propagation medium, even if there is a cause of deterioration in pattern dependency, deterioration in pattern dependency can be reduced by the diversity effect by using different patterns in the optical signals of two polarizations.

Eighth Embodiment

Figure 21:
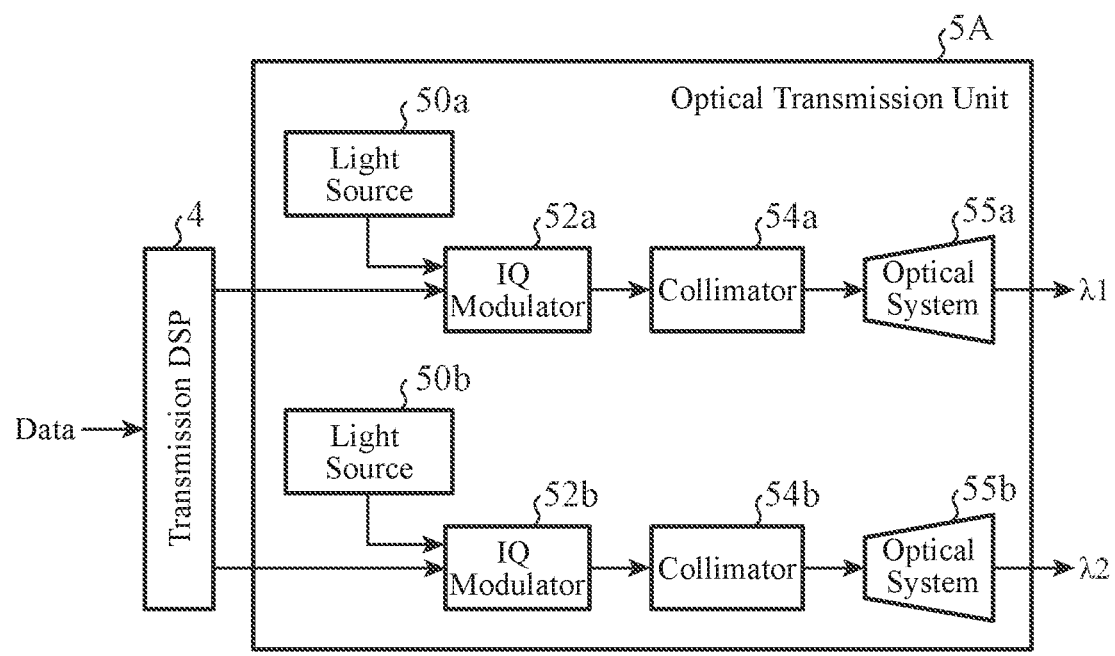
FIG. 21 is a block diagram showing a configuration of a spatial optical transmission unit included in a spatial optical communication system according to an eighth embodiment.

FIG. 21 is a block diagram showing a configuration of an optical transmission unit 5A included in a spatial optical communication system according to the eighth embodiment.

Figure 22:
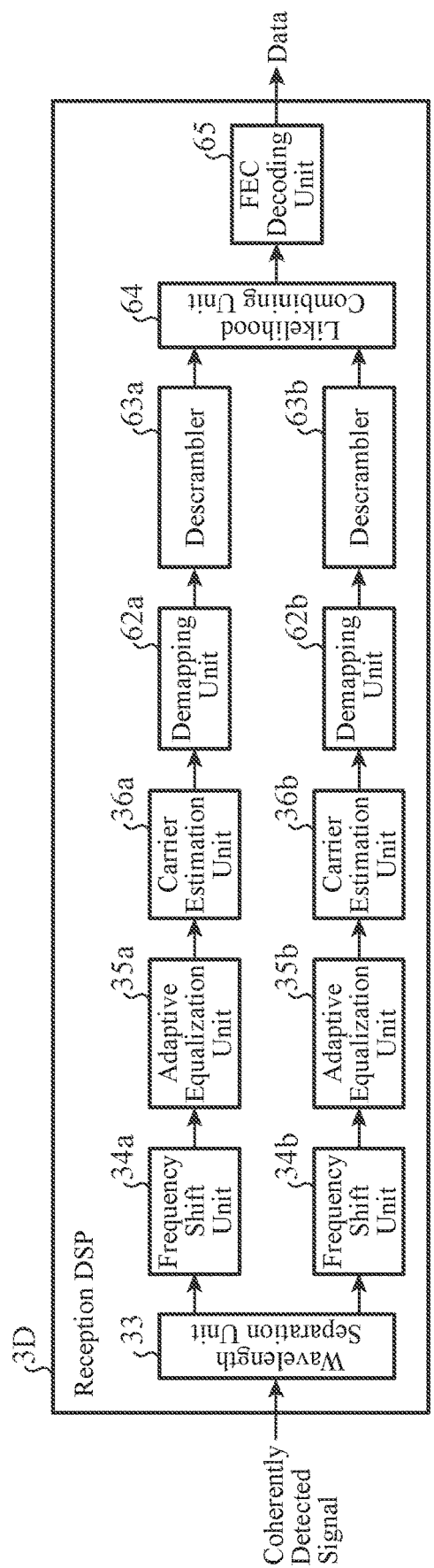
FIG. 22 is a block diagram showing a configuration of a reception DSP included in the spatial optical communication system according to the eighth embodiment.

FIG. 22 is a block diagram showing a configuration of a reception DSP 3D included in the spatial optical communication system according to the eighth embodiment. The spatial optical communication system according to the eighth embodiment includes a spatial optical transmitter and a spatial optical receiver. The spatial optical transmitter includes the transmission DSP 4 shown in FIG. 16 and the optical transmission unit 5A shown in FIG. 21. The transmission signal is a QPSK signal. The spatial optical receiver includes the optical reception unit 2A shown in FIG. 10 and the reception DSP 3D shown in FIG. 22.

As shown in FIG. 21, the optical transmission unit 5A includes a light source 50a, a light source 50b, an IQ modulator 52a, an IQ modulator 52b, a collimator 54a, a collimator 54b, an optical system 55a, and an optical system 55b, and generates an optical signal to be transmitted to space using a signal (QPSK signal) generated by the transmission DSP 4. The reception DSP 3D is a reception signal processing unit for performing digital signal processing on the optical signal received by the optical reception unit 2A, and as shown in FIG. 22, includes a wavelength separation unit 33, a frequency shift unit 34a, a frequency shift unit 34b, an adaptive equalization unit 35a, an adaptive equalization unit 35b, a carrier estimation unit 36a, a carrier estimation unit 36b, a demapping unit 62a, a demapping unit 62b, a descrambler 63a, a descrambler 63b, a likelihood combining unit 64, and an FEC decoding unit 65.

In the optical transmission unit 5A, the light source 50a and the light source 50b are light sources for outputting lights of single wavelengths different from each other, and are, for example, semiconductor lasers. In FIG. 21, the light source 50a outputs a light having a wavelength $\lambda 1$, and the light source 50b outputs a light having a wavelength $\lambda 2$ different from $\lambda 1$.

The IQ modulator 52a is a modulation unit for modulating the light output from the light source 50a in accordance with a signal to be transmitted to generate a modulated optical signal of a single polarization. The IQ modulator 52b is a modulation unit for modulating the light output from the light source 50b in accordance with a signal to be transmitted to generate a modulated optical signal of a single polarization. For example, when the signal to be transmitted is a QPSK signal input from the transmission DSP 4, the IQ modulator 52a modulates the light output from the light source 50a into the same QPSK signal to generate an optical signal of X polarization with a wavelength $\lambda 1$. The IQ modulator 52b modulates the light output from the light source 50b into the same QPSK signal to generate an optical signal of X polarization with a wavelength $\lambda 2$.

The collimator 54a is a transmission-side optical system that inputs the optical signal modulated by the IQ modulator 52a and converts the input optical signal into a parallel light. The collimator 54b is a transmission-side optical system that inputs the optical signal modulated by the IQ modulator 52b and converts the input optical signal into a parallel light. The optical system 55a is a transmission-side optical system that transmits, to space, the optical signal modulated by the IQ modulator 52a and converted into a parallel light by the collimator 54a. The optical system 55b is a transmission-side optical system that transmits, to space, the optical signal modulated by the IQ modulator 52b and converted into a parallel light by the collimator 54b.

Each of the optical system 55a and the optical system 55b widens the beam diameter of the input optical signal and then transmits the optical signal to space. The distance between the optical system 55a and the optical system 55b is a value larger than the fried parameter as in the first embodiment. Note that the transmission signal may be a polarization multiplexed signal. Examples of the polarization multiplexed signal include polarization multiplexed QPSK.

Note that FIG. 21 shows a configuration in which optical signals are generated for two QPSK signals each mapped with FEC-encoded data on which two different types of scrambling have been performed. Note that, in a case where three or more different types of scrambling are performed on the FEC-encoded data, three or more units each including a light source, an IQ modulator, a collimator, and an optical system may be provided in the optical transmission unit 5A. In this case, the light sources included in the plurality of units output lights of single wavelengths different from each other, individually.

In the optical transmission unit 5A, even if the lights transmitted from the optical system 55a and the optical system 55b are lights with high coherency, since the frequencies of respective carriers are different from each other, the lights do not interfere with each other and do not cancel each other even if the phases are inverted. Therefore, on the optical receiver side, a diversity effect similar to that in the case of having two reception-side optical systems can be obtained.

In the reception DSP 3D, the wavelength separation unit 33 separates the electrical signal coherently detected by the coherent detector 25A included in the optical reception unit 2A in accordance with the frequency corresponding to each of the single wavelengths $\lambda 1$ and $\lambda 2$. The frequency shift unit 34a frequency-shifts the electrical signal separated by the wavelength separation unit 33 in accordance with the frequency of the wavelength $\lambda 1$ to generate an electrical signal of a baseband signal. The frequency shift unit 34b frequency-shifts the electrical signal separated by the wavelength separation unit 33 in accordance with the frequency of the wavelength $\lambda 2$ to generate an electrical signal of a baseband signal.

The adaptive equalization unit 35a adaptively equalizes the electrical signal generated by the frequency shift unit 34a. The adaptive equalization unit 35b adaptively equalizes the electrical signal generated by the frequency shift unit 34b. The carrier estimation unit 36a performs carrier estimation on the electrical signal on which adaptive equalization has been performed by the adaptive equalization unit 35a. The carrier estimation unit 36b performs carrier estimation on the electrical signal on which adaptive equalization has been performed by the adaptive equalization unit 35b. The demapping unit 62a demaps the electrical signal on which carrier estimation has been performed by the carrier estimation unit 36a, and the demapping unit 62b demaps the electrical signal on which carrier estimation has been performed by the carrier estimation unit 36b. The electrical signal on which carrier estimation has been performed by each of the carrier estimation unit 36a and the carrier estimation unit 36b is converted into a likelihood of the electrical signal by the demapping.

The descrambler 63a performs descrambling corresponding to the scrambling performed by the scrambler 41a included in the transmission DSP 4 on the likelihood generated by the demapping unit 62a. The descrambler 63b performs descrambling corresponding to the scrambling performed by the scrambler 41b included in the transmission DSP 4 on the likelihood generated by the demapping unit 62b. The likelihood combining unit 64 combines the likelihoods descrambled by the descrambler 63a and the descrambler 63b. The FEC decoding unit 65 is a decoding unit for FEC-decoding the likelihood combined by the likelihood combining unit 64.

Furthermore, FIG. 22 shows a configuration in which the reception DSP 3D includes two units each including a frequency shift unit, an adaptive equalization unit, a carrier estimation unit, a demapping unit, and a descrambler at the subsequent stage of the wavelength separation unit 33. Note that, the reception DSP 3D may include three or more of the above units depending on the number of single wavelengths that are transmission wavelengths. In this case, the wavelength separation unit 33 separates the reception signal coherently detected by the optical reception unit in accordance with the frequencies corresponding to the transmission wavelengths, and outputs the separated signals to the plurality of units, individually.

Next, the operation of the reception DSP 3D will be described.

Figure 23:
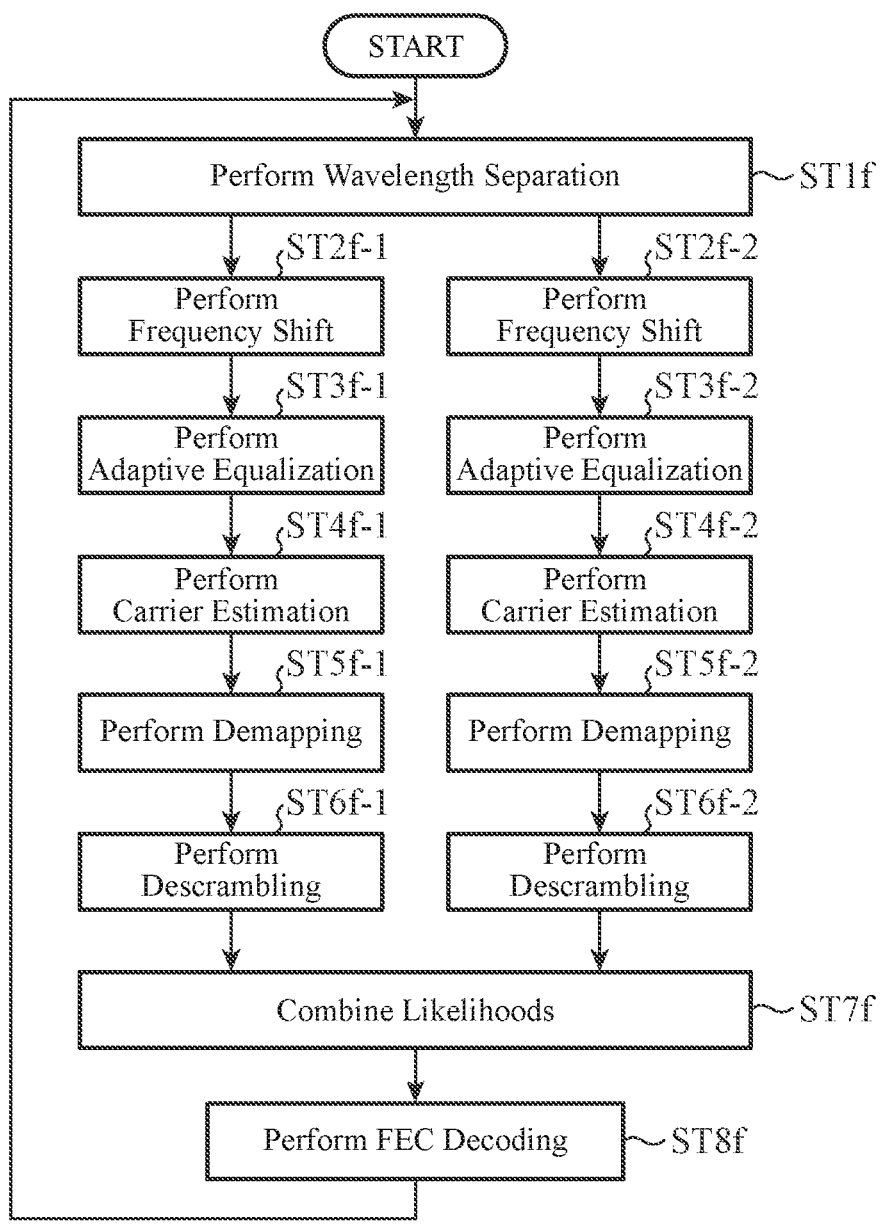
FIG. 23 is a flowchart showing an operation of the reception DSP in the eighth embodiment.

FIG. 23 is a flowchart showing an operation of the reception DSP 3D.

The wavelength separation unit 33 separates the electrical signal coherently detected by the coherent detector 25A in accordance with the frequency corresponding to each of the single wavelengths $\lambda 1$ and $\lambda 2$ which are transmission wavelengths (step ST1$f$). For example, the wavelength separation unit 33 separates signals corresponding to the transmission wavelengths $\lambda 1$ and $\lambda 2$ using filters that pass signals having frequency corresponding to each of the wavelengths $\lambda 1$ and $\lambda 2$.

The frequency shift unit 34$a$ frequency-shifts the electrical signal corresponding to the wavelength $\lambda 1$ separated by the wavelength separation unit 33 to generate an electrical signal of a baseband signal (step ST2$f$-1). The frequency shift unit 34$b$ frequency-shifts the electrical signal corresponding to the wavelength $\lambda 2$ separated by the wavelength separation unit 33 to generate an electrical signal of a baseband signal (step ST2$f$-2).

Subsequently, the adaptive equalization unit 35$a$ adaptively equalizes the signal converted into the baseband signal by the frequency shift unit 34$a$ to compensate for linear distortion in the signal (step ST3$f$-1). The adaptive equalization unit 35$b$ adaptively equalizes the signal converted into the baseband signal by the frequency shift unit 34$b$ to compensate for linear distortion in the signal (step ST3$f$-2).

For example, each of the adaptive equalization unit 35$a$ and the adaptive equalization unit 35$b$ includes an FIR filter, and performs adaptive equalization of an electrical signal by a constant envelope reference algorithm.

The carrier estimation unit 36$a$ performs carrier estimation on the electrical signal (electrical signal corresponding to the wavelength $\lambda 1$) on which adaptive equalization has been performed by the adaptive equalization unit 35$a$ (step ST4$f$-1). The carrier estimation unit 36$b$ performs carrier estimation on the electrical signal (electrical signal corresponding to the wavelength $\lambda 2$) on which adaptive equalization has been performed by the adaptive equalization unit 35$b$ (step ST4$f$-2). For example, the carrier estimation unit 36$a$ and the carrier estimation unit 36$b$ compensate for the frequency difference and the phase difference between the lights output from the light sources 50$a$ and 50$b$ and the local oscillation lights by estimating the carriers of the optical signals from the electrical signals.

The demapping unit 62$a$ demaps the electrical signal on which carrier estimation has been performed by the carrier estimation unit 36$a$, and converts the electrical signal into a likelihood (step ST5$f$-1). The demapping unit 62$b$ demaps the electrical signal on which carrier estimation has been performed by the carrier estimation unit 36$b$, and converts the electrical signal into a likelihood (step ST5$f$-2).

The descrambler 63$a$ performs descrambling corresponding to the scrambling performed by the scrambler 41$a$ on the likelihood generated by the demapping unit 62$a$ (step ST6$f$-1). The descrambler 63$b$ performs descrambling corresponding to the scrambling performed by the scrambler 41$b$ on the likelihood generated by the demapping unit 62$b$ (step ST6$f$-2).

Subsequently, the likelihood combining unit 64 combines the likelihood descrambled by the descrambler 63$a$ and the likelihood descrambled by the descrambler 63$b$ (step ST7$f$). Next, the FEC decoding unit 65 FEC-decodes the likelihood combined by the likelihood combining unit 64 and outputs decoded data (step ST8$f$).

As described above, in the spatial optical communication system according to the eighth embodiment, the reception DSP 3D separates the electrical signal coherently detected by the optical reception unit 2A in accordance with the frequencies corresponding to the plurality of single wavelengths that are the transmission wavelengths, performs the frequency shift on each of the plurality of separated electrical signals, adaptively equalizes the plurality of frequency-shifted electrical signals, performs carrier estimation on each of the plurality of electrical signals on which adaptive equalization has been performed, and demaps each of the plurality of electrical signals on which carrier estimation has been performed. Then, the reception DSP 3D performs descrambling corresponding to the respective different types of scrambling on the plurality of likelihoods generated by the demapping, combines the plurality of descrambled likelihoods, and FEC-decodes the combined likelihood. Since the plurality of optical signals transmitted from the optical transmission unit 5A have the different carrier frequencies, the optical signals are coherently detected in the optical reception unit 2B without interfering with each other. Since the adaptive equalization and the carrier estimation are performed on the signals corresponding to the respective transmission wavelengths, and then these signals are combined, the signals are combined so as to maximize the SN ratio. Therefore, in the spatial optical receiver, a diversity effect can be obtained.

In addition, even in a case where an optical amplifier is used for the spatial optical transmitter, it is possible to prevent the bias of the transmission polarization and to suppress the influence of the polarization dependence of the optical amplifier.

Furthermore, in the optical transmission unit 5A, the optical reception unit 2A, and the propagation medium, even if there is a cause of deterioration in pattern dependency, deterioration in pattern dependency can be reduced by the diversity effect by using different patterns in the two optical signals.

Ninth Embodiment

Figure 24:
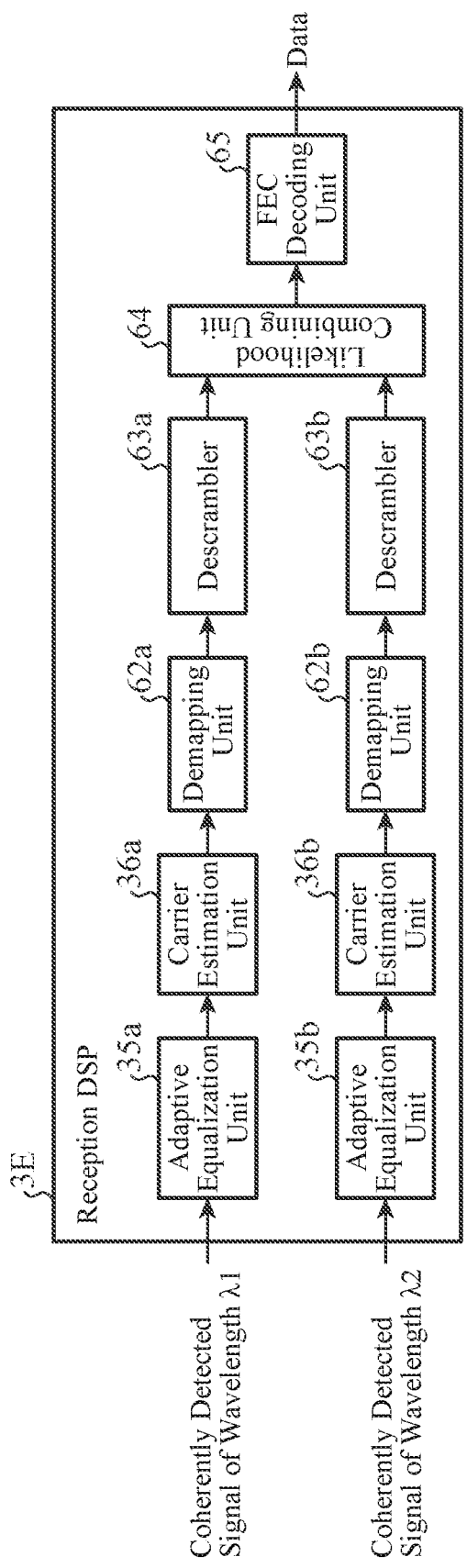
FIG. 24 is a block diagram showing a configuration of a reception DSP included in a spatial optical communication system according to a ninth embodiment.

FIG. 24 is a block diagram showing a configuration of a reception DSP 3E included in a spatial optical communication system according to the ninth embodiment. The spatial optical communication system according to the ninth embodiment includes a spatial optical transmitter and a spatial optical receiver. The spatial optical transmitter includes the transmission DSP 4 shown in FIG. 16 and the optical transmission unit 5A shown in FIG. 21. The signal to be transmitted is, for example, a QPSK signal. The spatial optical receiver includes the optical reception unit 2B shown in FIG. 13 and the reception DSP 3E shown in FIG. 24.

In the reception DSP 3E, the adaptive equalization unit 35a adaptively equalizes the signal having the wavelength λ1 coherently detected by the coherent detector 27a included in the optical reception unit 2B. The adaptive equalization unit 35b adaptively equalizes the signal having the wavelength λ2 coherently detected by the coherent detector 27b included in the optical reception unit 2B. The carrier estimation unit 36a performs carrier estimation on the electrical signal on which adaptive equalization has been performed by the adaptive equalization unit 35a. The carrier estimation unit 36b performs carrier estimation on the electrical signal on which adaptive equalization has been performed by the adaptive equalization unit 35b.

The demapping unit 62a demaps the electrical signal on which carrier estimation has been performed by the carrier estimation unit 36a, and the demapping unit 62b demaps the electrical signal on which carrier estimation has been performed by the carrier estimation unit 36b. The electrical signal on which carrier estimation has been performed by each of the carrier estimation unit 36a and the carrier estimation unit 36b is converted into a likelihood of the electrical signal by the demapping.

The descrambler 63a performs descrambling corresponding to the scrambling performed by the scrambler 41a included in the transmission DSP 4 on the likelihood generated by the demapping unit 62a. The descrambler 63b performs descrambling corresponding to the scrambling performed by the scrambler 41b included in the transmission DSP 4 on the likelihood generated by the demapping unit 62b. The likelihood combining unit 64 combines the likelihoods descrambled by the descrambler 63a and the descrambler 63b. The FEC decoding unit 65 is a decoding unit for FEC-decoding the likelihood combined by the likelihood combining unit 64.

FIG. 24 shows a configuration in which the reception DSP 3E includes two units each including an adaptive equalization unit, a carrier estimation unit, a demapping unit, and a descrambler. Note that, the reception DSP 3E may include three or more of the above units depending on the number of single wavelengths that are transmission wavelengths.

Next, the operation of the reception DSP 3E will be described.

Figure 25:
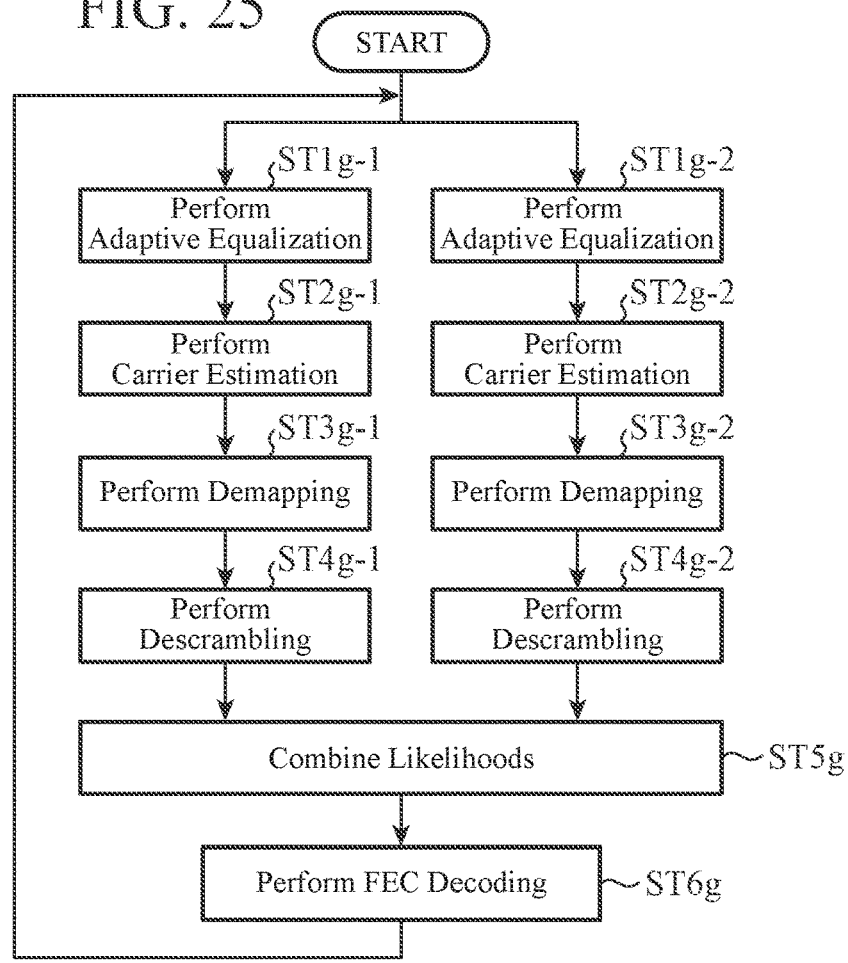
FIG. 25 is a flowchart showing an operation of the reception DSP in the ninth embodiment.

FIG. 25 is a flowchart showing an operation of the reception DSP 3E.

The adaptive equalization unit 35a adaptively equalizes the signal having the wavelength λ1 coherently detected by the coherent detector 27a to compensate for linear distortion in the signal (step ST1g-1). The adaptive equalization unit 35b adaptively equalizes the signal having the wavelength λ2 coherently detected by the coherent detector 27b to compensate for linear distortion in the signal (step ST1g-2). For example, each of the adaptive equalization unit 35a and the adaptive equalization unit 35b includes an FIR filter, and performs adaptive equalization of an electrical signal by a constant envelope reference algorithm.

The carrier estimation unit 36a performs carrier estimation on the electrical signal corresponding to the wavelength λ1 on which adaptive equalization has been performed by the adaptive equalization unit 35a (step ST2g-1). The carrier estimation unit 36b performs carrier estimation on the electrical signal corresponding to the wavelength λ2 on which adaptive equalization has been performed by the adaptive equalization unit 35b (step ST2g-2). For example, the carrier estimation unit 36a and the carrier estimation unit 36b compensate for the frequency difference and the phase difference between the optical signals output from the light sources 50a and 50b included in the optical transmission unit 5A and the local oscillation lights by estimating the carriers of the optical signals from the electrical signals.

The demapping unit 62a demaps the electrical signal on which carrier estimation has been performed by the carrier estimation unit 36a, and converts the electrical signal into a likelihood (step ST3g-1). The demapping unit 62b demaps the electrical signal on which carrier estimation has been performed by the carrier estimation unit 36b, and converts the electrical signal into a likelihood (step ST3g-2).

The descrambler 63a performs descrambling corresponding to the scrambling performed by the scrambler 41a on the likelihood generated by the demapping unit 62a (step ST4g-1). The descrambler 63b performs descrambling corresponding to the scrambling performed by the scrambler 41b on the likelihood generated by the demapping unit 62b (step ST4g-2).

Subsequently, the likelihood combining unit 64 combines the likelihood descrambled by the descrambler 63a and the likelihood descrambled by the descrambler 63b (step ST5g). Next, the FEC decoding unit 65 FEC-decodes the likelihood combined by the likelihood combining unit 64 and outputs decoded data (step ST6g).

As described above, in the spatial optical communication system according to the ninth embodiment, the reception DSP 3E adaptively equalizes the plurality of electrical signals coherently detected by the optical reception unit 2B, performs carrier estimation on each of the plurality of electrical signals on which adaptive equalization has been performed, and demaps each of the plurality of electrical signals on which carrier estimation has been performed. Then, the reception DSP 3E performs descrambling corresponding to the respective different types of scrambling on the plurality of likelihoods generated by the demapping, combines the plurality of descrambled likelihoods, and FEC-decodes the combined likelihood. Since the carrier frequencies of the plurality of optical signals transmitted from the optical transmission unit 5A are different from each other, the optical signals are coherently detected in the optical reception unit 2B without interfering with each other. Since the adaptive equalization and the carrier estimation are performed on the signals corresponding to the respective transmission wavelengths, and then these signals are combined, the signals are combined so as to maximize the SN ratio. Therefore, in the spatial optical receiver, a diversity effect can be obtained.

In addition, even in a case where an optical amplifier is used for the spatial optical transmitter, it is possible to prevent the bias of the transmission polarization and to suppress the influence of the polarization dependence of the optical amplifier.

Furthermore, in the optical transmission unit 5A, the optical reception unit 2B, and the propagation medium, even if there is a cause of deterioration in pattern dependency, deterioration in pattern dependency can be reduced by the diversity effect by using different patterns in the two optical signals.

Tenth Embodiment

Figure 26:
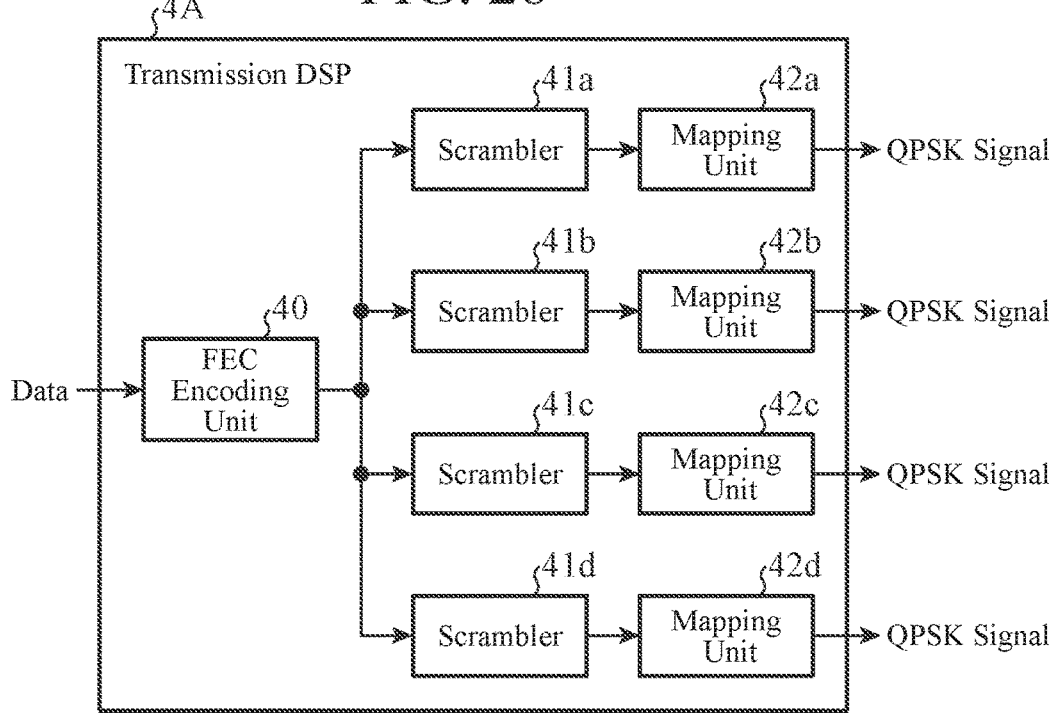
FIG. 26 is a block diagram showing a configuration of a transmission DSP included in a spatial optical communication system according to a tenth embodiment.
Figure 27:
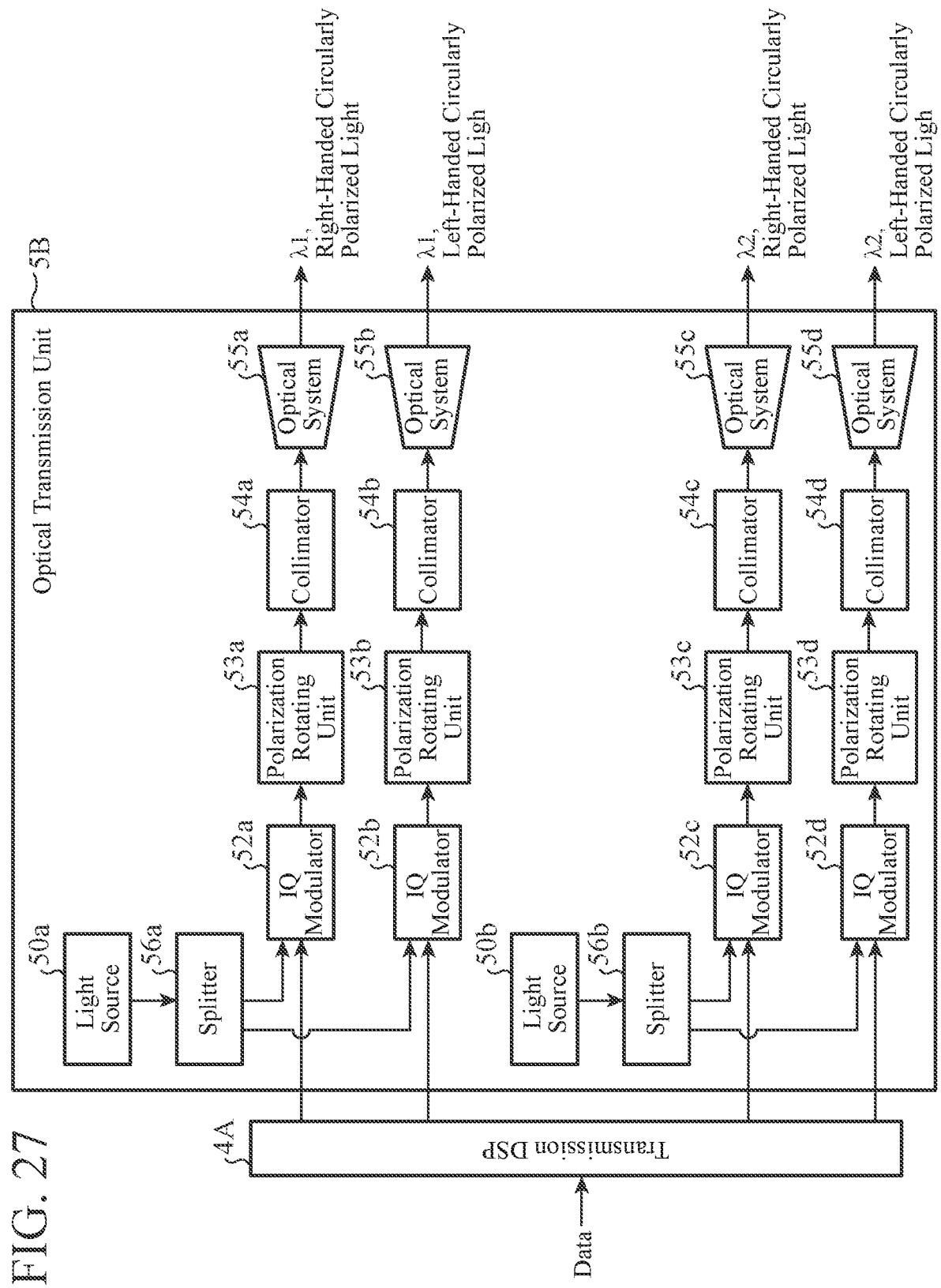
FIG. 27 is a block diagram showing a configuration of an optical transmission unit included in the spatial optical communication system according to the tenth embodiment.
Figure 28:
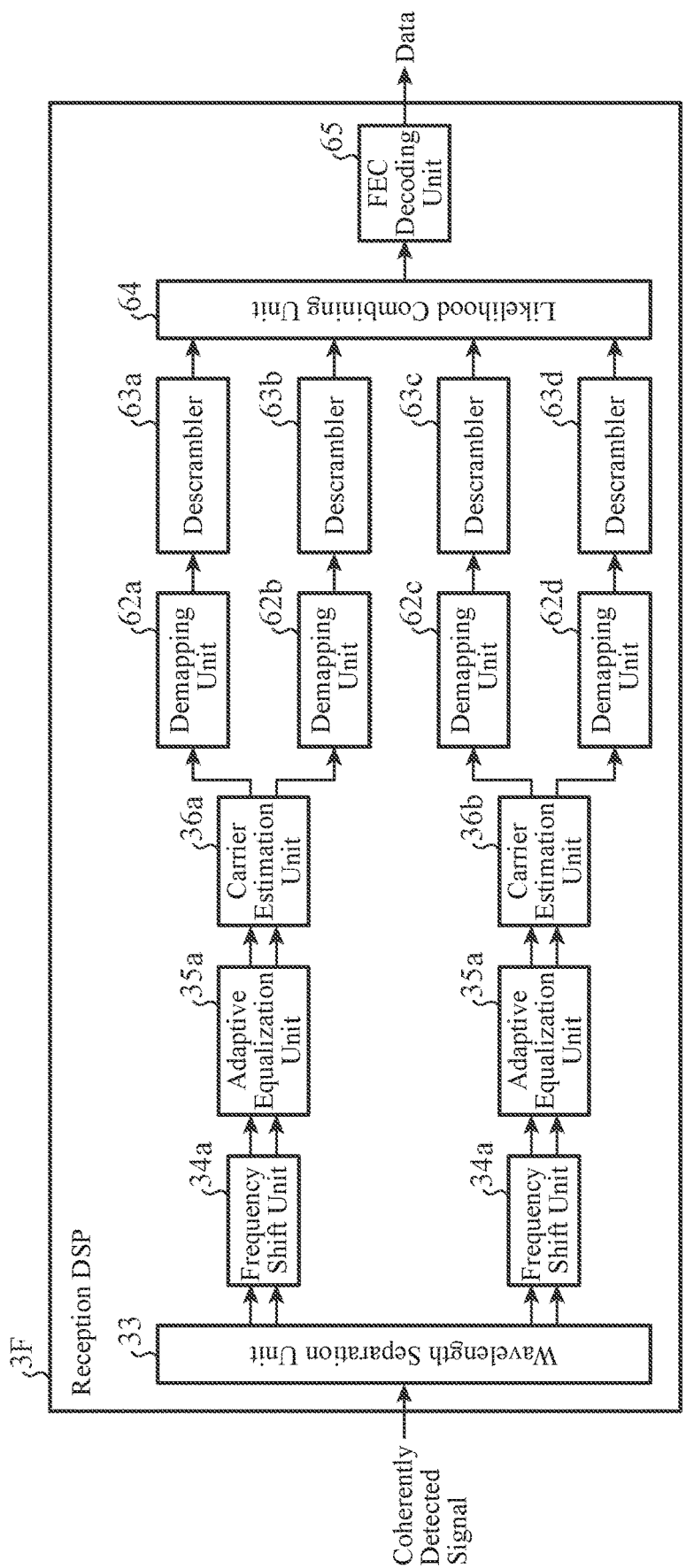
FIG. 28 is a block diagram showing a configuration of a reception DSP included in the spatial optical communication system according to the tenth embodiment.

FIG. 26 is a block diagram showing a configuration of a transmission DSP 4A included in a spatial optical communication system according to the tenth embodiment. FIG. 27 is a block diagram showing a configuration of an optical transmission unit 5B included in the spatial optical communication system according to the tenth embodiment. FIG. 28 is a block diagram showing a configuration of a reception DSP 3F included in the spatial optical communication system according to the tenth embodiment. The spatial optical communication system according to the tenth embodiment includes a spatial optical transmitter and a spatial optical receiver. The spatial optical transmitter includes the transmission DSP 4A shown in FIG. 26 and the optical transmission unit 5B shown in FIG. 27. The signal to be transmitted is, for example, a QPSK signal. The spatial optical receiver includes the optical reception unit 2 shown in FIG. 4 and the reception DSP 3F shown in FIG. 28.

The transmission DSP 4A is a transmission signal processing unit for performing digital signal processing on data to be transmitted to space, and includes an FEC encoding unit 40, a scrambler 41a, a scrambler 41b, a scrambler 41c, a scrambler 41d, a mapping unit 42a, a mapping unit 42b, a mapping unit 42c, and a mapping unit 42d as shown in FIG. 26.

The optical transmission unit 5B generates an optical signal to be transmitted to space using the QPSK signal generated by the transmission DSP 4A. As shown in FIG. 27, the optical transmission unit 5B includes a light source 50a, a light source 50b, a splitter 56a, a splitter 56b, an IQ modulator 52a, an IQ modulator 52b, an IQ modulator 52c, an IQ modulator 52d, a polarization rotating unit 53a, a polarization rotating unit 53b, a polarization rotating unit 53c, a polarization rotating unit 53d, a collimator 54a, a collimator 54b, a collimator 54c, a collimator 54d, an optical system 55a, an optical system 55b, an optical system 55c, and an optical system 55d.

The reception DSP 3F is a reception signal processing unit for performing digital signal processing on the optical signal received by the optical reception unit 2, and as shown in FIG. 28, includes a wavelength separation unit 33, a frequency shift unit 34a, a frequency shift unit 34b, an adaptive equalization unit 35a, an adaptive equalization unit 35b, a carrier estimation unit 36a, a carrier estimation unit 36b, a demapping unit 62a, a demapping unit 62b, a demapping unit 62c, a demapping unit 62d, a descrambler 63a, a descrambler 63b, a descrambler 63c, a descrambler 63d, a likelihood combining unit 64, and an FEC decoding unit 65.

In the transmission DSP 4A, the FEC encoding unit 40 is an encoding unit for FEC-encoding data to be transmitted to space. The data encoded by the FEC encoding unit 40 are output to the scramblers 41a to 41d, individually. The scramblers 41a to 41d perform different types of scrambling on the signals encoded by the FEC encoding unit 40. For example, self-synchronous scrambling having different characteristic polynomials are used. The mapping units 42a to 42d map the signals scrambled by the scramblers 41a to 42d to the QPSK signals.

Note that although FIG. 26 shows a case where four different types of scrambling are performed on the FEC-encoded data, the transmission DSP 4A may include two or more different scramblers. For example, in a case where five or more different types of scrambling are performed on the FEC-encoded data, five or more units each including a scrambler and a mapping unit are provided in the transmission DSP 4A.

In the optical transmission unit 5B, the light source 50a and the light source 50b are light sources for outputting lights of single wavelengths different from each other, and are, for example, semiconductor lasers. The splitter 56a is a transmission-side dividing unit for dividing the light output from the light source 50a into two. The splitter 56b is a transmission-side dividing unit for dividing the light output from the light source 50b into two.

The IQ modulator 52a is a modulation unit for modulating the light divided by the splitter 56a in accordance with the QPSK signal mapped by the mapping unit 42a to generate a modulated optical signal. Furthermore, the IQ modulator 52b is a modulation unit for modulating the light divided by the splitter 56a in accordance with the QPSK signal mapped by the mapping unit 42b to generate a modulated optical signal. The IQ modulator 52c is a modulation unit for modulating the light divided by the splitter 56b in accordance with the QPSK signal mapped by the mapping unit 42c to generate a modulated optical signal. Furthermore, the IQ modulator 52d is a modulation unit for modulating the light divided by the splitter 56b in accordance with the QPSK signal mapped by the mapping unit 42d to generate a modulated optical signal.

The polarization rotating unit 53a rotates the polarization of the optical signal modulated by the IQ modulator 52a to generate an optical signal of two orthogonal polarizations. The polarization rotating unit 53b rotates the polarization of the optical signal modulated by the IQ modulator 52b to generate an optical signal of two orthogonal polarizations. The polarization rotating unit 53c rotates the polarization of the optical signal modulated by the IQ modulator 52c to generate an optical signal of two orthogonal polarizations. The polarization rotating unit 53d rotates the polarization of the optical signal modulated by the IQ modulator 52d to generate an optical signal of two orthogonal polarizations. The two orthogonal polarizations are, for example, a left-handed circularly polarized light and a right-handed circularly polarized light.

The collimator 54a is a transmission-side optical system that inputs an optical signal whose polarization has been rotated by the polarization rotating unit 53a and converts the input optical signal into a parallel light. The collimator 54b is a transmission-side optical system that inputs an optical signal whose polarization has been rotated by the polarization rotating unit 53b and converts the input optical signal into a parallel light. The collimator 54c is a transmission-side optical system that inputs the optical signal whose polarization has been rotated by the polarization rotating unit 53c and converts the input optical signal into a parallel light. The collimator 54d is a transmission-side optical system that inputs the optical signal whose polarization has been rotated by the polarization rotating unit 53d and converts the input optical signal into a parallel light.

The optical system 55a is a transmission-side optical system that transmits, to space, the optical signal whose polarization has been rotated by the polarization rotating unit 53a and which has been converted into a parallel light by the collimator 54a. The optical system 55b is a transmission-side optical system that transmits, to space, the optical signal whose polarization has been rotated by the polarization rotating unit 53b and which has been converted into a parallel light by the collimator 54b. The optical system 55c is a transmission-side optical system that transmits, to space, the optical signal whose polarization has been rotated by the polarization rotating unit 53c and which has been converted into a parallel light by the collimator 54c. The optical system 55d is a transmission-side optical system that transmits, to space, the optical signal whose polarization has been rotated by the polarization rotating unit 53d and which has been converted into a parallel light by the collimator 54d.

In FIG. 27, the QPSK signal that is the right-handed circularly polarized light having the wavelength λ1 is transmitted from the optical system 55a, and the QPSK signal that is the left-handed circularly polarized light having the wavelength λ1 is transmitted from the optical system 55b. The QPSK signal that is the right-handed circularly polarized light having a wavelength λ2 is transmitted from the optical system 55c, and the QPSK signal that is the left-handed circularly polarized light having a wavelength λ2 is transmitted from the optical system 55d.

Note that each of the optical systems 55a to 55d widens the beam diameter of the input optical signal and then transmits the optical signal to the space. The distance between each of the optical systems in the optical systems 55a to 55d is a value larger than the fried parameter that is an index representing the intensity of atmospheric fluctuations.

Note that FIG. 27 shows a configuration in which optical signals are generated for two QPSK signals each mapped with FEC-encoded data on which four different types of scrambling are performed. Note that, in a case where five or more different types of scrambling are performed on the FEC-encoded data, five or more units each including an IQ modulator, a polarization rotating unit, a collimator, and an optical system are provided in the optical transmission unit 5B.

In the reception DSP 3F, the wavelength separation unit 33 separates the signals coherently detected by the polarization multiplexing coherent detector 25 included in the optical reception unit 2 in accordance with the frequencies corresponding to the single wavelengths λ1 and λ2 which are transmission wavelengths.

The frequency shift unit 34a frequency-shifts the two electrical signals separated in accordance with the frequency corresponding to the wavelength λ1 by the wavelength separation unit 33 to generate electrical signals of baseband signals. The frequency shift unit 34b frequency-shifts the two electrical signals separated in accordance with the frequency of the wavelength λ2 by the wavelength separation unit 33 to generate electrical signals of baseband signals.

The adaptive equalization unit 35a adaptively equalizes the two electrical signals generated by the frequency shift unit 34a. The adaptive equalization unit 35b adaptively equalizes the two electrical signals generated by the frequency shift unit 34b. The carrier estimation unit 36a performs carrier estimation on the two electrical signals on which adaptive equalization has been performed by the adaptive equalization unit 35a. The carrier estimation unit 36b performs carrier estimation on the two electrical signals on which adaptive equalization has been performed by the adaptive equalization unit 35b.

The demapping unit 62a demaps one of the two electrical signals on which carrier estimation has been performed by the carrier estimation unit 36a, and the demapping unit 62b demaps the other of the two electrical signals on which carrier estimation has been performed by the carrier estimation unit 36a. Further, the demapping unit 62c demaps one of the two electrical signals on which carrier estimation has been performed by the carrier estimation unit 36b, and the demapping unit 62d demaps the other of the two electrical signals on which carrier estimation has been performed by the carrier estimation unit 36b.

The four electrical signals on which carrier estimation has been performed by the carrier estimation unit 36a and the carrier estimation unit 36b, are converted into respective likelihoods of the four electrical signals by the demapping.

The descrambler 63a performs descrambling corresponding to the scrambling performed by the scrambler 41a included in the transmission DSP 4A on the likelihood generated by the demapping unit 62a. The descrambler 63b performs descrambling corresponding to the scrambling performed by the scrambler 41b included in the transmission DSP 4A on the likelihood generated by the demapping unit 62b. The descrambler 63c performs descrambling corresponding to the scrambling performed by the scrambler 41c included in the transmission DSP 4A on the likelihood generated by the demapping unit 62c. The descrambler 63d performs descrambling corresponding to the scrambling performed by the scrambler 41d included in the transmission DSP 4A on the likelihood generated by the demapping unit 62d.

The likelihood combining unit 64 combines the likelihoods descrambled by the respective descramblers 63a to 63d. The FEC decoding unit 65 is a decoding unit for FEC-decoding the likelihood combined by the likelihood combining unit 64.

Note that FIG. 28 shows a configuration in which the reception DSP 3F includes two units each including an adaptive equalization unit, a carrier estimation unit, two demapping units, and two descramblers.

Note that, the reception DSP3F may include three or more of the above units depending on the number of single wavelengths that are transmission wavelengths.

Next, the operation of the transmission DSP 4A will be described.

Figure 29:
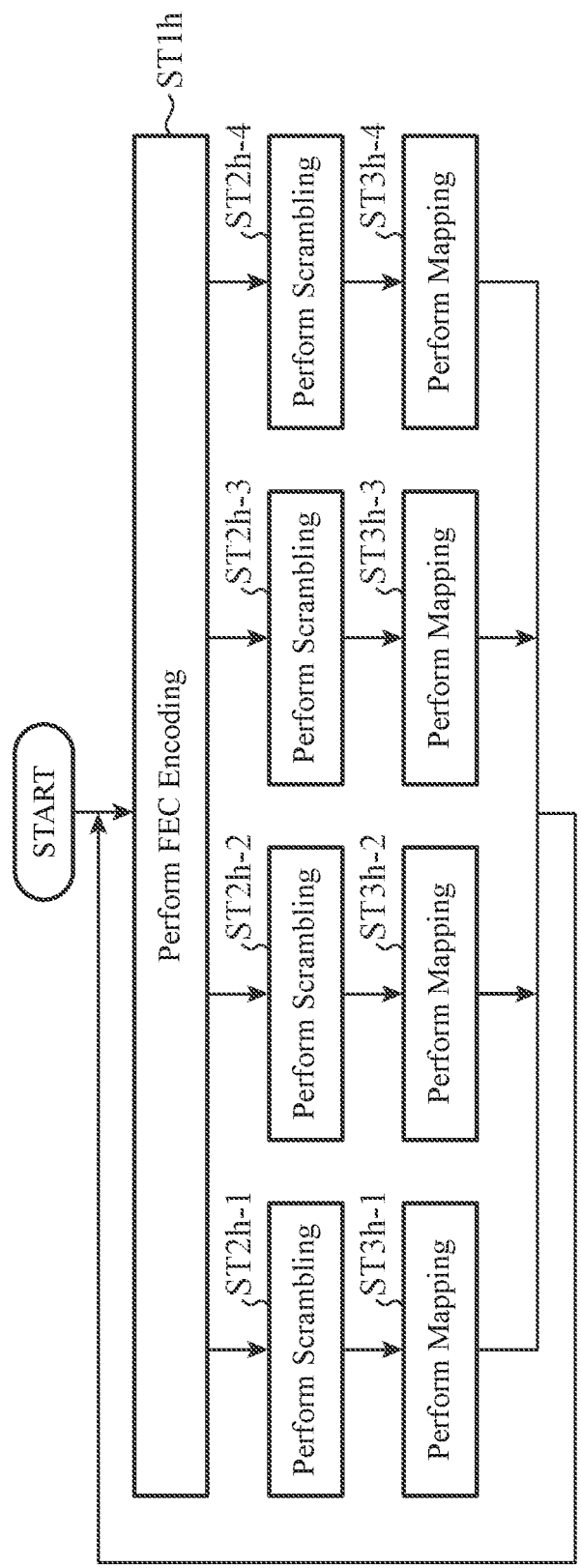
FIG. 29 is a flowchart showing an operation of the transmission DSP in the tenth embodiment.

FIG. 29 is a flowchart showing an operation of the transmission DSP 4A.

The FEC encoding unit 40 FEC-encodes data to be transmitted to the space (step ST1h). The data FEC-encoded by the FEC encoding unit 40 are output to the scramblers 41a to 41d, individually.

The scramblers 41a to 41d perform different types of scrambling on the data FEC-encoded by the FEC encoding unit 40 (steps ST2h-1 to ST2h-4). The mapping units 42a to 42d map the signals scrambled by the scramblers 41a to 42d respectively, to QPSK signals (steps ST3h-1 to ST3h-4).

The QPSK signal mapped by the mapping unit 42a is output to the IQ modulator 52a included in the optical transmission unit 5A, the QPSK signal mapped by the mapping unit 42b is output to the IQ modulator 52b, the QPSK signal mapped by the mapping unit 42c is output to the IQ modulator 52c, and the QPSK signal mapped by the mapping unit 42d is output to the IQ modulator 52d.

Next, the operation of the reception DSP 3F will be described.

Figure 30:
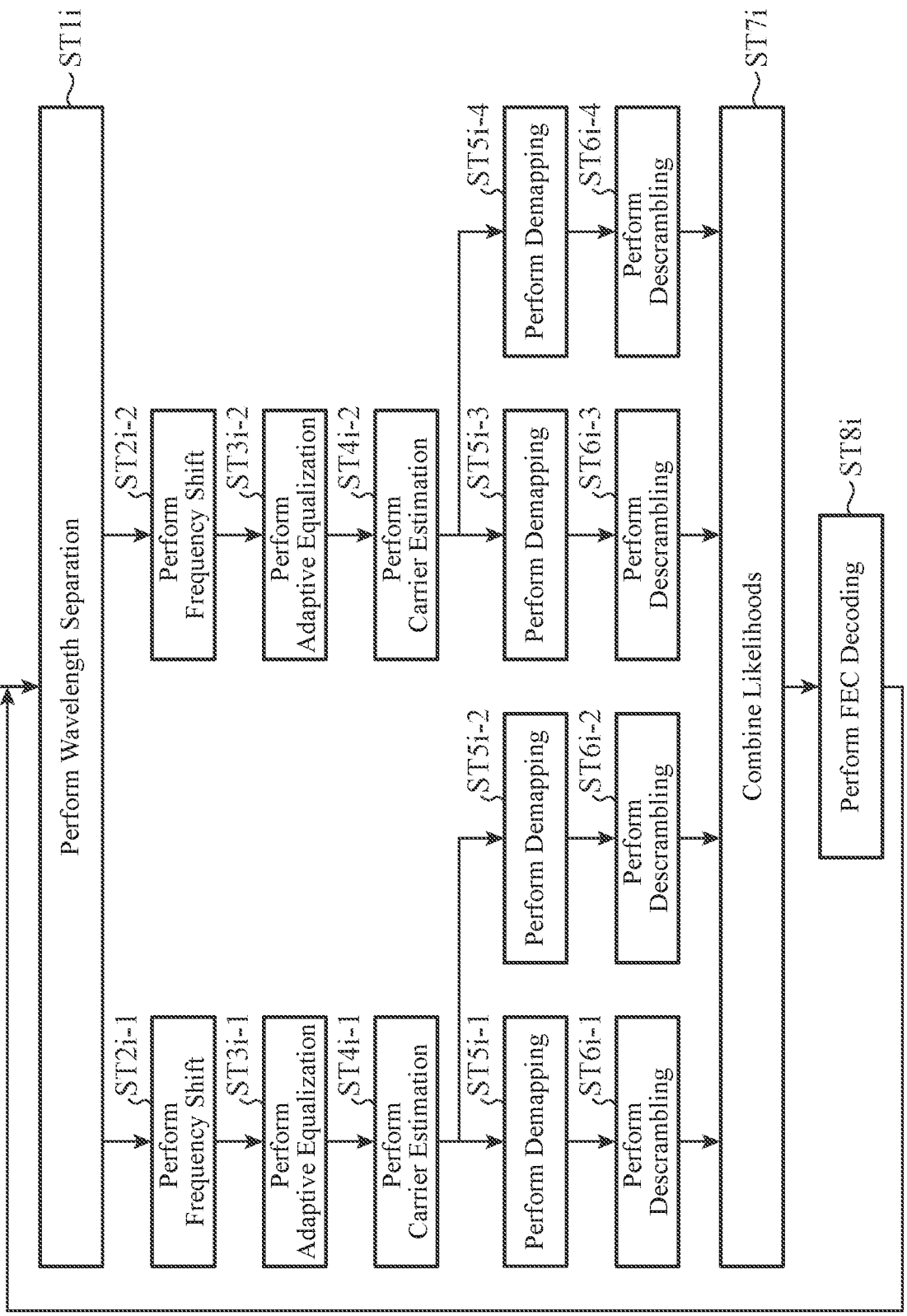
FIG. 30 is a flowchart showing an operation of the reception DSP in the tenth embodiment.

FIG. 30 is a flowchart showing the operation of the reception DSP 3F.

The wavelength separation unit 33 separates the four electrical signals coherently detected by the polarization multiplexing coherent detector 25 in accordance with frequency corresponding to each of the single wavelengths λ1 and λ2 which are transmission wavelengths (step ST1i). For example, the wavelength separation unit 33 separates signals corresponding to the transmission wavelengths λ1 and λ2 using filters that pass signals having frequency corresponding to each of the wavelengths λ1 and λ2.

The frequency shift unit 34a frequency-shifts the two electrical signals corresponding to the wavelength λ1 separated by the wavelength separation unit 33 to generate an electrical signal of a baseband signal (step ST2i-1). The frequency shift unit 34b frequency-shifts the two electrical signals corresponding to the wavelength λ2 separated by the wavelength separation unit 33 to generate an electrical signal of a baseband signal (step ST2i-2).

Subsequently, the adaptive equalization unit 35a adaptively equalizes the two signals converted into the baseband signals by the frequency shift unit 34a to compensate for linear distortion in the signals (step ST3i-1). The adaptive equalization unit 35b adaptively equalizes the two signals converted into the baseband signals by the frequency shift unit 34b to compensate for linear distortion in the signals (step ST3i-2). For example, each of the adaptive equalization unit 35a and the adaptive equalization unit 35b includes an FIR filter, and performs adaptive equalization of an electrical signal by a constant envelope reference algorithm.

The carrier estimation unit 36a performs carrier estimation on the two electrical signals (electrical signals corresponding to the wavelength λ1) on which adaptive equalization has been performed by the adaptive equalization unit 35a (step ST4i-1). The carrier estimation unit 36b performs carrier estimation on the two electrical signals (electrical signals corresponding to the wavelength λ2) on which adaptive equalization has been performed by the adaptive equalization unit 35b (step ST4i-2). For example, the carrier estimation unit 36a and the carrier estimation unit 36b compensate for the frequency difference and the phase difference between the lights output from the light sources 50a and 50b included in the optical transmission unit 5B and the local oscillation lights by estimating the carriers of the optical signals from the electrical signals.

The demapping unit 62a demaps one of the electrical signals on which carrier estimation has been performed by the carrier estimation unit 36a, and converts the electrical signal into a likelihood (step ST5i-1). The demapping unit 62b demaps the other of the electrical signals on which carrier estimation has been performed by the carrier estimation unit 36a, and converts the electrical signal into a likelihood (step ST5i-2).

Furthermore, the demapping unit 62c demaps one of the electrical signals on which carrier estimation has been performed by the carrier estimation unit 36b, and converts the electrical signal into a likelihood (step ST5i-3). The demapping unit 62d demaps the other of the electrical signals on which carrier estimation has been performed by the carrier estimation unit 36b, and converts the electrical signal into a likelihood (step ST5i-4).

The descrambler 63a performs descrambling corresponding to the scrambling performed by the scrambler 41a on the likelihood generated by the demapping unit 62a (step ST6i-1). The descrambler 63b performs descrambling corresponding to the scrambling performed by the scrambler 41b on the likelihood generated by the demapping unit 62b (step ST6i-2).

The descrambler 63c performs descrambling corresponding to the scrambling performed by the scrambler 41c on the likelihood generated by the demapping unit 62c (step ST6i-3). The descrambler 63d performs descrambling corresponding to the scrambling performed by the scrambler 41d on the likelihood generated by the demapping unit 62d (step ST6i-4).

Subsequently, the likelihood combining unit 64 combines the likelihoods descrambled by the respective descramblers 63a to 63d (step ST7i). Next, the FEC decoding unit 65 FEC-decodes the likelihood combined by the likelihood combining unit 64 and outputs decoded data (step ST8i).

As described above, in the spatial optical communication system according to the tenth embodiment, the reception DSP 3F adaptively equalizes the plurality of electrical signals coherently detected by the optical reception unit 2, performs carrier estimation on each of the plurality of electrical signals on which adaptive equalization has been performed, and demaps each of the plurality of electrical signals on which carrier estimation has been performed. Then, the reception DSP 3F performs descrambling corresponding to the respective different types of scrambling on the plurality of likelihoods generated by the demapping, combines the plurality of descrambled likelihoods, and FEC-decodes the combined likelihood. Since the plurality of optical signals transmitted from the optical transmission unit 5B have the orthogonal polarizations, the optical signals are coherently detected in the optical reception unit 2 without interfering with each other. Since the adaptive equalization and the carrier estimation are performed on the two signals corresponding to the respective transmission wavelengths, and then all the signals are combined, the signals are combined so as to maximize the SN ratio. Therefore, the spatial optical receiver can obtain more diversity effects than the spatial optical receivers described in the seventh to ninth embodiments.

Eleventh Embodiment

Figure 31:
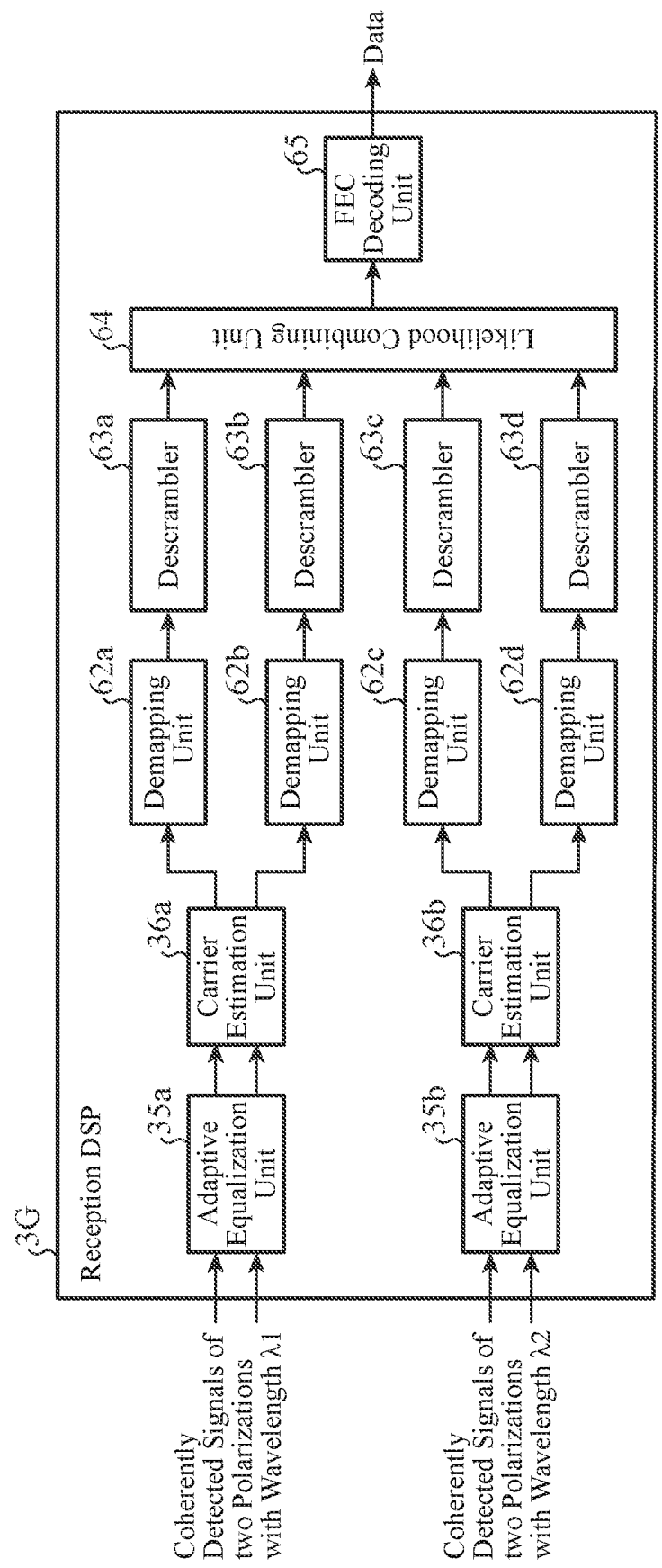
FIG. 31 is a block diagram showing a configuration of a reception DSP included in a spatial optical communication system according to an eleventh embodiment.

FIG. 31 is a block diagram showing a configuration of a reception DSP3G included in a spatial optical communication system according to the eleventh embodiment. The spatial optical communication system according to the eleventh embodiment includes a spatial optical transmitter and a spatial optical receiver. The spatial optical transmitter includes the transmission DSP 4A shown in FIG. 26 and the optical transmission unit 5B shown in FIG. 27. The signal to be transmitted is, for example, a QPSK signal. The spatial optical receiver includes the optical reception unit 2B shown in FIG. 13 and the reception DSP 3G shown in FIG. 31.

In the reception DSP 3G, the adaptive equalization unit 35a adaptively equalizes the signals of two polarizations with the wavelength λ1 coherently detected by the coherent detector 27a included in the optical reception unit 2B. The adaptive equalization unit 35b adaptively equalizes the signals of two polarizations with the wavelength λ2 coherently detected by the coherent detector 27b included in the optical reception unit 2B. The carrier estimation unit 36a performs carrier estimation on the two electrical signals on which adaptive equalization has been performed by the adaptive equalization unit 35a. The carrier estimation unit 36b performs carrier estimation on the two electrical signals on which adaptive equalization has been performed by the adaptive equalization unit 35b.

The demapping unit 62a demaps one of the two electrical signals on which carrier estimation has been performed by the carrier estimation unit 36a, and the demapping unit 62b demaps the other of the two electrical signals on which carrier estimation has been performed by the carrier estimation unit 36a. The demapping unit 62c demaps one of the two electrical signals on which carrier estimation has been performed by the carrier estimation unit 36b, and the demapping unit 62d demaps the other of the two electrical signals on which carrier estimation has been performed by the carrier estimation unit 36b. The four electrical signals on which carrier estimation has been performed by the carrier estimation unit 36a and the carrier estimation unit 36b, are converted into respective likelihoods of the four electrical signals by the demapping.

The descrambler 63a performs descrambling corresponding to the scrambling performed by the scrambler 41a included in the transmission DSP 4A on the likelihood generated by the demapping unit 62a. The descrambler 63b performs descrambling corresponding to the scrambling performed by the scrambler 41b included in the transmission DSP 4A on the likelihood generated by the demapping unit 62b.

The descrambler 63c performs descrambling corresponding to the scrambling performed by the scrambler 41c included in the transmission DSP 4A on the likelihood generated by the demapping unit 62c. The descrambler 63d performs descrambling corresponding to the scrambling performed by the scrambler 41d included in the transmission DSP 4A on the likelihood generated by the demapping unit 62d.

The likelihood combining unit 64 combines the likelihoods descrambled by the respective descramblers 63a to 63d. The FEC decoding unit 65 is a decoding unit for FEC-decoding the likelihood combined by the likelihood combining unit 64.

Note that FIG. 31 shows a configuration in which the reception DSP 3G includes two units each including an adaptive equalization unit, a carrier estimation unit, two demapping units, and two descramblers.

Note that, the reception DSP 3G may include three or more of the above units depending on the number of single wavelengths that are transmission wavelengths.

Next, the operation of the reception DSP 3G will be described.

Figure 32:
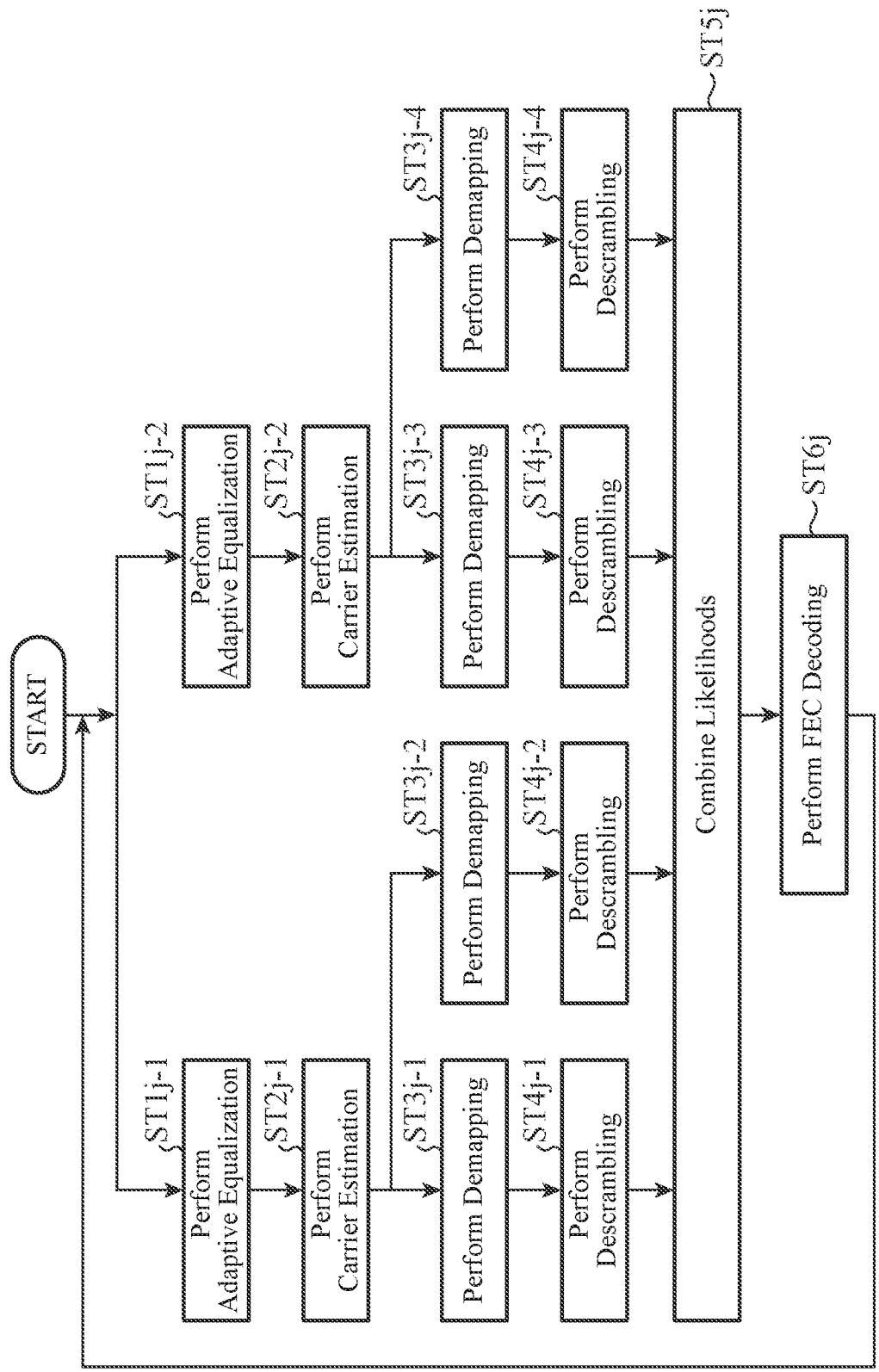
FIG. 32 is a flowchart showing an operation of the reception DSP in the eleventh embodiment.

FIG. 32 is a flowchart showing an operation of the reception DSP 3G.

The adaptive equalization unit 35a adaptively equalizes the two signals coherently detected by the coherent detector 27a to compensate for linear distortion in the signals (step ST1j-1). The adaptive equalization unit 35b adaptively equalizes the two signals coherently detected by the coherent detector 27b to compensate for linear distortion in the signals (step ST1j-2).

For example, each of the adaptive equalization unit 35a and the adaptive equalization unit 35b includes an FIR filter, and performs adaptive equalization of an electrical signal by a constant envelope reference algorithm.

The carrier estimation unit 36a performs carrier estimation on the two electrical signals (electrical signals corresponding to the wavelength $\lambda 1$) on which adaptive equalization has been performed by the adaptive equalization unit 35a (step ST2j-1). The carrier estimation unit 36b performs carrier estimation on the two electrical signals (electrical signals corresponding to the wavelength $\lambda 2$) on which adaptive equalization has been performed by the adaptive equalization unit 35b (step ST2j-2). For example, the carrier estimation unit 36a and the carrier estimation unit 36b compensate for the frequency difference and the phase difference between the lights output from the light sources 50a and 50b included in the optical transmission unit 5B and the local oscillation lights by estimating the carriers of the optical signals from the electrical signals.

The demapping unit 62a demaps one of the electrical signals on which carrier estimation has been performed by the carrier estimation unit 36a, and converts the electrical signal into a likelihood (step ST3j-1). The demapping unit 62b demaps the other of the electrical signals on which carrier estimation has been performed by the carrier estimation unit 36a, and converts the electrical signal into a likelihood (step ST3j-2).

Furthermore, the demapping unit 62c demaps one of the electrical signals on which carrier estimation has been performed by the carrier estimation unit 36b, and converts the electrical signal into a likelihood (step ST3j-3). The demapping unit 62d demaps the other of the electrical signals on which carrier estimation has been performed by the carrier estimation unit 36b, and converts the electrical signal into a likelihood (step ST3j-4).

The descrambler 63a performs descrambling corresponding to the scrambling performed by the scrambler 41a on the likelihood generated by the demapping unit 62a (step ST4j-1). The descrambler 63b performs descrambling corresponding to the scrambling performed by the scrambler 41b on the likelihood generated by the demapping unit 62b (step ST4j-2).

The descrambler 63c performs descrambling corresponding to the scrambling performed by the scrambler 41c on the likelihood generated by the demapping unit 62c (step ST4j-3). The descrambler 63d performs descrambling corresponding to the scrambling performed by the scrambler 41d on the likelihood generated by the demapping unit 62d (step ST4j-4).

Subsequently, the likelihood combining unit 64 combines the likelihoods descrambled by the respective descramblers 63a to 63d (step ST5j). Next, the FEC decoding unit 65 FEC-decodes the likelihood combined by the likelihood combining unit 64, and outputs decoded data (step ST6j).

As described above, in the spatial optical communication system according to the eleventh embodiment, the reception DSP 3G adaptively equalizes the plurality of electrical signals coherently detected by the optical reception unit 2B, performs carrier estimation on each of the plurality of electrical signals on which adaptive equalization has been performed, and demaps each of the plurality of electrical signals on which carrier estimation has been performed. Then, the reception DSP 3G performs descrambling corresponding to the respective different types of scrambling on the plurality of likelihoods generated by the demapping, combines the plurality of descrambled likelihoods, and FEC-decodes the combined likelihood. Since the plurality of optical signals transmitted from the optical transmission unit 5B have the orthogonal polarizations, the optical signals are coherently detected in the optical reception unit 2B without interfering with each other. Since the adaptive equalization and the carrier estimation are performed on the two signals corresponding to the respective transmission wavelengths, and then all the signals are combined, the signals are combined so as to maximize the SN ratio. Therefore, the spatial optical receiver can obtain more diversity effects than the spatial optical receivers described in the seventh to ninth embodiments.

Twelfth Embodiment

Figure 33:
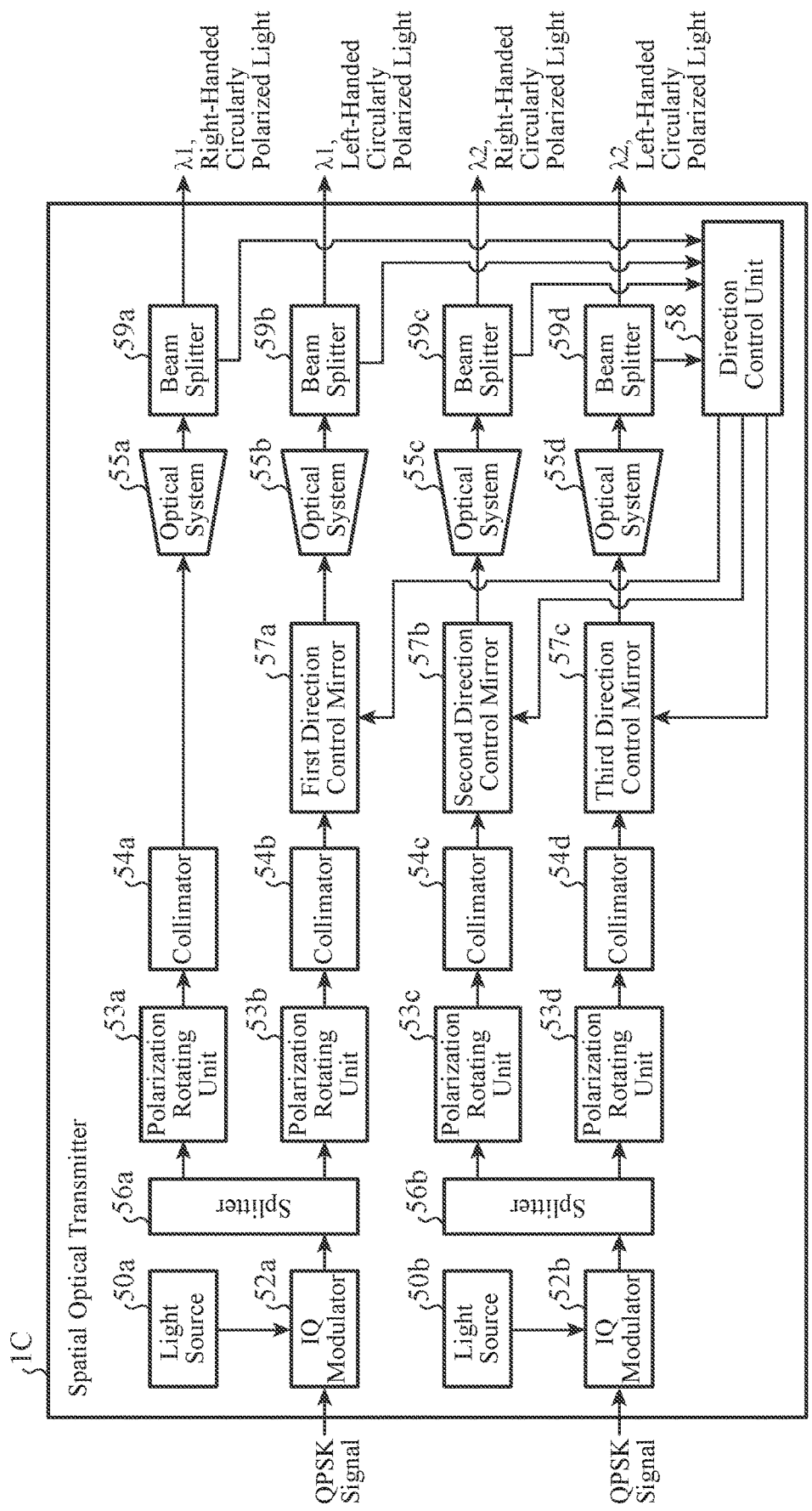
FIG. 33 is a block diagram showing a configuration of a spatial optical transmitter according to a twelfth embodiment.

FIG. 33 is a block diagram showing a configuration of a spatial optical transmitter 1C according to the twelfth embodiment.

As shown in FIG. 33, the spatial optical transmitter 1C includes a light source 50a, a light source 50b, an IQ modulator 52a, an IQ modulator 52b, a splitter 56a, a splitter 56b, a polarization rotating unit 53a, a polarization rotating unit 53b, a polarization rotating unit 53c, a polarization rotating unit 53d, a collimator 54a, a collimator 54b, a collimator 54c, a collimator 54d, a first direction control mirror 57a, a second direction control mirror 57b, a third direction control mirror 57c, an optical system 55a, an optical system 55b, an optical system 55c, an optical system 55d, a direction control unit 58, a beam splitter 59a, a beam splitter 59b, a beam splitter 59c, and a beam splitter 59d. The light source 50a and the light source 50b are light sources for outputting lights of single wavelengths different from each other, and are, for example, semiconductor lasers. In FIG. 33, the light source 50a outputs a light having a wavelength $\lambda 1$, and the light source 50b outputs a light having a wavelength $\lambda 2$ different from $\lambda 1$.

The IQ modulator 52a is a modulation unit for modulating the light output from the light source 50a in accordance with a signal to be transmitted to generate a modulated optical signal of a single polarization. The IQ modulator 52b is a modulation unit for modulating the light output from the light source 50b in accordance with a signal to be transmitted to generate a modulated optical signal of a single polarization. Similarly to the second embodiment, for example, when the signal to be transmitted is a QPSK signal, the IQ modulator 52a modulates the light output from the light source 50a into the same QPSK signal to generate an optical signal of X polarization with a wavelength λ1. The IQ modulator 52b modulates the light output from the light source 50b into the same QPSK signal to generate an optical signal of X polarization with a wavelength λ2.

The splitter 56a is a transmission-side dividing unit for dividing the optical signal modulated by the IQ modulator 52a into two. The splitter 56b is a transmission-side dividing unit for dividing the optical signal modulated by the IQ modulator 52b into two. The splitter 56a distributes the optical signal modulated by the IQ modulator 52a to the polarization rotating unit 53a and the polarization rotating unit 53b. The splitter 56b distributes the optical signal modulated by the IQ modulator 52b to the polarization rotating unit 53c and the polarization rotating unit 53d.

Each of the polarization rotating unit 53a and the polarization rotating unit 53b rotates the polarization of the optical signal divided by the splitter 56a. The optical signal output from the polarization rotating unit 53a and the optical signal output from the polarization rotating unit 53b are optical signals of two orthogonal polarizations, for example, a right-handed circularly polarized light and a left-handed circularly polarized light. Furthermore, each of the polarization rotating unit 53c and the polarization rotating unit 53d rotates the polarization of the optical signal divided by the splitter 56b. The optical signal output from the polarization rotating unit 53c and the optical signal output from the polarization rotating unit 53d are optical signals of two orthogonal polarizations, for example, a right-handed circularly polarized light and a left-handed circularly polarized light.

The collimator 54a is a transmission-side optical system that inputs an optical signal whose polarization has been rotated by the polarization rotating unit 53a and converts the input optical signal into a parallel light. The collimator 54b is a transmission-side optical system that inputs an optical signal whose polarization has been rotated by the polarization rotating unit 53b and converts the input optical signal into a parallel light. The collimator 54c inputs the optical signal whose polarization has been rotated by the polarization rotating unit 53c, and converts the input optical signal into a parallel light. The collimator 54d inputs the optical signal whose polarization has been rotated by the polarization rotating unit 53d, and converts the input optical signal into a parallel light.

The first direction control mirror 57a is a direction control mirror for controlling the direction of the optical signal output from the collimator 54b that is the transmission-side optical system. The second direction control mirror 57b is a direction control mirror for controlling the direction of the optical signal output from the collimator 54c that is the transmission-side optical system. The third direction control mirror 57c is a direction control mirror for controlling the direction of the optical signal output from the collimator 54d that is the transmission-side optical system. The direction control unit 58 detects the directional deviation of the optical signal divided by each of the beam splitters 59a to 59d, and controls the first direction control mirror 57a, the second direction control mirror 57b, and the third direction control mirror 57c so that the detected directional deviation is compensated.

In addition, the optical system 55a is a transmission-side optical system that outputs an optical signal whose polarization has been rotated by the polarization rotating unit 53a and which has been converted into a parallel light by the collimator 54a to the beam splitter 59a. The optical system 55b is a transmission-side optical system that outputs an optical signal whose polarization has been rotated by the polarization rotating unit 53b and which has been converted into a parallel light by the collimator 54b and passed through the first direction control mirror 57a to the beam splitter 59b. The optical system 55c is a transmission-side optical system that outputs an optical signal whose polarization has been rotated by the polarization rotating unit 53c and which has been converted into a parallel light by the collimator 54c and passed through the second direction control mirror 57b to the beam splitter 59c. The optical system 55d is a transmission-side optical system that outputs an optical signal whose polarization has been rotated by the polarization rotating unit 53d and which has been converted into a parallel light by the collimator 54d and passed through the third direction control mirror 57c to the beam splitter 59d.

The beam splitter 59a is a transmission-side beam splitter that divides an optical signal, whose polarization has been rotated by the polarization rotating unit 53a and which has been converted into a parallel light by the collimator 54a, into a first optical signal and a second optical signal, transmits the first signal to space, and outputs the second optical signal to the direction control unit 58. The beam splitter 59b is a transmission-side beam splitter that divides an optical signal whose direction is controlled by the first direction control mirror 57a into a first optical signal and a second optical signal, transmits the first signal to space, and outputs the second optical signal to the direction control unit 58. The beam splitter 59c is a transmission-side beam splitter that divides an optical signal whose direction is controlled by the second direction control mirror 57b into a first optical signal and a second optical signal, transmits the first signal to space, and outputs the second optical signal to the direction control unit 58. The beam splitter 59d is a transmission-side beam splitter that divides an optical signal whose direction is controlled by the third direction control mirror 57c into a first optical signal and a second optical signal, transmits the first signal to space, and outputs the second optical signal to the direction control unit 58.

In FIG. 33, the right-handed circularly polarized light having the wavelength λ1 is transmitted from the beam splitter 59a, and the left-handed circularly polarized light having the wavelength λ1 is transmitted from the beam splitter 59b. The right-handed circularly polarized light having the wavelength λ2 is transmitted from the beam splitter 59c, and the left-handed circularly polarized light having the wavelength λ2 is transmitted from the beam splitter 59d.

Each of the optical system 55a, the optical system 55b, the optical system 55c, and the optical system 55d widens the beam diameter of the input optical signal and then transmits the optical signal to space. In addition, similarly to the first embodiment, the interval between each of the optical systems 55a to 55d is a value larger than the fried parameter.

In addition, FIG. 33 shows the spatial optical transmitter 1C including three direction control mirrors for four optical systems. Note that, in a case where the spatial optical transmitter 1C has N (N is a natural number of 2 or more) optical systems, (N−1) direction control mirrors are arranged between (N−1) collimators and (N−1) optical systems.

Figure 34:
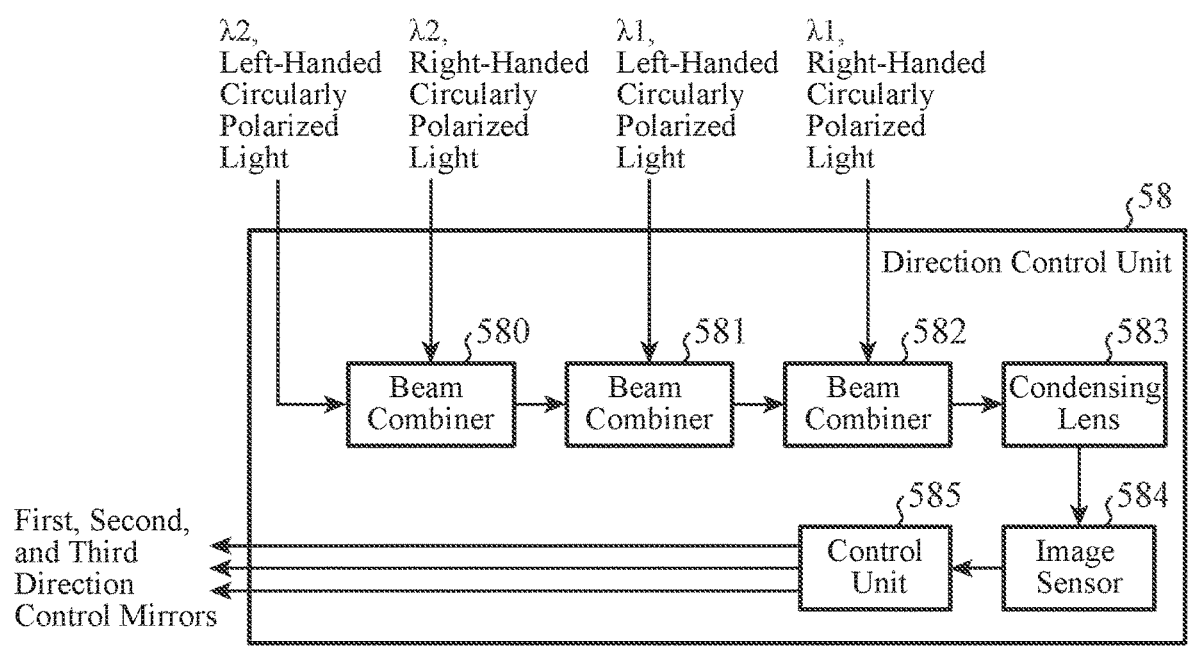
FIG. 34 is a block diagram showing a configuration of a direction control unit in the twelfth embodiment.

FIG. 34 is a block diagram showing a configuration of the direction control unit 58. In FIG. 34, the direction control unit 58 includes beam combiners 580 to 582, a condensing lens 583, an image sensor 584, and a control unit 585. The beam combiner 580 combines the right-handed circularly polarized light with the wavelength λ2 divided by the beam splitter 59c and the left-handed circularly polarized light with the wavelength λ2 divided by the beam splitter 59d, and outputs the combined light to the beam combiner 581. The beam combiner 581 combines the optical signal input from the beam combiner 580 and the left-handed circularly polarized light with the wavelength λ1 divided by the beam splitter 59b, and outputs the combined light to the beam combiner 582. The beam combiner 582 combines the optical signal input from the beam combiner 581 and the right-handed circularly polarized light with the wavelength λ1 divided by the beam splitter 59a, and outputs the combined light to the condensing lens 583.

The condensing lens 583 is a lens that condenses the optical signal input from the beam combiner 582 onto the image sensor 584. The image sensor 584 is a sensor that receives the light condensed by the condensing lens 583. The control unit 585 controls the first direction control mirror 57a, the second direction control mirror 57b, and the third direction control mirror 57c depending on the position of the condensing point on the image sensor 584.

Next, the operation of the direction control unit 58 will be described.

Figure 35:
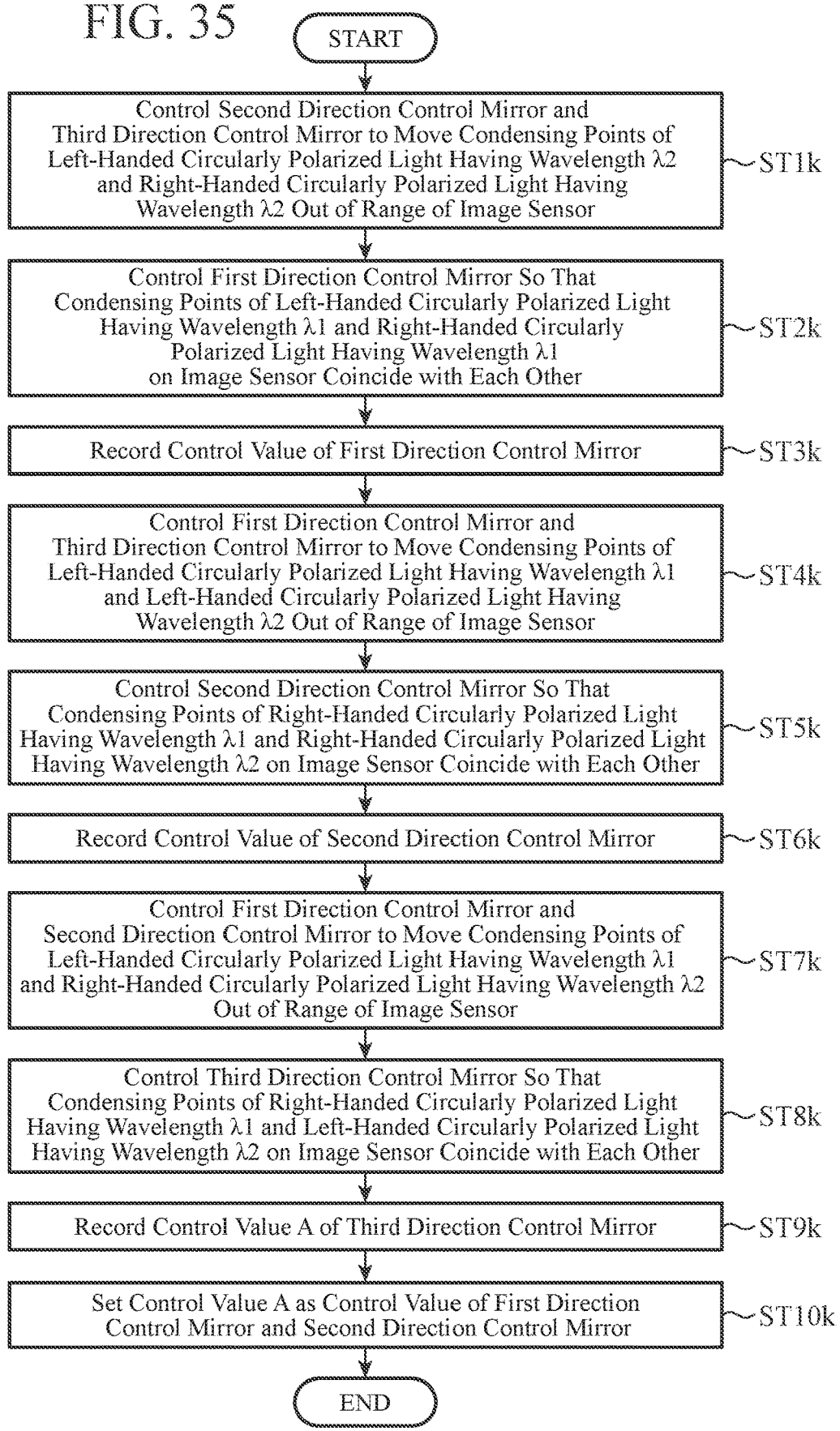
FIG. 35 is a flowchart showing an operation of the direction control unit in the twelfth embodiment.

FIG. 35 is a flowchart showing the operation of the direction control unit 58.

The four optical signals (left-handed circularly polarized light with the wavelength right-handed circularly polarized light with the wavelength left-handed circularly polarized light with the wavelength λ2, and right-handed circularly polarized light with the wavelength λ2) distributed to the direction control unit 58 by the beam splitters 59a to 59d are combined by the beam combiners 580 to 582. The condensing lens 583 condenses the optical signal input from the beam combiner 582 on the light receiving surface of the image sensor 584. The control unit 585 acquires the position of the condensing point on the light receiving surface of the image sensor 584.

The control unit 585 detects mutual deviation of the condensing points corresponding to the four signal lights on the light receiving surface of the image sensor 584, and controls the first direction control mirror 57a, the second direction control mirror 57b, and the third direction control mirror 57c so that the four condensing points coincide with each other.

First, the control unit 585 controls the drive mechanisms of the second direction control mirror 57b and the third direction control mirror 57c to move the condensing points of the left-handed circularly polarized light having the wavelength λ2 and the right-handed circularly polarized light having the wavelength λ2 out of the range (out of the light receiving surface) of the image sensor 584 (step ST1k).

Next, the control unit 585 controls the drive mechanism of the first direction control mirror 57a so that the condensing point of the left-handed circularly polarized light having the wavelength λ1 and the condensing point of the right-handed circularly polarized light having the wavelength λ1 coincide with each other on the light receiving surface of the image sensor 584 (step ST2k).

The control unit 585 records a control value of the first direction control mirror 57a when the condensing point of the left-handed circularly polarized light having the wavelength λ1 and the condensing point of the right-handed circularly polarized light having the wavelength λ1 coincide with each other on the light receiving surface of the image sensor 584 (step ST3k). For example, the control value of the first direction control mirror 57a is recorded in a memory readable and writable from the control unit 585.

Subsequently, the control unit 585 controls the drive mechanisms of the first direction control mirror 57a and the third direction control mirror 57c to move the condensing points of the left-handed circularly polarized light having the wavelength λ1 and the left-handed circularly polarized light having the wavelength λ2 out of the range of the image sensor 584 (step ST4k).

Next, the control unit 585 controls the drive mechanism of the second direction control mirror 57b so that the condensing point of the right-handed circularly polarized light having the wavelength λ1 and the condensing point of the right-handed circularly polarized light having the wavelength λ2 coincide with each other on the light receiving surface of the image sensor 584 (step ST5k).

The control unit 585 records a control value of the second direction control mirror 57b when the condensing point of the right-handed circularly polarized light having the wavelength λ1 and the condensing point of the right-handed circularly polarized light having the wavelength λ2 coincide with each other on the light receiving surface of the image sensor 584 (step ST6k).

Subsequently, the control unit 585 controls the drive mechanisms of the first direction control mirror 57a and the second direction control mirror 57b to move the condensing points of the left-handed circularly polarized light having the wavelength λ1 and the right-handed circularly polarized light having the wavelength λ2 out of the range of the image sensor 584 (step ST7k).

Next, the control unit 585 controls the drive mechanism of the third direction control mirror 57c so that the condensing point of the right-handed circularly polarized light having the wavelength λ1 and the condensing point of the left-handed circularly polarized light having the wavelength λ2 coincide with each other on the light receiving surface of the image sensor 584 (step ST8k).

Thereafter, the control unit 585 records a control value A of the third direction control mirror 57c when the condensing point of the right-handed circularly polarized light having the wavelength λ1 and the condensing point of the left-handed circularly polarized light having the wavelength λ2 coincide with each other on the light receiving surface of the image sensor 584 (step ST9k). Furthermore, the control unit 585 sets the control value A recorded in step ST9k as the control value of the drive mechanisms of the first direction control mirror 57a and the second direction control mirror 57b (step ST10k). By controlling the first direction control mirror 57a and the second direction control mirror 57b with the control value A, it is possible to compensate for the directional deviation of the left-handed circularly polarized light having the wavelength λ1, the right-handed circularly polarized light having the wavelength λ1, the left-handed circularly polarized light having the wavelength λ2, and the right-handed circularly polarized light having the wavelength λ2.

Next, the hardware configuration that implements the functions of the direction control unit 58 will be described.

The functions of the control unit 585 in the direction control unit 58 are implemented by a processing circuit. That is, the direction control unit 58 includes a processing circuit for executing the processing from step ST1k to step ST10k in FIG. 35. The processing circuit may be dedicated hardware, or may be a CPU that executes a program stored in the memory.

Figure 36A:
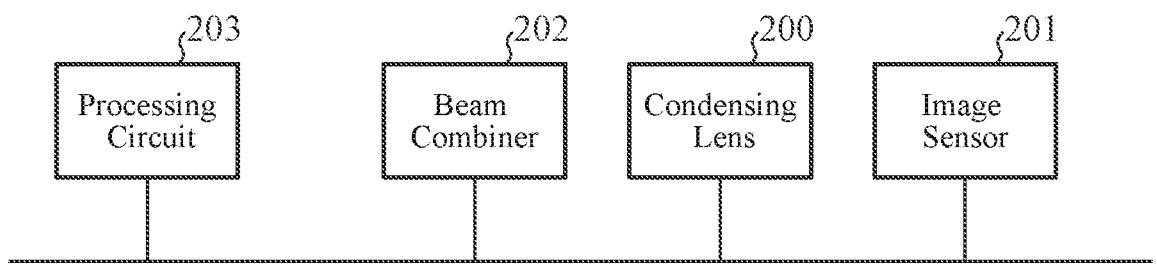
FIG. 36A is a block diagram showing a hardware configuration for implementing functions of the direction control unit in the twelfth embodiment.
Figure 36B:
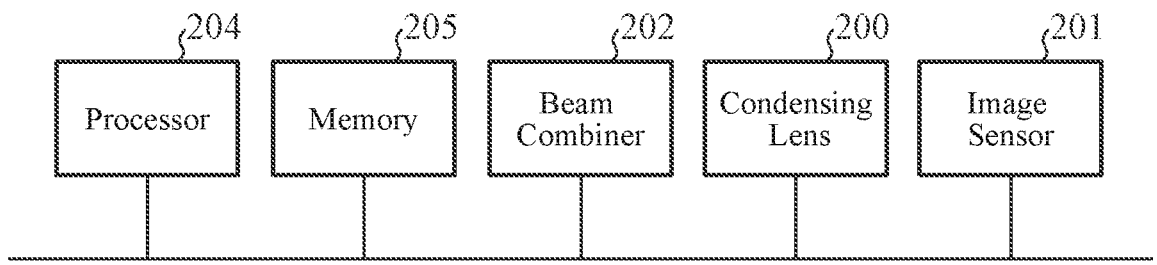
FIG. 36B is a block diagram showing a hardware configuration for executing software that implements functions of the direction control unit in the twelfth embodiment.

FIG. 36A is a block diagram showing a hardware configuration for implementing the functions of the direction control unit 58. FIG. 36B is a block diagram showing a hardware configuration for executing software that implements the functions of the direction control unit 58. In FIGS. 36A and 36B, a condensing lens 200 is the condensing lens 583 shown in FIG. 34. An image sensor 201 is the image sensor 584 shown in FIG. 34. The image sensor 584 is, for example, a solid-state imaging element. A beam combiner 202 is the beam combiners 580 to 582 shown in FIG. 34.

When the processing circuit is a processing circuit 203 of dedicated hardware shown in FIG. 36A, the processing circuit 203 corresponds, for example, to a single circuit, a composite circuit, a programmed processor, a parallel programmed processor, an ASIC, an FPGA, or a combination of these. The functions of the control unit 585 may be implemented by separate processing circuits, or these functions may be collectively implemented by a single processing circuit.

When the processing circuit is a processor 204 shown in FIG. 36B, the functions of the control unit 585 are implemented by software, firmware, or a combination of software and firmware. Note that, software or firmware is written as a program and stored in a memory 205.

The processor 204 implements the functions of the control unit 585 by reading and executing the program stored in the memory 205. For example, the direction control unit 58 includes the memory 205 for storing a program which when executed by the processor 204, allows the processing from step ST1$k$ to step ST10$k$ of the flowchart shown in FIG. 35 to be executed as a result. This program causes a computer to execute a procedure or a method performed by the control unit 585. The memory 205 may be a computer-readable storage medium that stores a program for causing the computer to function as the direction control unit 58.

The memory 205 corresponds to, for example, a nonvolatile or volatile semiconductor memory such as RAM, ROM, a flash memory, EPROM, or EEPROM, a magnetic disk, a flexible disk, an optical disk, a compact disk, a mini disk, or DVD.

Part of the functions of the control unit 585 may be implemented by dedicated hardware, and part of the functions may be implemented by software or firmware. Thus, the processing circuit can implement the above functions by hardware, software, firmware, or a combination thereof.

The configuration in which the direction control mirror, the direction control unit, and the beam splitter are added to the spatial optical transmitter (FIG. 3) described in the third embodiment has been described above with reference to FIG. 33. Note that, this is an example, and the direction control mirror, the direction control unit, and the beam splitter can be added to the spatial optical transmitter (FIG. 1) described in the first embodiment or can be added to the spatial optical transmitter (FIG. 2) described in the second embodiment. Further, the direction control mirror, the direction control unit, and the beam splitter can be added to the optical transmission unit 5, the optical transmission unit 5A, and the optical transmission unit 5B described in the seventh to eleventh embodiments. In either case, the direction control mirror is disposed between the collimator and the optical system. The beam splitter is disposed at a subsequent stage of the optical system, distributes a part of the light output from the optical system to the direction control unit, and transmits the remaining light to space.

As described above, the spatial optical transmitter 1C according to the twelfth embodiment includes the first direction control mirror 57$a$, the second direction control mirror 57$b$, the third direction control mirror 57$c$, the direction control unit 58, and the beam splitters 59$a$ to 59$d$. With this configuration, the spatial optical transmitter 1C can compensate for the directional deviation of the optical signal to be transmitted to space.

For example, in a case where there is a directional deviation in the optical signal to be transmitted from the transmission-side optical system to the space, it is necessary to make the spread of the beam of the optical signal larger than the directional deviation in order to propagate the light from all the transmission-side optical systems to the receiver side. On the other hand, since the spatial optical transmitter 1C compensates for the directional deviation of the optical signal to be transmitted to the space, even if the spread of the beam of the optical signal is reduced, the optical signal can be efficiently propagated to the receiver side.

Here, a hardware configuration that implements the functions of the spatial optical transmitter described in the seventh to twelfth embodiments will be described. The functions of the transmission DSP in the spatial optical transmitter are implemented by a processing circuit. That is, the spatial optical transmitter includes a processing circuit for executing processing by the transmission DSP described above. The processing circuit may be dedicated hardware, or may be a CPU that executes a program stored in the memory.

Figure 37A:
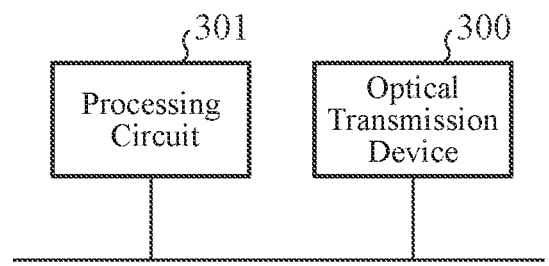
FIG. 37A is a block diagram showing a hardware configuration for implementing functions of the optical transmission unit and the transmission DSP of each of the seventh to twelfth embodiments.
Figure 37B:
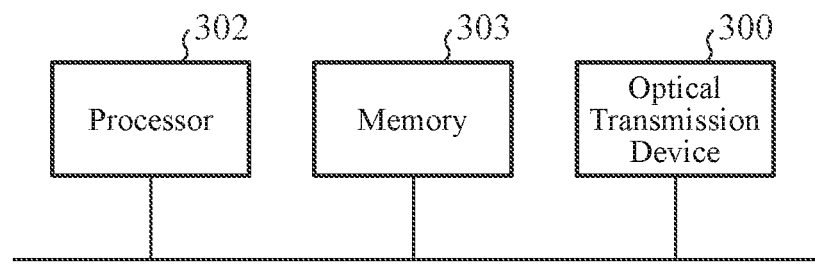
FIG. 37B is a block diagram showing a hardware configuration for executing software that implements functions of the optical transmission unit and the transmission DSP of each of the seventh to twelfth embodiments.

FIG. 37A is a block diagram showing a hardware configuration that implements the functions of the optical transmission unit and the transmission DSP in each of the seventh to twelfth embodiments. FIG. 37B is a block diagram showing a hardware configuration for executing software that implements functions of the optical transmission unit and the transmission DSP of each of the seventh to twelfth embodiments. In FIG. 37A and FIG. 37B, an optical transmission device 300 is the optical transmission unit described in the seventh to twelfth embodiments.

When the processing circuit is the processing circuit 301 of dedicated hardware shown in FIG. 37A, the processing circuit 301 corresponds, for example, to a single circuit, a composite circuit, a programmed processor, a parallel programmed processor, an ASIC, an FPGA, or a combination of these. The functions of the transmission DSP may be implemented by separate processing circuits, or these functions may be collectively implemented by one processing circuit.

When the processing circuit is a processor 302 shown in FIG. 37B, the functions of the transmission DSP are implemented by software, firmware, or a combination of software and firmware. Note that, software or firmware is written as a program and stored in a memory 303.

The processor 302 implements the functions of the transmission DSP by reading and executing the program stored in the memory 303. For example, the transmission DSP includes the memory 303 for storing a program which when executed by the processor 302, allows the processing from step ST1$d$ of the flowchart shown in FIG. 19 to be executed as a result. This program causes a computer to execute a procedure or method performed by the transmission DSP. The memory 303 may be a computer-readable storage medium that stores a program for causing the computer to function as the transmission DSP.

The memory 303 corresponds to, for example, a nonvolatile or volatile semiconductor memory such as RAM, ROM, a flash memory, EPROM, or EEPROM, a magnetic disk, a flexible disk, an optical disk, a compact disk, a mini disk, or DVD.

Part of the functions of the transmission DSP may be implemented by dedicated hardware, and part of the functions may be implemented by software or firmware. Thus, the processing circuit can implement the above functions by hardware, software, firmware, or a combination thereof.

Subsequently, a hardware configuration for implementing the functions of the spatial optical receiver described in the seventh to twelfth embodiments will be described. The function of the reception DSP in the spatial optical receiver is implemented by a processing circuit. That is, the spatial optical receiver includes a processing circuit for executing processing by the reception DSP described above. The processing circuit may be dedicated hardware, or may be a CPU that executes a program stored in the memory.

Figure 38A:
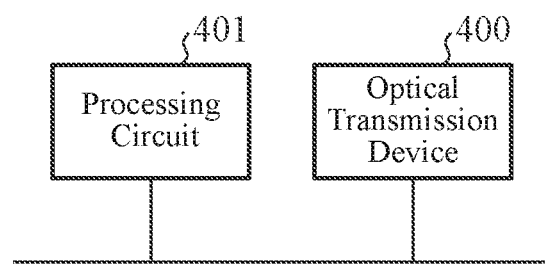
FIG. 38A is a block diagram showing a hardware configuration for implementing functions of the optical reception unit and the reception DSP of each of the fifth to twelfth embodiments.
Figure 38B:
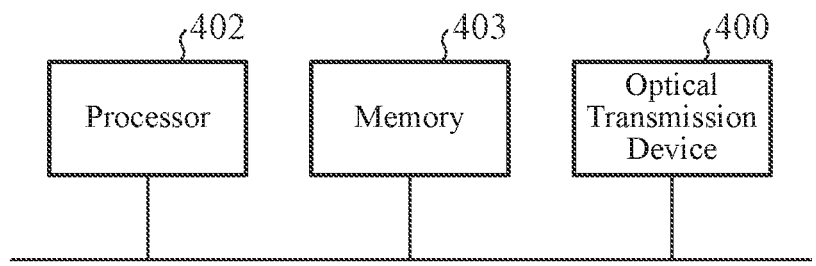
FIG. 38B is a block diagram showing a hardware configuration for executing software that implements functions of the optical reception unit and the reception DSP of each of the fifth to twelfth embodiments.

FIG. 38A is a block diagram showing a hardware configuration that implements the functions of the optical reception unit and the reception DSP in each of the fifth to twelfth embodiments. FIG. 38B is a block diagram showing a hardware configuration for executing software that implements functions of the optical reception unit and the reception DSP of each of the fifth to twelfth embodiments. In FIGS. 38A and 38B, an optical reception device 400 is the optical reception unit described in the fifth to twelfth embodiments.

When the processing circuit is a processing circuit 401 of dedicated hardware shown in FIG. 38A, the processing circuit 401 corresponds, for example, to a single circuit, a composite circuit, a programmed processor, a parallel programmed processor, an ASIC, an FPGA, or a combination of these. The functions of the reception DSP may be implemented by separate processing circuits, or these functions may be collectively implemented by one processing circuit.

When the processing circuit is a processor 402 shown in FIG. 38B, the functions of the reception DSP are implemented by software, firmware, or a combination of software and firmware. Note that, software or firmware is written as a program and stored in a memory 403.

The processor 402 implements the functions of the reception DSP by reading and executing the program stored in the memory 403. For example, the reception DSP includes the memory 403 for storing a program which when executed by the processor 402, allows the processing from step ST1*b* of the flowchart shown in FIG. 12 to be executed as a result. This program causes a computer to execute a procedure or method performed by the reception DSP. The memory 403 may be a computer-readable storage medium that stores a program for causing the computer to function as the reception DSP.

The memory 403 corresponds to, for example, a nonvolatile or volatile semiconductor memory such as RAM, ROM, a flash memory, EPROM, or EEPROM, a magnetic disk, a flexible disk, an optical disk, a compact disk, a mini disk, or DVD.

Part of the functions of the reception DSP may be implemented by dedicated hardware, and part of the functions may be implemented by software or firmware. Thus, the processing circuit can implement the above functions by hardware, software, firmware, or a combination thereof.

It should be noted that the present invention is not limited to the above-described embodiments, and within the scope of the present invention, free combination of each of the embodiments, modification of any constituent element of each of the embodiments, or omission of any constituent element of each of the embodiments can be made.

INDUSTRIAL APPLICABILITY

The spatial optical transmitter according to the present invention can perform stable spatial optical communication while suppressing an increase in a system scale, and thus can be used for various optical communication systems.

REFERENCE SIGNS LIST 1, 1A to 1C: spatial optical transmitter,
2, 2A, 2B: optical reception unit,
3, 3A to 3G: reception DSP,
4, 4A: transmission DSP,
5, 5A, 5B: optical transmission unit,
10, 10*a*, 10*b*, 50*a*, 50*b*: light source,
11, 11*a*, 11*b*, 52*a* to 52*d*: IQ modulator,
12, 12*a*, 12*b*, 26, 51, 56*a*, 56*b*: splitter,
13*a* to 13*d*, 53*a* to 53*d*: polarization rotating unit,
14*a* to 14*d*, 54*a* to 54*d*: collimator,
15*a* to 15*d*, 55*a* to 55*d*: optical system,
21: tracking mirror,
22, 59*a* to 59*d*: beam splitter,
23: tracking control unit,
24: optical fiber coupler,
25: polarization multiplexing coherent detector,
25A, 27*a*, 27*b*: coherent detector,
30, 35*a*, 35*b*: adaptive equalization unit,
31, 36*a*, 36*b*: carrier estimation unit,
32, 32*a*, 32*b*, 38, 62*a* to 62*d*: demapping unit,
33: wavelength separation unit,
34*a*, 34*b*: frequency shift unit,
37: combining unit,
39*a*, 39*b*, 63*a* to 63*d*: descrambler,
40: FEC encoding unit,
41*a* to 41*d*: scrambler,
42*a* to 42*d*: mapping unit,
57*a*: first direction control mirror,
57*b*: second direction control mirror,
57*c*: third direction control mirror,
58: direction control unit,
60, 64: likelihood combining unit,
61, 65: FEC decoding unit,
100, 200, 232, 583: condensing lens,
101, 201, 231, 584: image sensor,
102, 203, 301, 401: processing circuit,
103, 204, 302, 402: processor,
104, 205, 303, 403: memory,
202, 580 to 582: beam combiner,
230, 585: control unit,
300: optical transmission device, and
400: optical reception device.

The invention claimed is:

1. A spatial optical transmitter comprising:
a light source to output a light of a single wavelength,
a modulator to modulate the light output from the light source in accordance with a signal to be transmitted to generate a modulated optical signal of a single polarization;
a transmission-side splitter to divide the optical signal generated by the modulator into two;
a polarization rotator to rotate polarizations of the optical signals divided by the transmission-side splitter to generate optical signals of two orthogonal polarizations;
two transmission-side optical systems to transmit the optical signals of two polarizations generated by the polarization rotator to space, individually;
a plurality of units each including the light source, the modulator, the transmission-side splitter, the polarization rotator, and the transmission-side optical system, wherein the light sources included in the plurality of units output lights of single wavelengths different from each other;
a direction control mirror to control direction of the optical signal output from the transmission-side optical system;
a transmission-side beam splitter to divide the optical signal whose direction is controlled by the direction control mirror into a first optical signal and a second optical signal and transmitting the first optical signal to space; and
a direction controller to detect a directional deviation of the second optical signal and to control the direction control mirror so that the detected directional deviation is compensated.

2. A spatial optical communication system, comprising: a spatial optical transmitter; and a spatial optical receiver including an optical receiver and a reception signal processor,
wherein the spatial optical transmitter includes:
a light source to output a light of a single wavelength;
a modulator to modulate the light output from the light source in accordance with a signal to be transmitted to generate a modulated optical signal of a single polarization;
transmission-side splitter to divide the optical signal generated by the modulator into two;
a polarization rotator to rotate polarizations of the optical signals divided by the transmission-side splitter to generate optical signals of two orthogonal polarizations; and
two transmission-side optical systems to transmit the optical signals of two polarizations generated by the polarization rotator to space, individually,
wherein the optical receiver includes:
a reception-side optical system to condense light propagating in space;
a tracking mirror to change a directional angle of an optical signal condensed by the reception-side optical system;
a reception-side beam splitter to divide the optical signal output from the tracking mirror into a third optical signal and a fourth optical signal;
a tracking controller to detect a directional deviation of the third optical signal and to control the tracking mirror so that the detected directional deviation is compensated;
an optical fiber coupler to couple the fourth optical signal whose directional deviation has been compensated for by the tracking mirror to an optical fiber; and
a polarization multiplexing coherent detector to perform coherent detection to cause a local oscillation light to interfere with the fourth optical signal coupled to the optical fiber by the optical fiber coupler to generate two electrical signals corresponding to optical signals of two orthogonal polarizations, and
wherein the reception signal processor includes:
processing circuitry
to adaptively equalize the electrical signals of two polarizations generated by the polarization multiplexing coherent detector to generate an electrical signal of one polarization;
to perform carrier estimation on the generated electrical signal of one polarization; and
to demap the electrical signal on which carrier estimation has been performed.

3. A spatial optical communication system comprising: a spatial optical transmitter; and a spatial optical receiver including an optical receiver and a reception signal processor,
wherein the spatial optical transmitter includes:
a light source to output a light of a single wavelength;
a modulator to modulate the light output from the light source in accordance with a signal to be transmitted to generate a modulated optical signal of a single polarization;
a transmission-side splitter to divide the optical signal generated by the modulator into two;
a polarization rotator to rotate polarizations of the optical signals divided by the transmission-side splitter to generate optical signals of two orthogonal polarizations;
two transmission-side optical systems to transmit the optical signals of two polarizations generated by the polarization rotator to space, individually; and
a plurality of units each including the light source, the modulator, the transmission-side splitter, the polarization rotator, and the transmission-side optical system, wherein the light sources included in the plurality of units output lights of single wavelengths different from each other,
wherein the optical receiver includes:
a reception-side optical system to condense light propagating in space;
a tracking mirror to change a directional angle of an optical signal condensed by the reception-side optical system;
a reception-side beam splitter to divide the optical signal output from the tracking mirror into a third optical signal and a fourth optical signal;
a tracking controller to detect a directional deviation of the third optical signal and controlling the tracking mirror so that the detected directional deviation is compensated;
an optical fiber coupler to couple the fourth optical signal whose directional deviation has been compensated for by the tracking mirror to an optical fiber; and
a polarization multiplexing coherent detector to perform coherent detection to cause a local oscillation light to interfere with the fourth optical signal coupled to the optical fiber by the optical fiber coupler to generate two electrical signals corresponding to optical signals of two orthogonal polarizations, and
wherein the reception signal processor includes:
processing circuitry
to separate a plurality of electrical signals of two polarizations generated by the polarization multiplexing coherent detector in accordance with a frequency corresponding to each of a plurality of single wavelengths that is a transmission wavelength;
to perform frequency shift on each of the plurality of electrical signals to generate a plurality of electrical signals of baseband signals of two polarizations;
to adaptively equalize the plurality of electrical signals of two polarizations to generate a plurality of electrical signals of one polarization;
to perform carrier estimation on the generated electrical signals;
to combine the electrical signals on which carrier estimation has been performed into one signal; and
to demap the combined signal.

4. A spatial optical communication system comprising: a spatial optical transmitter; and a spatial optical receiver including an optical receiver and a reception signal processor, wherein the spatial optical transmitter includes:

a light source to output a light of a single wavelength;

a modulator to modulate the light output from the light source in accordance with a signal to be transmitted to generate a modulated optical signal of a single polarization;

a transmission-side splitter to divide the optical signal generated by the modulator into two;

a polarization rotator to rotate polarizations of the optical signals divided by the transmission-side splitter to generate optical signals of two orthogonal polarizations;

two transmission-side optical systems to transmit the optical signals of two polarizations generated by the polarization rotator to space, individually; and a plurality of units each including the light source, the modulator, the transmission-side splitter, the polarization rotator, and the transmission-side optical system, wherein the light sources included in the plurality of units output lights of single wavelengths different from each other, wherein the optical receiver includes:

a reception-side optical system to condense light propagating in space;

a tracking mirror to change a directional angle of an optical signal condensed by the reception-side optical system;

a reception-side beam splitter to divide the optical signal output from the tracking mirror into a third optical signal and a fourth optical signal;

a tracking controller to detect a directional deviation of the third optical signal and controlling the tracking mirror so that the detected directional deviation is compensated;

an optical fiber coupler to couple the fourth optical signal whose directional deviation has been compensated for by the tracking mirror to an optical fiber;

a reception-side splitter to divide the fourth optical signal coupled to the optical fiber by the optical fiber coupler into a plurality of optical signals; and a plurality of coherent detectors each performing coherent detection to cause a local oscillation light to interfere with each of the plurality of optical signals divided by the reception-side splitter to generate two electrical signals corresponding to optical signals of two orthogonal polarizations, the local oscillation light and the optical signal having the same wavelength, and wherein the reception signal processor includes:

processing circuitry to adaptively equalize the plurality of electrical signals of two polarizations generated by the plurality of coherent detectors to generate a plurality of electrical signals of one polarization;

to perform carrier estimation on the generated electrical signals on which adaptive equalization has been performed;

to combine the plurality of electrical signals on which carrier estimation has been performed into one signal; and to demap the one signal.

* * * * *